(12) United States Patent
Davlin et al.

(10) Patent No.: US 11,255,094 B2
(45) Date of Patent: Feb. 22, 2022

(54) EXPANDING FOAM INSULATING SYSTEM AND METHOD

(71) Applicant: Sperry Product Innovation, Inc., Bedford, MA (US)

(72) Inventors: Anthony O. Davlin, Cambridge, MA (US); Brian A. Murch, Needham, MA (US); Marc B. Laverdiere, Wakefield, MA (US)

(73) Assignee: Sperry Product Innovation, Inc., Bedford, MA (US)

( * ) Notice: Subject to any disclaimer, the term of this patent is extended or adjusted under 35 U.S.C. 154(b) by 0 days.

(21) Appl. No.: 16/703,448

(22) Filed: Dec. 4, 2019

(65) Prior Publication Data

US 2020/0190831 A1 Jun. 18, 2020

Related U.S. Application Data

(60) Provisional application No. 62/779,975, filed on Dec. 14, 2018.

(51) Int. Cl.
*E04B 1/74* (2006.01)
*E04F 21/08* (2006.01)
(Continued)

(52) U.S. Cl.
CPC .............. *E04F 21/085* (2013.01); *E04B 1/66* (2013.01); *E04B 1/7604* (2013.01); *E04B 2001/742* (2013.01)

(58) Field of Classification Search
CPC .... E04B 1/66; E04B 1/7604; E04B 2001/742; E04B 1/97; E04B 1/947; E04B 2/7411;
(Continued)

(56) References Cited

U.S. PATENT DOCUMENTS

| 1,177,240 A | 3/1916 | Gates |
| 2,551,751 A | 5/1951 | Macdougall, Jr. |

(Continued)

OTHER PUBLICATIONS

International Preliminary Report on Patentability for PCT/US2019/064491, dated Jan. 12, 2021.
(Continued)

*Primary Examiner* — Brian E Glessner
*Assistant Examiner* — James J Buckle, Jr.
(74) *Attorney, Agent, or Firm* — Morse, Barnes-Brown & Pendleton, P.C.; Sean D. Detweiler, Esq.

(57) ABSTRACT

A method and system for the application of foam insulation onto a surface or into a cavity include a sheet with an aperture, where the sheet covers or partially covers the surface or a cavity with the aperture adjacent to the surface or cavity. A pressure-activated foam generator which generates foam is coupled with the sheet. The pressure-activated foam generator includes a frangible output seal with a ruptured position. The pressure-activated foam generator is positioned so that in the ruptured position the foam has a path from the frangible output seal through the aperture and onto the surface or into the cavity. The sheet is connected to cover or partially cover the surface or cavity, and the pressure-activated foam generator is activated and the foam flows onto the surface or into the cavity.

20 Claims, 37 Drawing Sheets

(51) Int. Cl.
 *E04B 1/76* (2006.01)
 *E04B 1/66* (2006.01)

(58) Field of Classification Search
 CPC ........ E04B 9/08; E04F 21/085; B29C 44/188; B65D 81/3266
 USPC .................................................... 52/743.13
 See application file for complete search history.

(56) References Cited

U.S. PATENT DOCUMENTS

| | | | | |
|---|---|---|---|---|
| 5,699,902 | A * | 12/1997 | Sperry | B65D 81/051 206/219 |
| 5,899,325 | A | 5/1999 | Bertram et al. | |
| 5,987,833 | A * | 11/1999 | Heffelfinger | E04B 1/767 383/211 |
| 5,996,782 | A * | 12/1999 | Sperry | B29C 44/183 206/219 |
| 6,099,948 | A * | 8/2000 | Paver, Jr. | B29C 44/185 428/304.4 |
| 6,245,176 | B1 | 6/2001 | Greenland | |
| 6,783,345 | B2 | 8/2004 | Morgan et al. | |
| 6,793,713 | B2 * | 9/2004 | Kretsinger | B01D 53/261 95/117 |
| 6,983,839 | B2 * | 1/2006 | Bertram | B29C 44/183 206/219 |
| 7,377,404 | B2 | 5/2008 | Cherfane | |
| 8,006,844 | B2 * | 8/2011 | McKinley | B29C 44/183 206/524 |
| 8,123,081 | B2 | 2/2012 | Swab et al. | |
| 8,882,483 | B2 | 11/2014 | O'Leary et al. | |
| 9,211,552 | B2 | 12/2015 | Gantenbein et al. | |
| 9,481,995 | B2 | 11/2016 | Bemis | |
| 9,546,037 | B1 | 1/2017 | Armes et al. | |
| 9,561,606 | B2 | 2/2017 | O'Leary et al. | |
| 2003/0079435 | A1 | 5/2003 | Lett et al. | |
| 2005/0029148 | A1 | 2/2005 | Rust | |
| 2007/0214739 | A1 | 9/2007 | Sherner | |
| 2012/0261053 | A1 | 10/2012 | O'Leary et al. | |
| 2013/0086868 | A1 | 4/2013 | Vandehey | |
| 2017/0080614 | A1 | 3/2017 | Lamm | |

OTHER PUBLICATIONS

International Search Report for PCT/US2019/064491, dated Feb. 6, 2020.

* cited by examiner

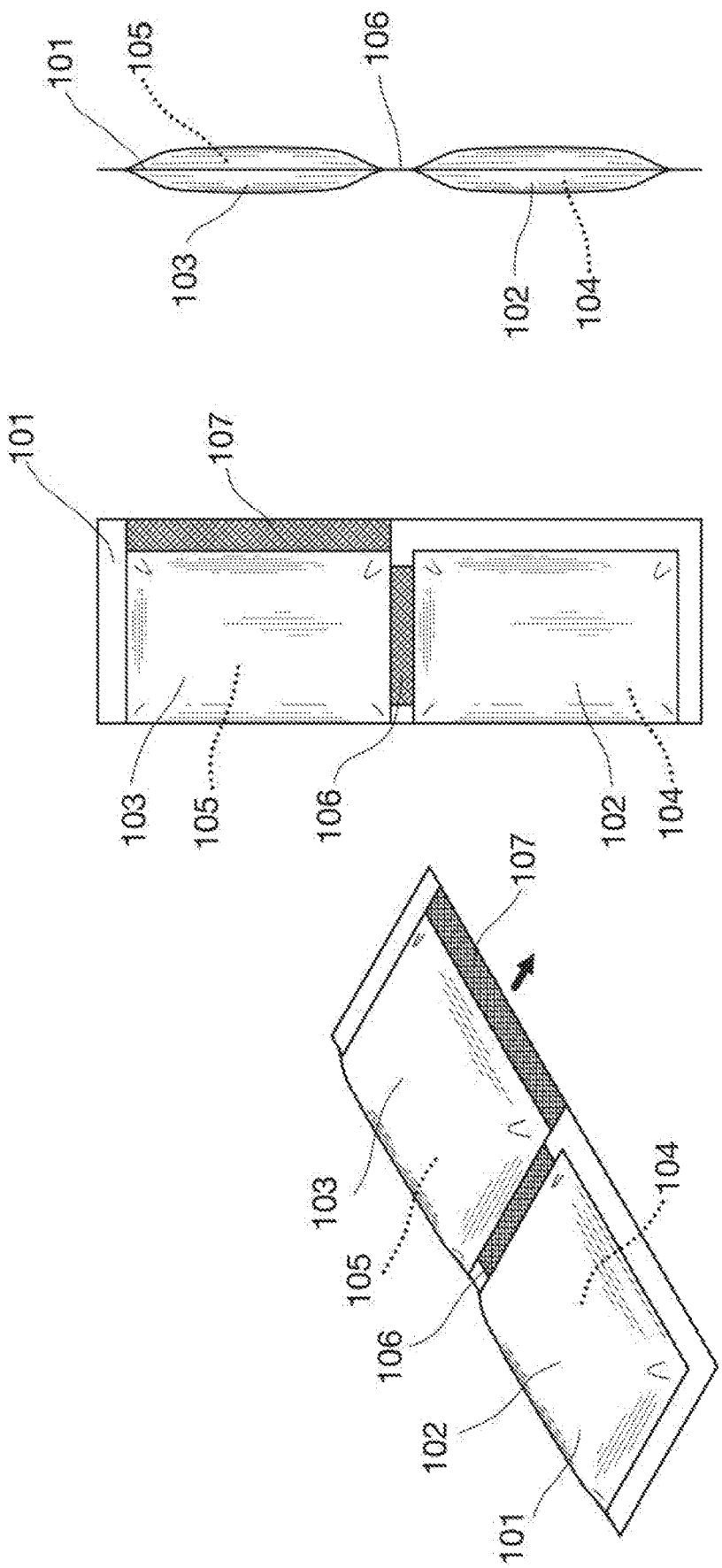

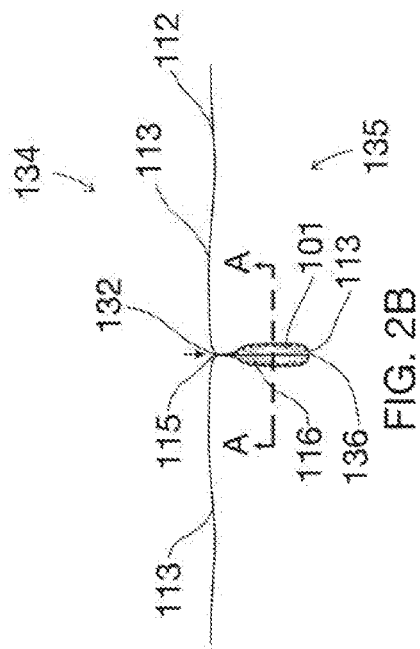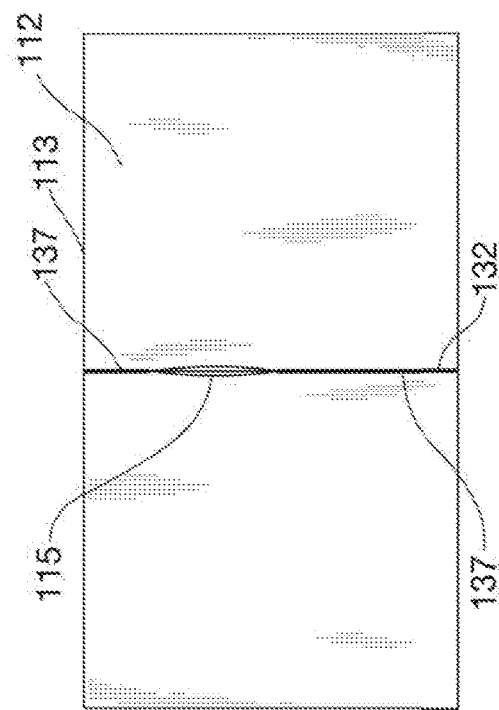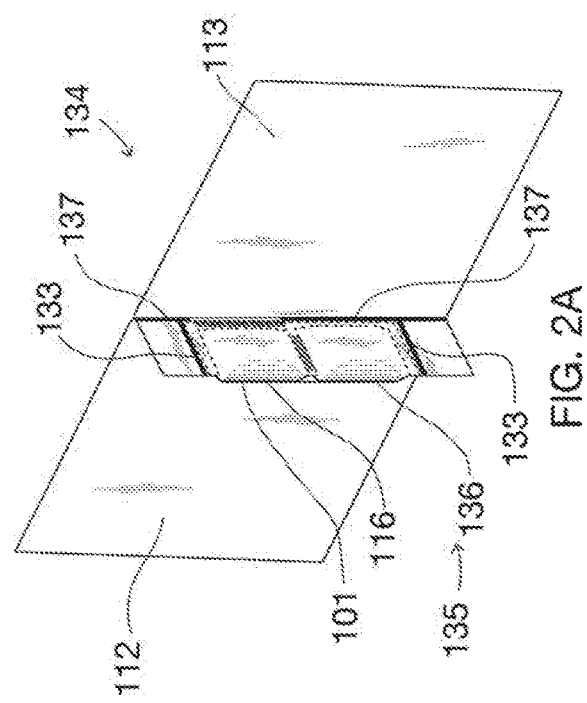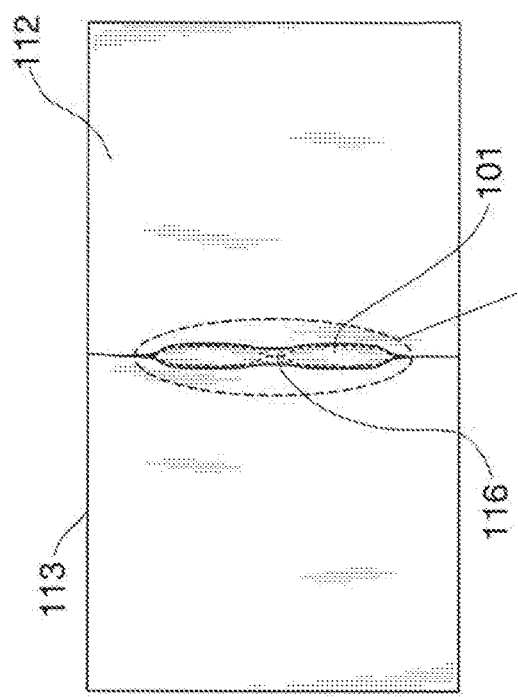

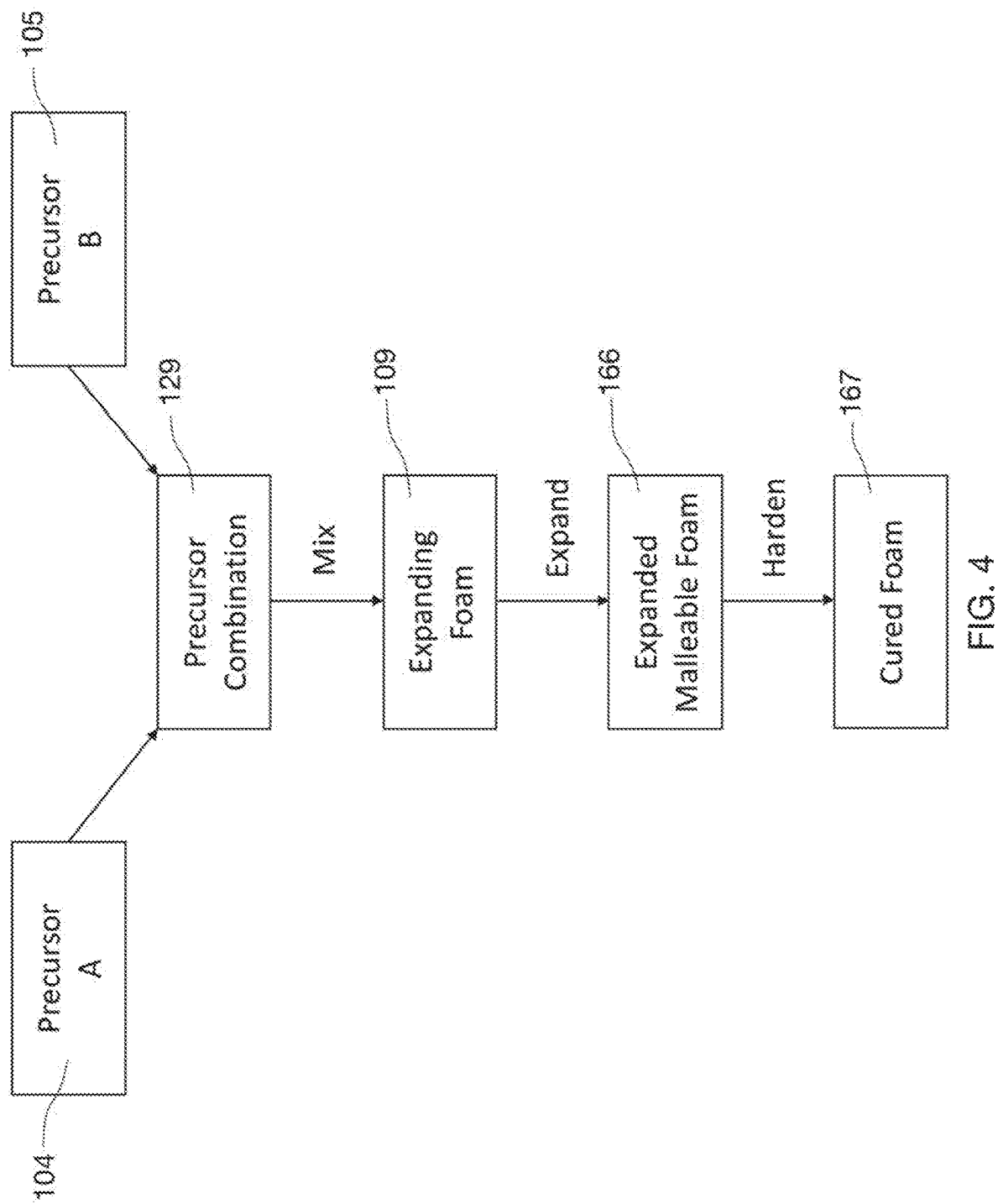

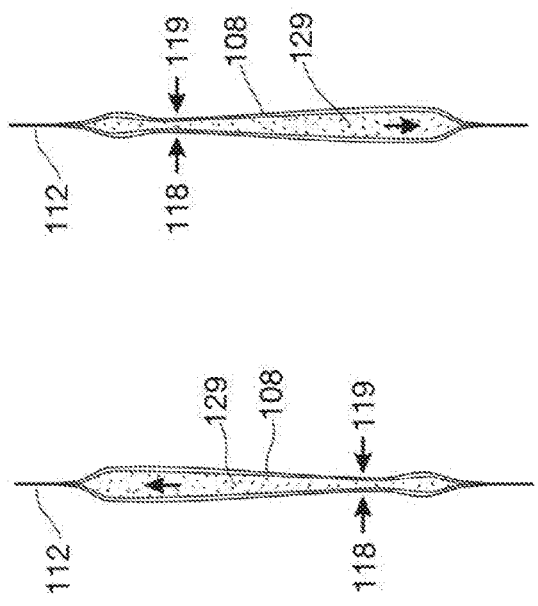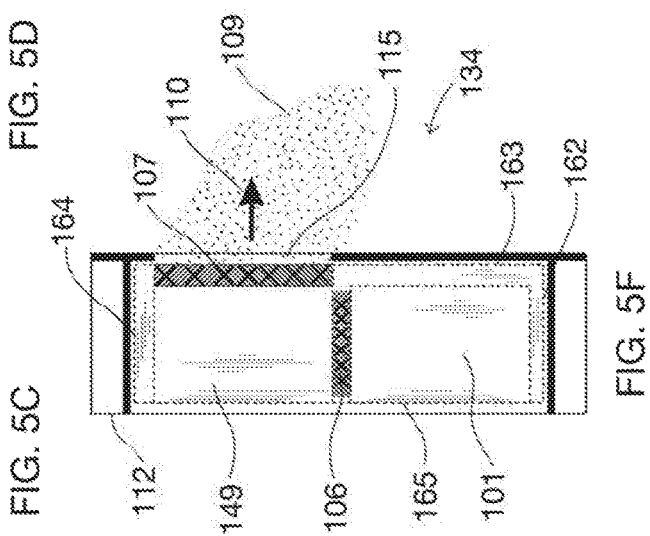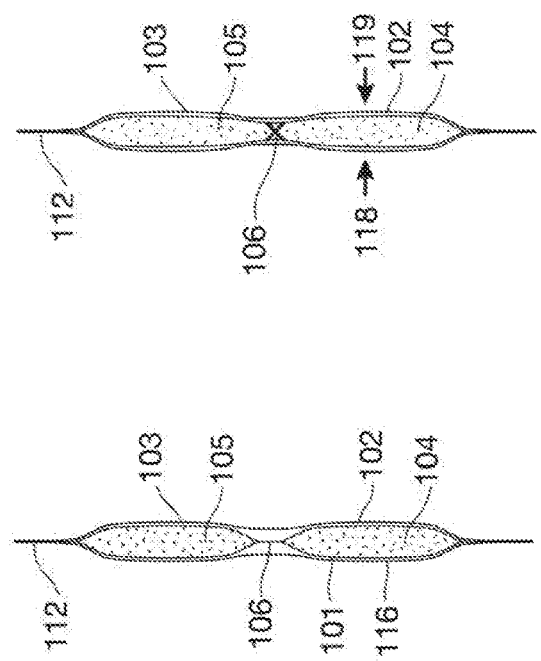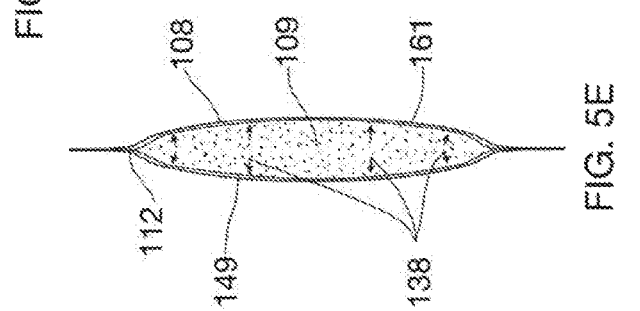

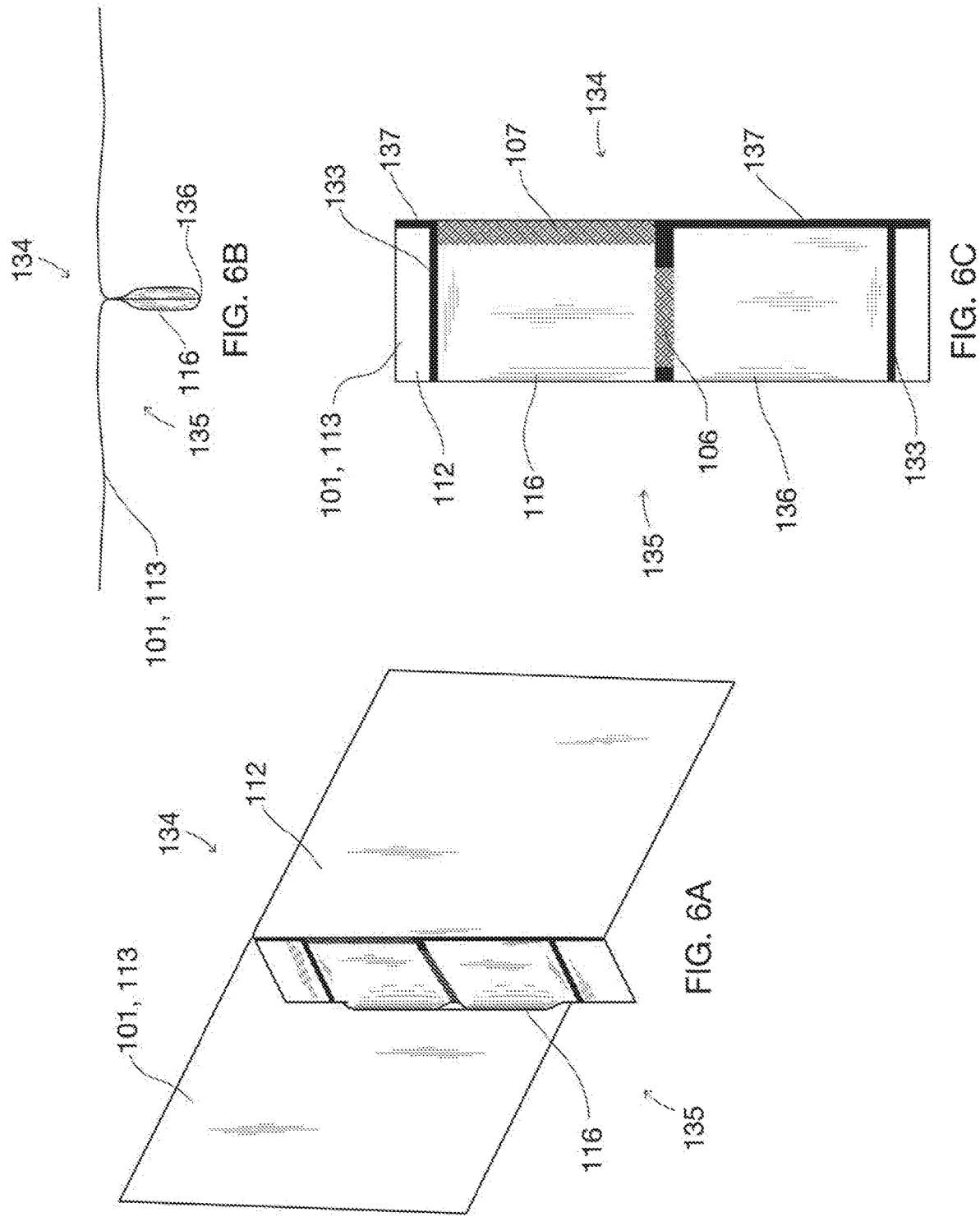

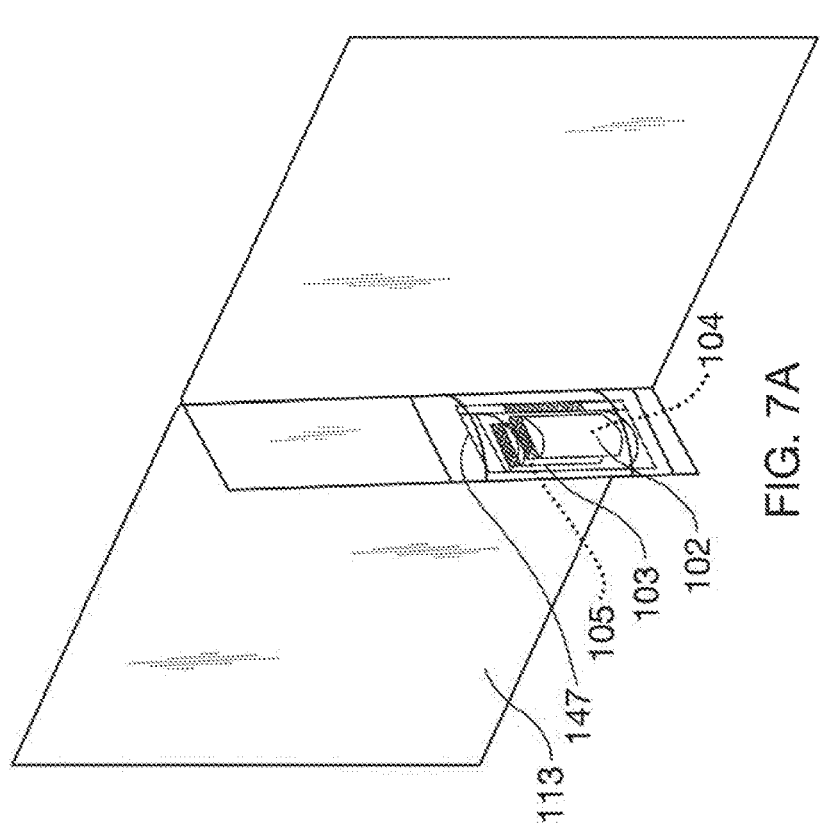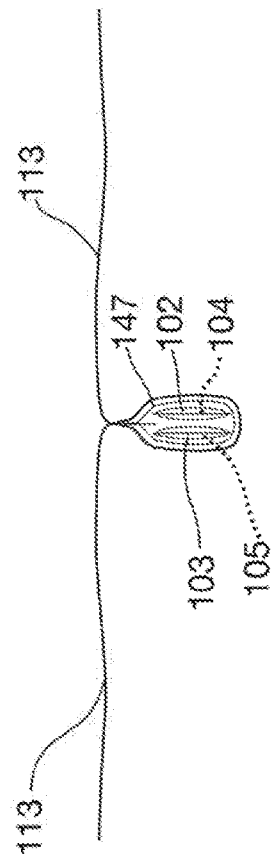

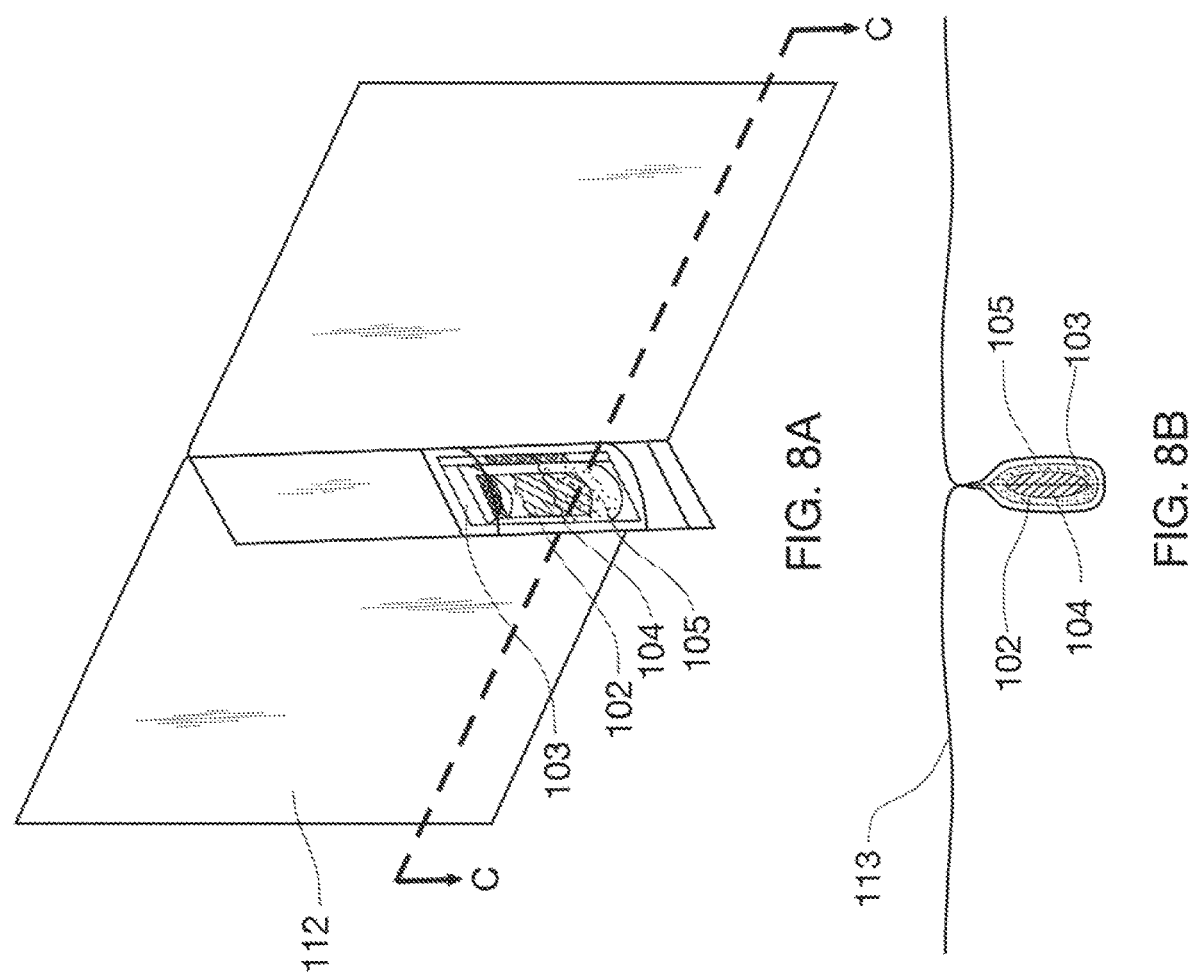

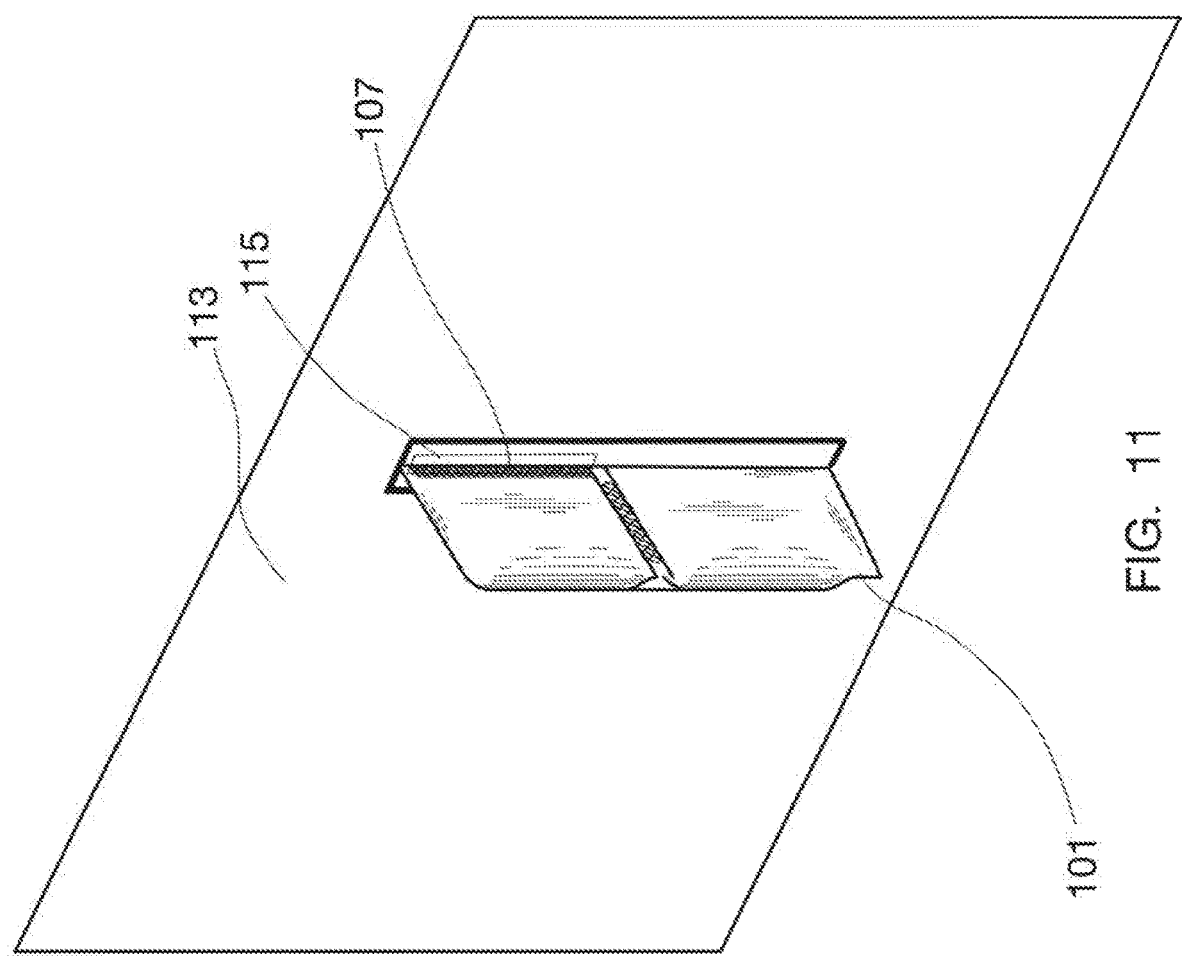

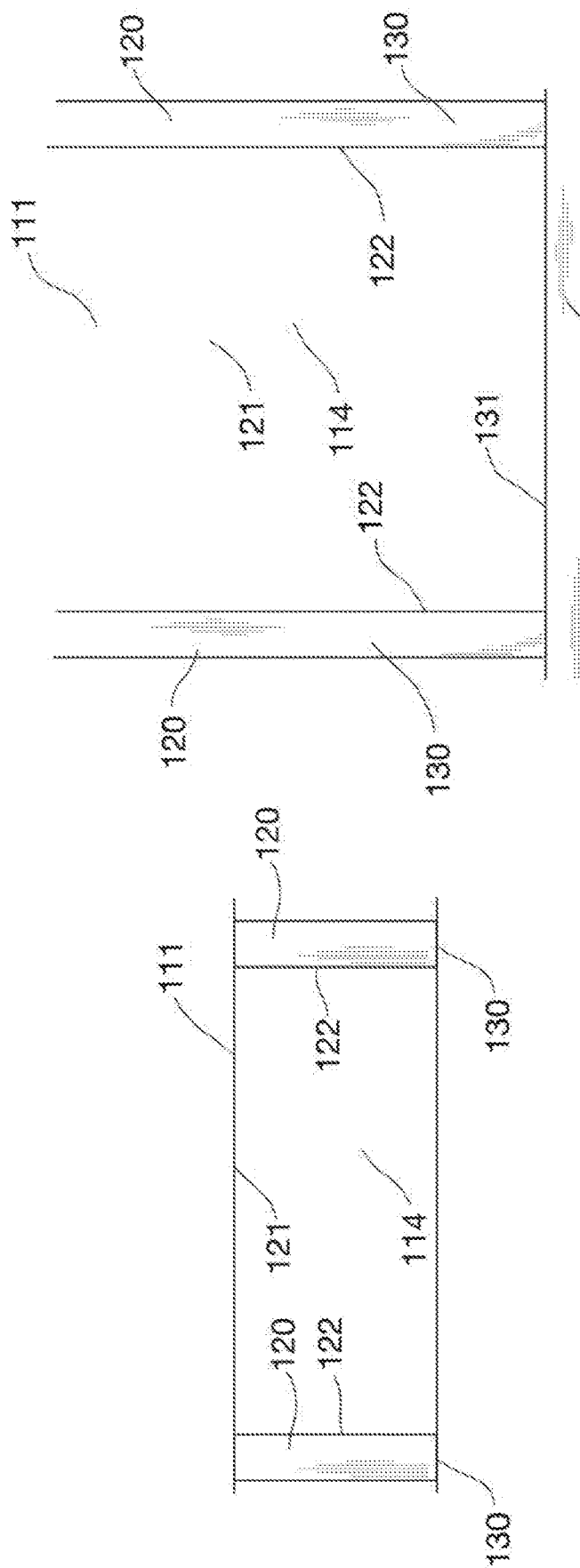

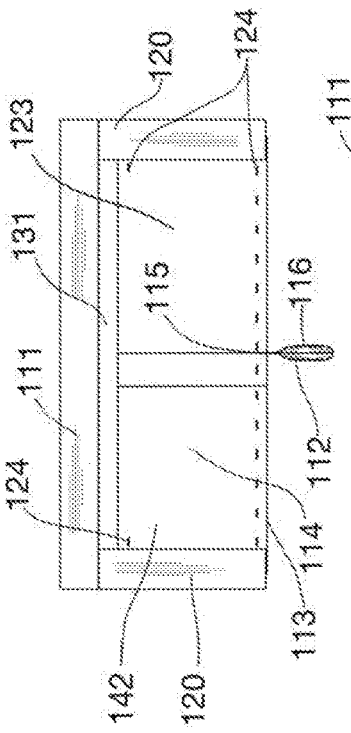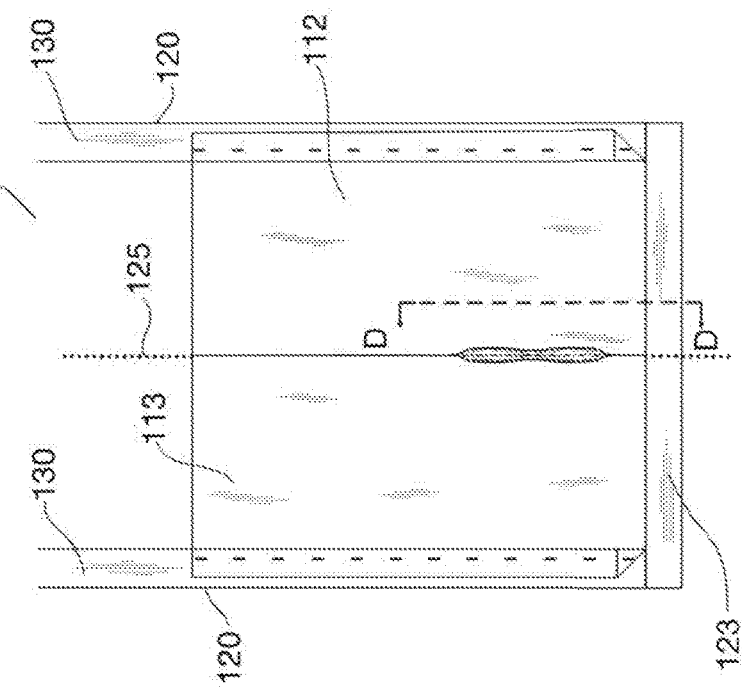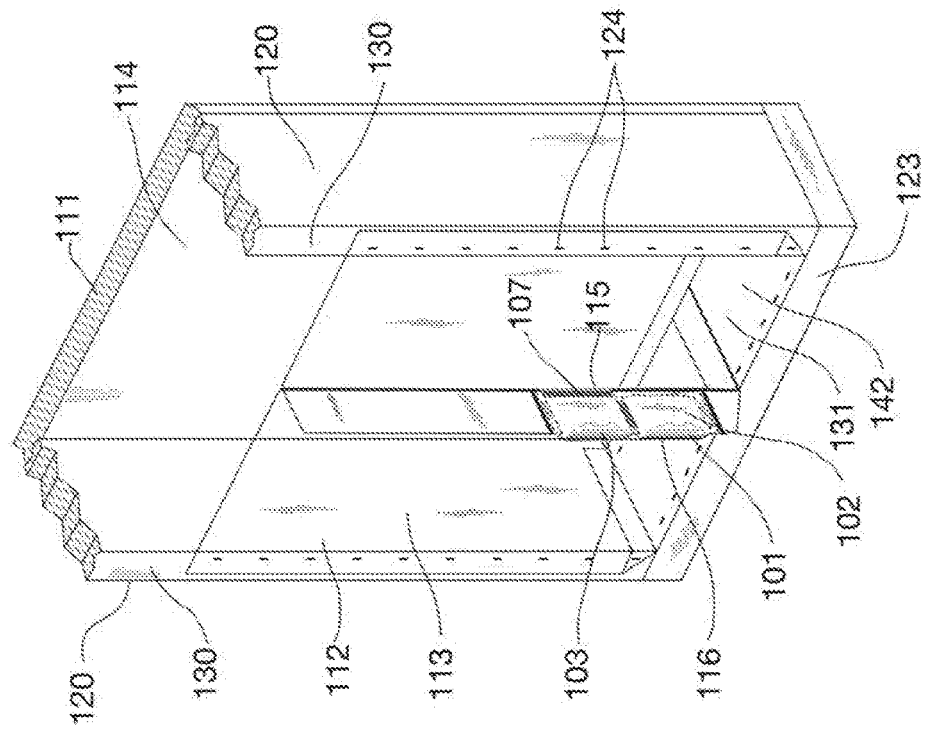

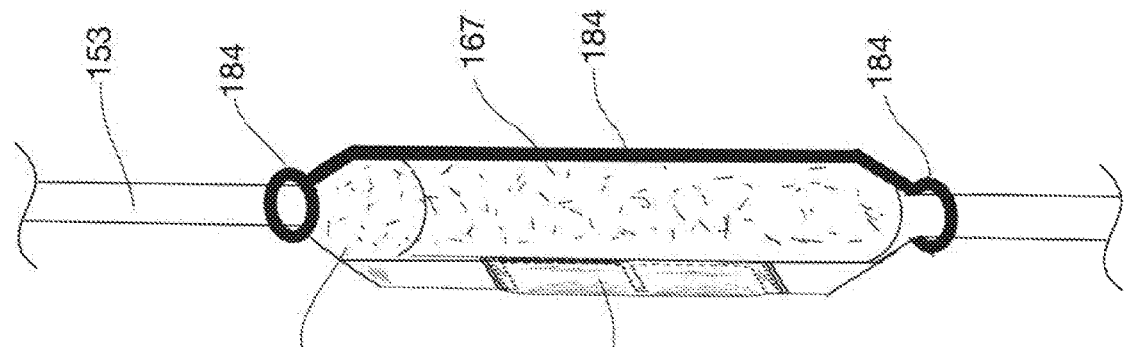
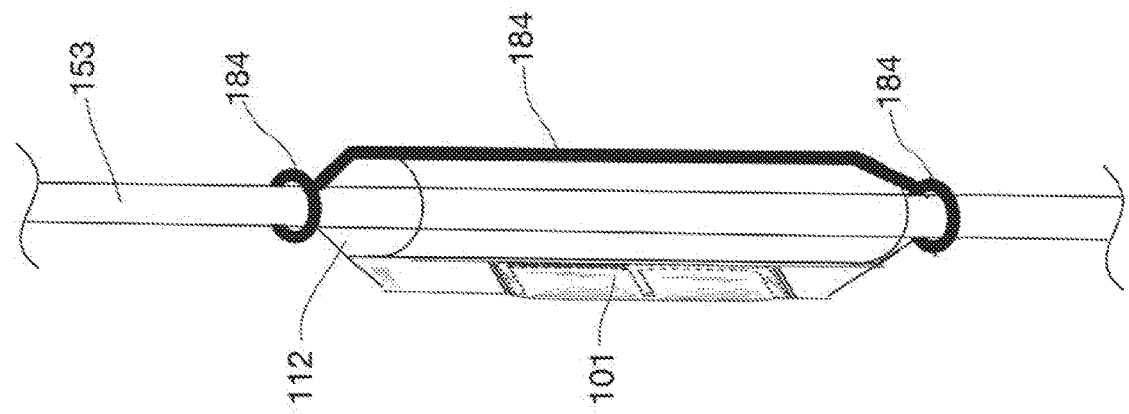
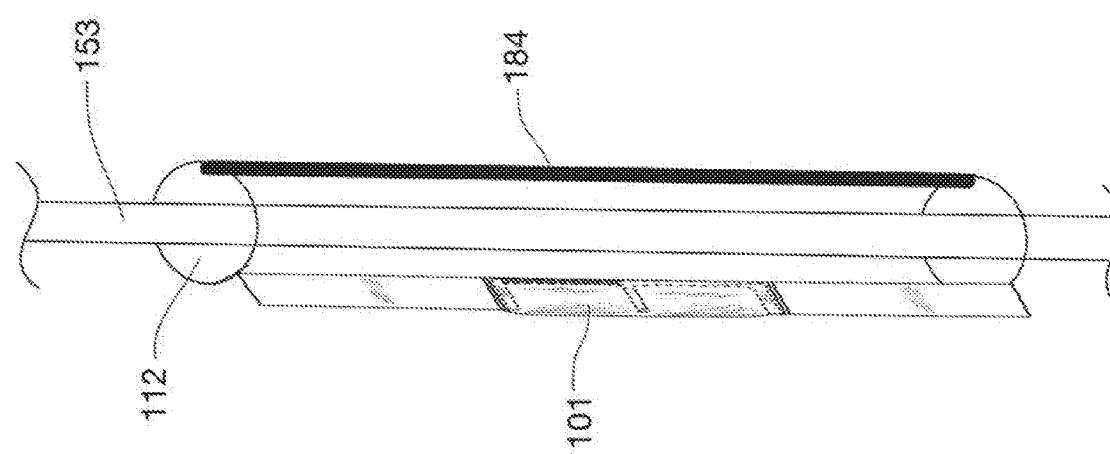

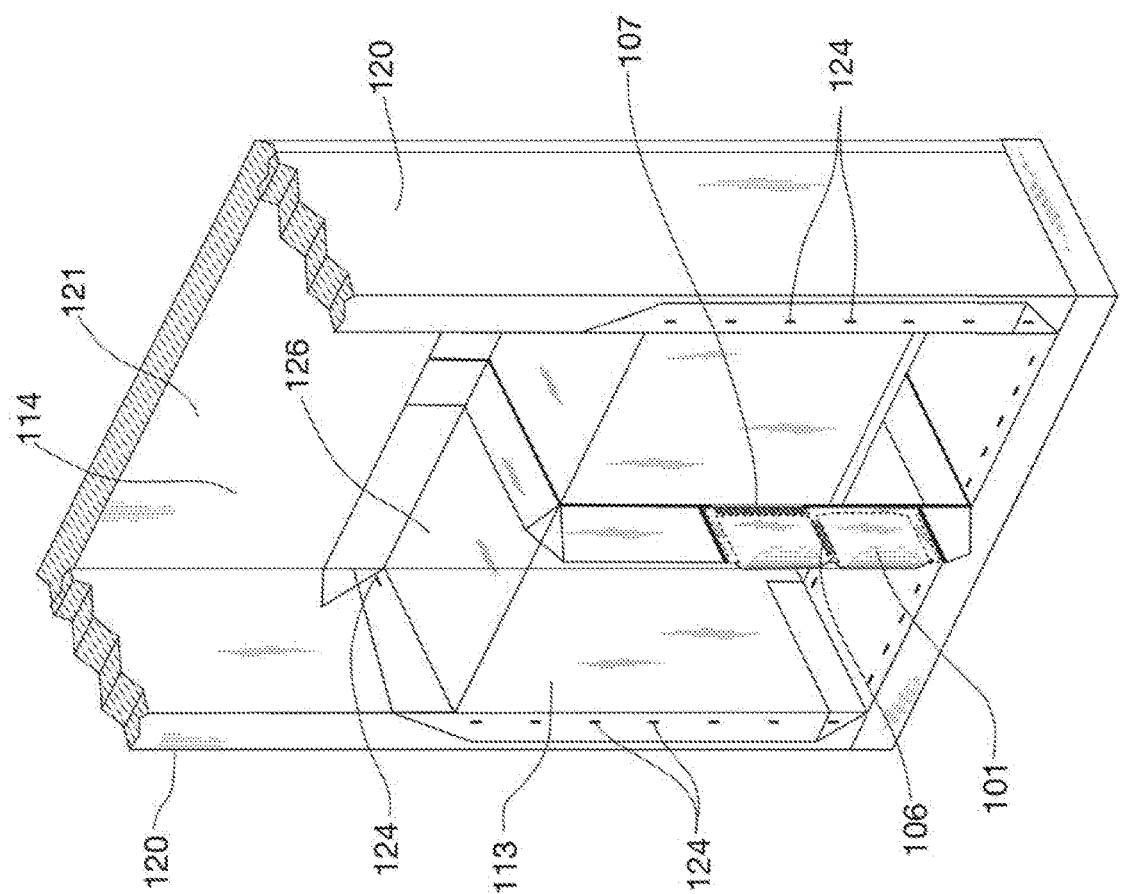

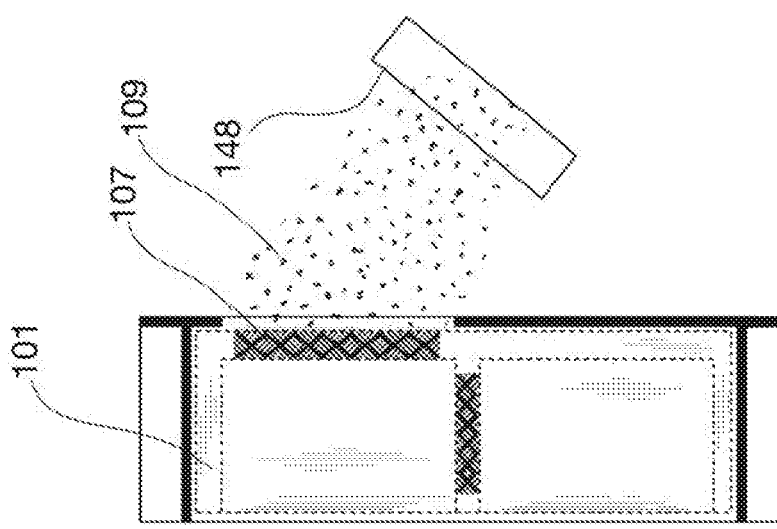
FIG. 18D
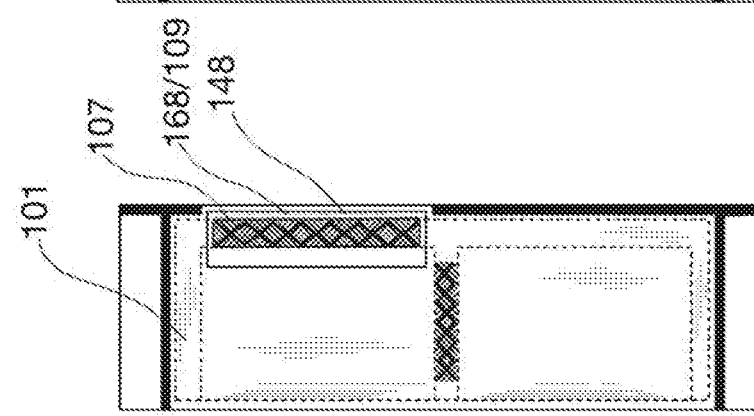
FIG. 18C
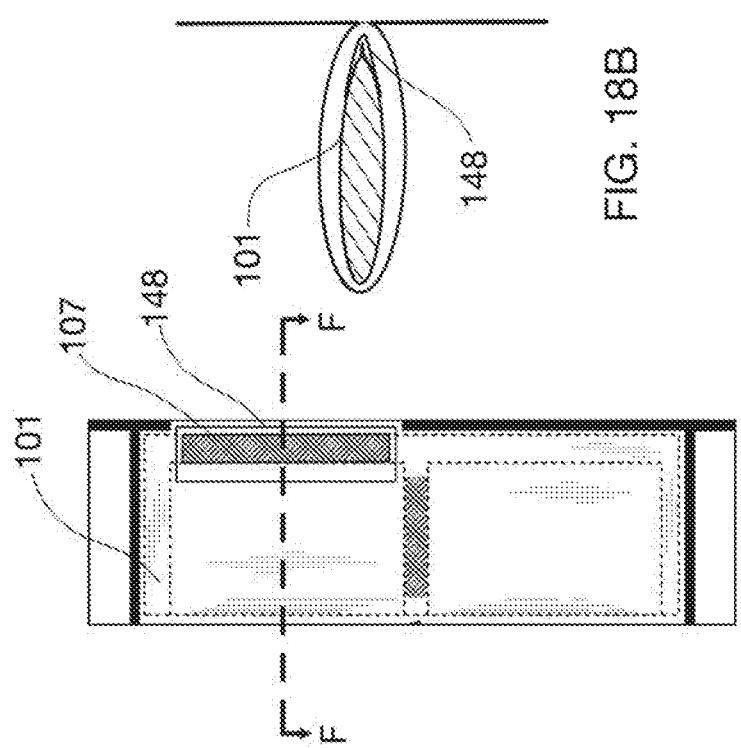
FIG. 18B
FIG. 18A

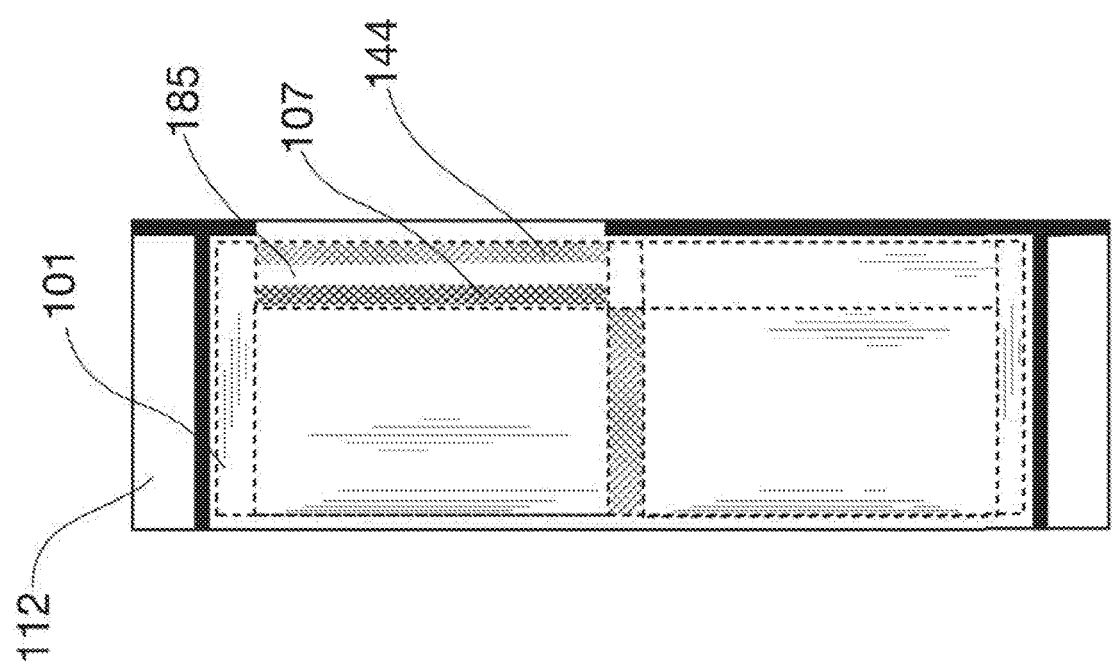

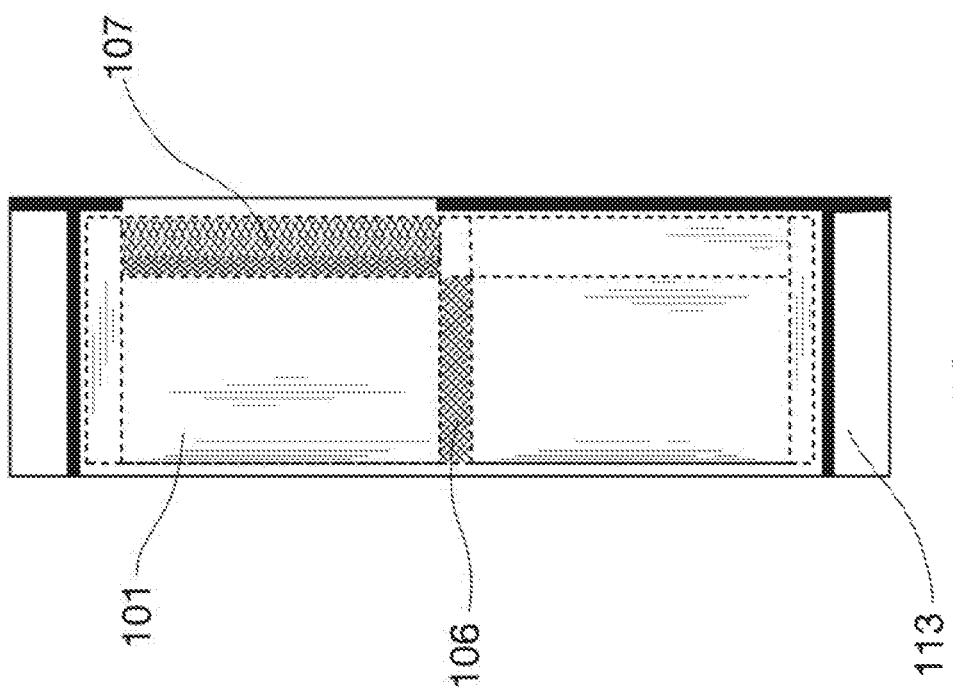

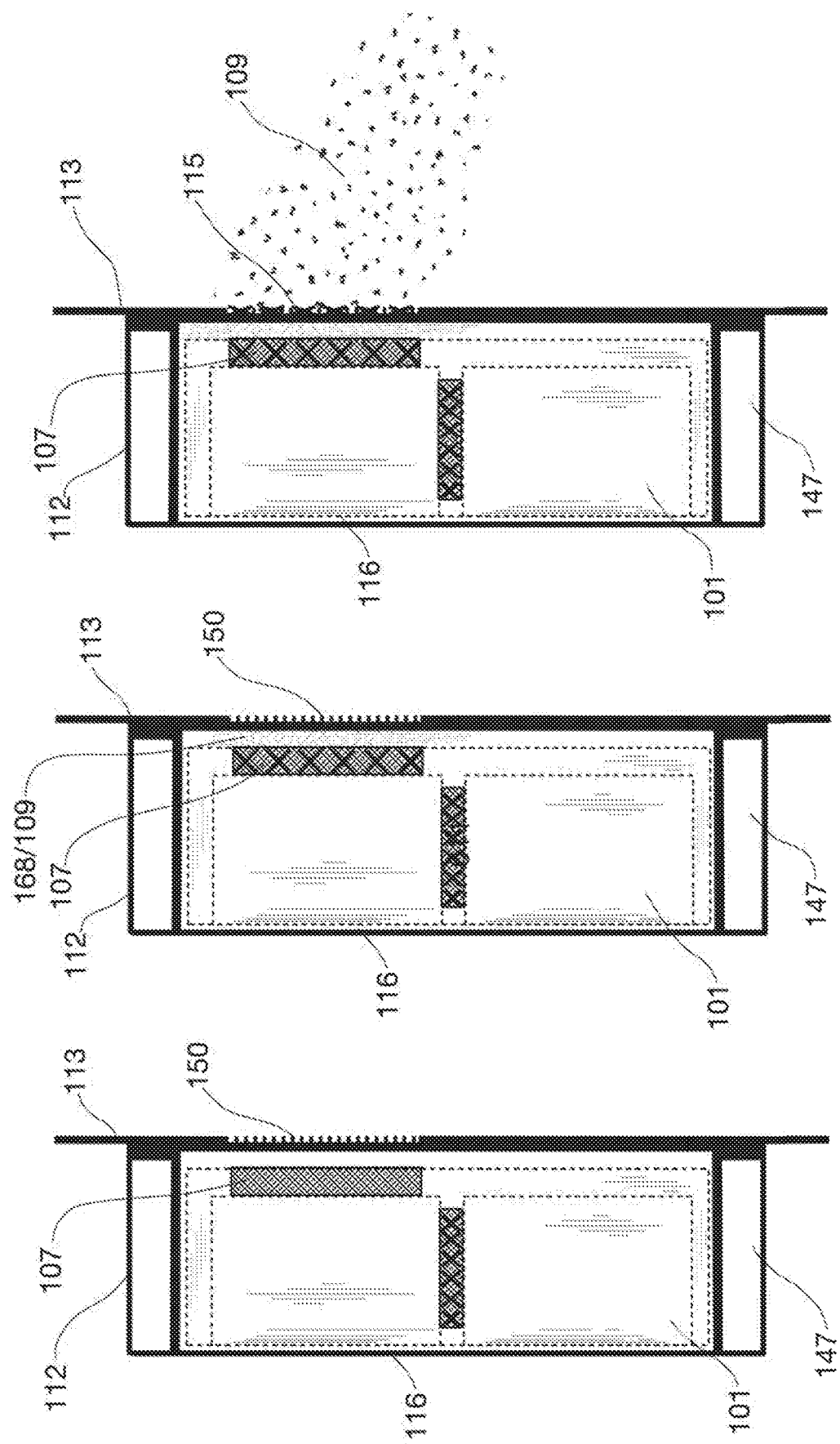

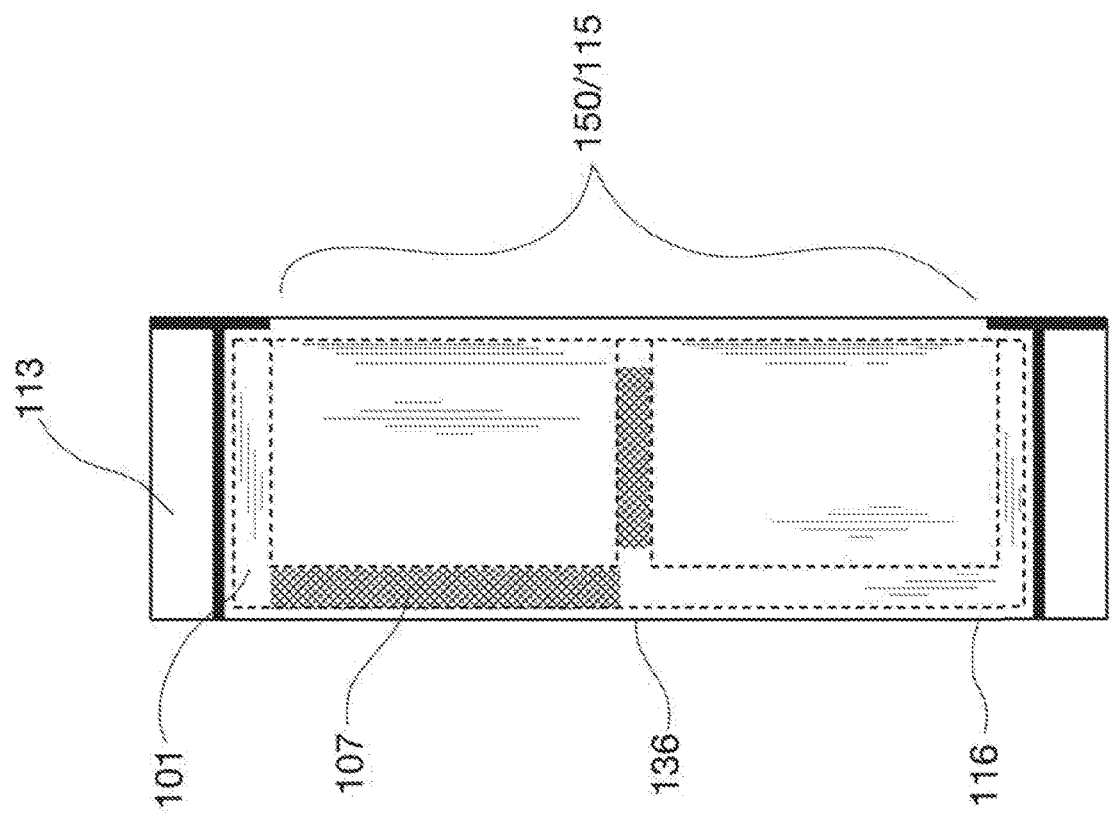

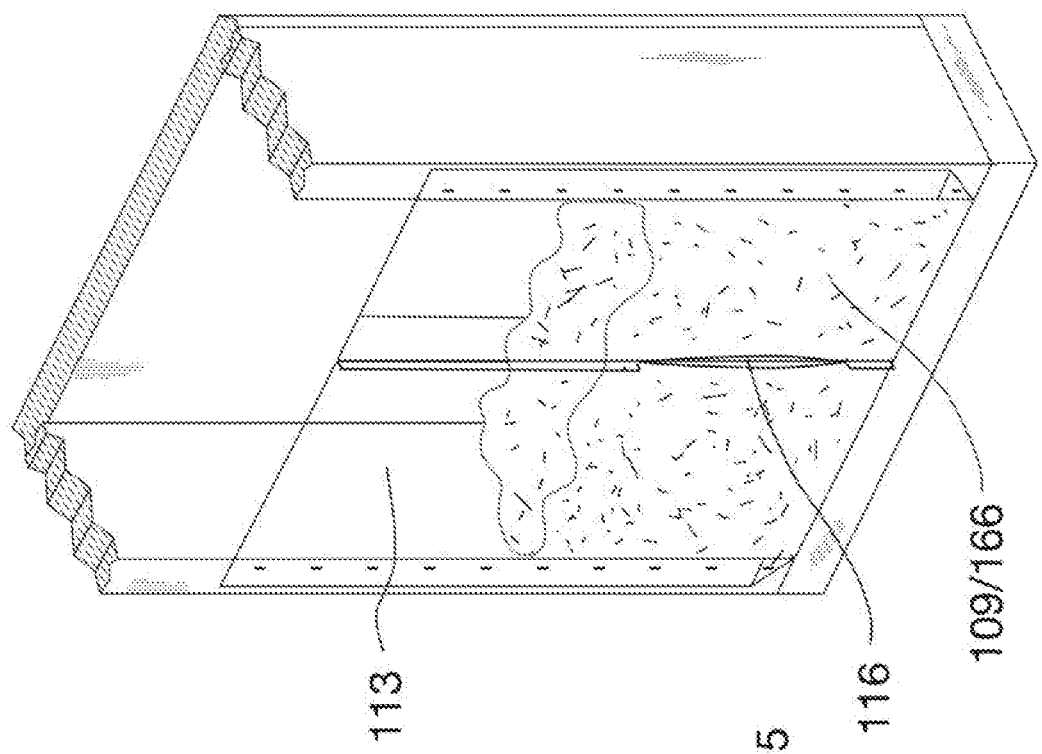
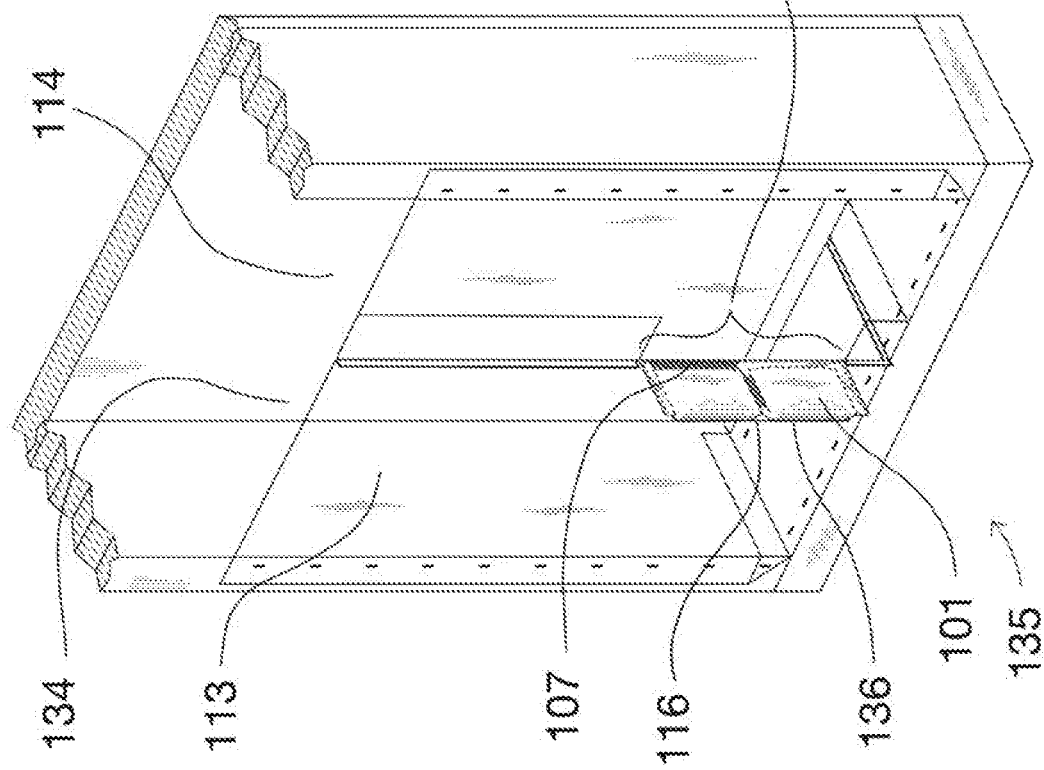
FIG. 25A
FIG. 25B

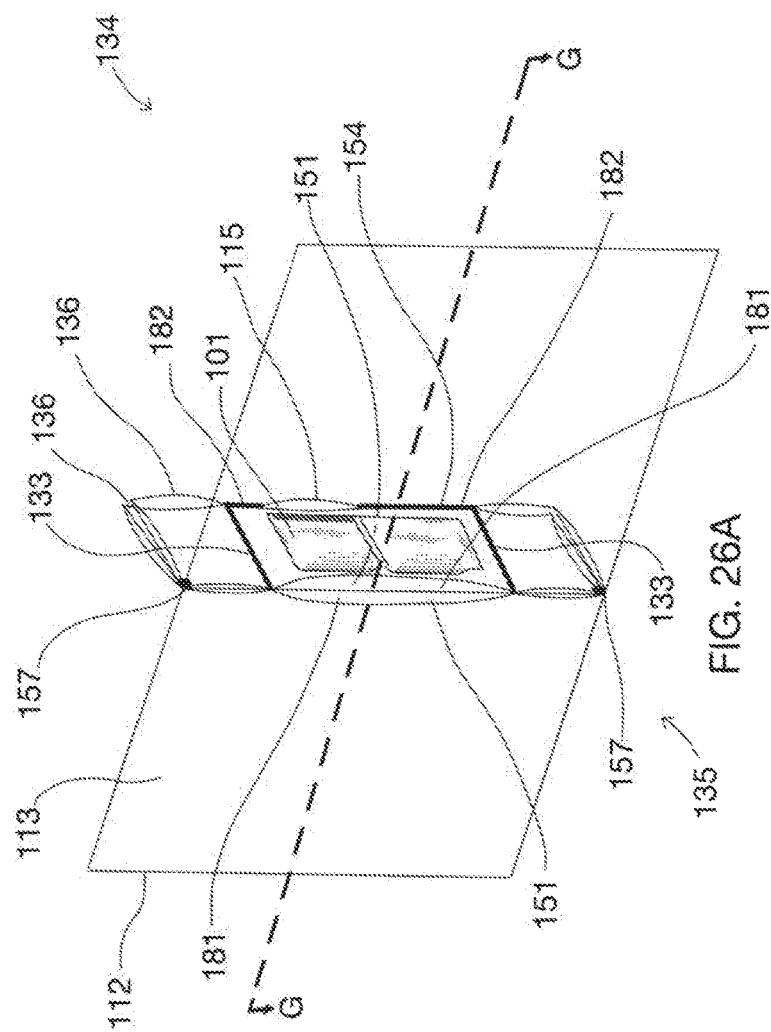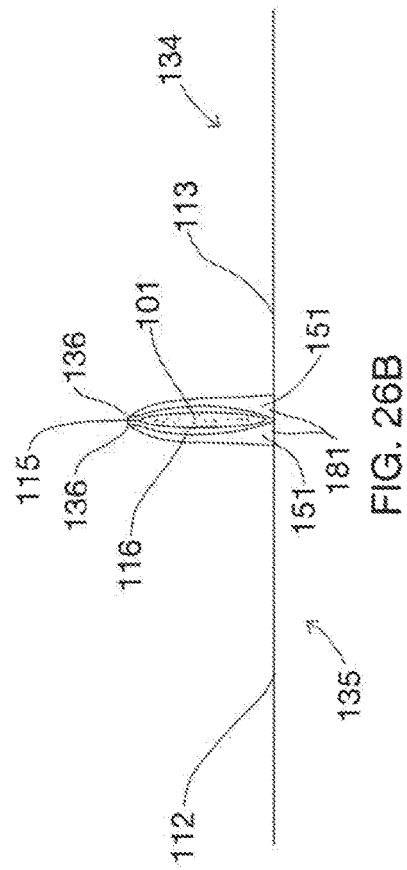

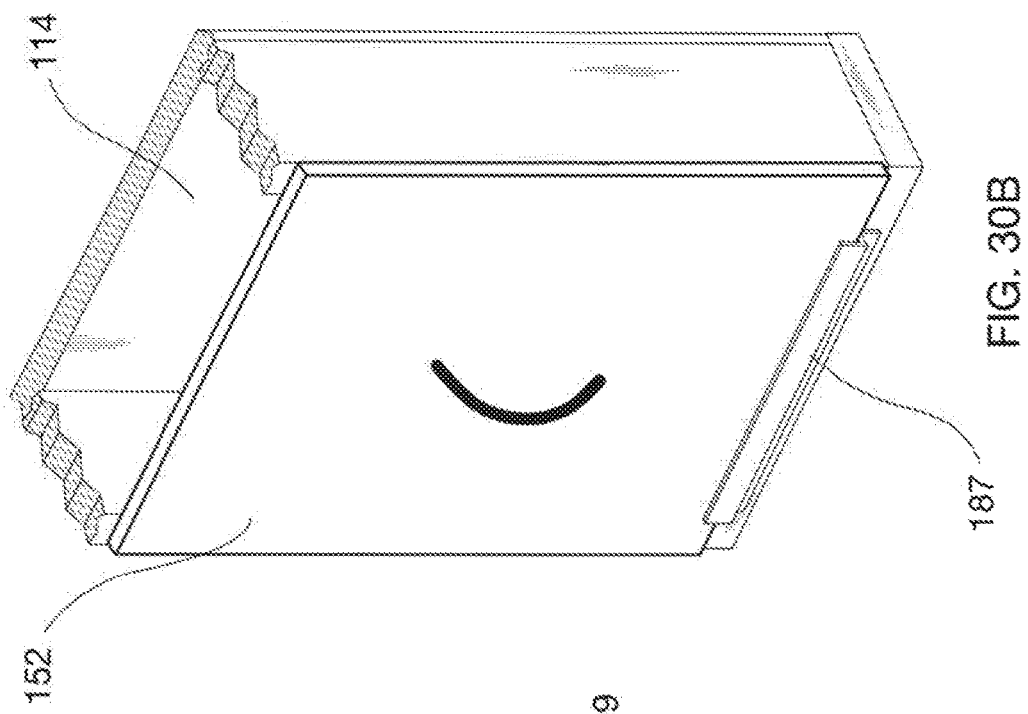
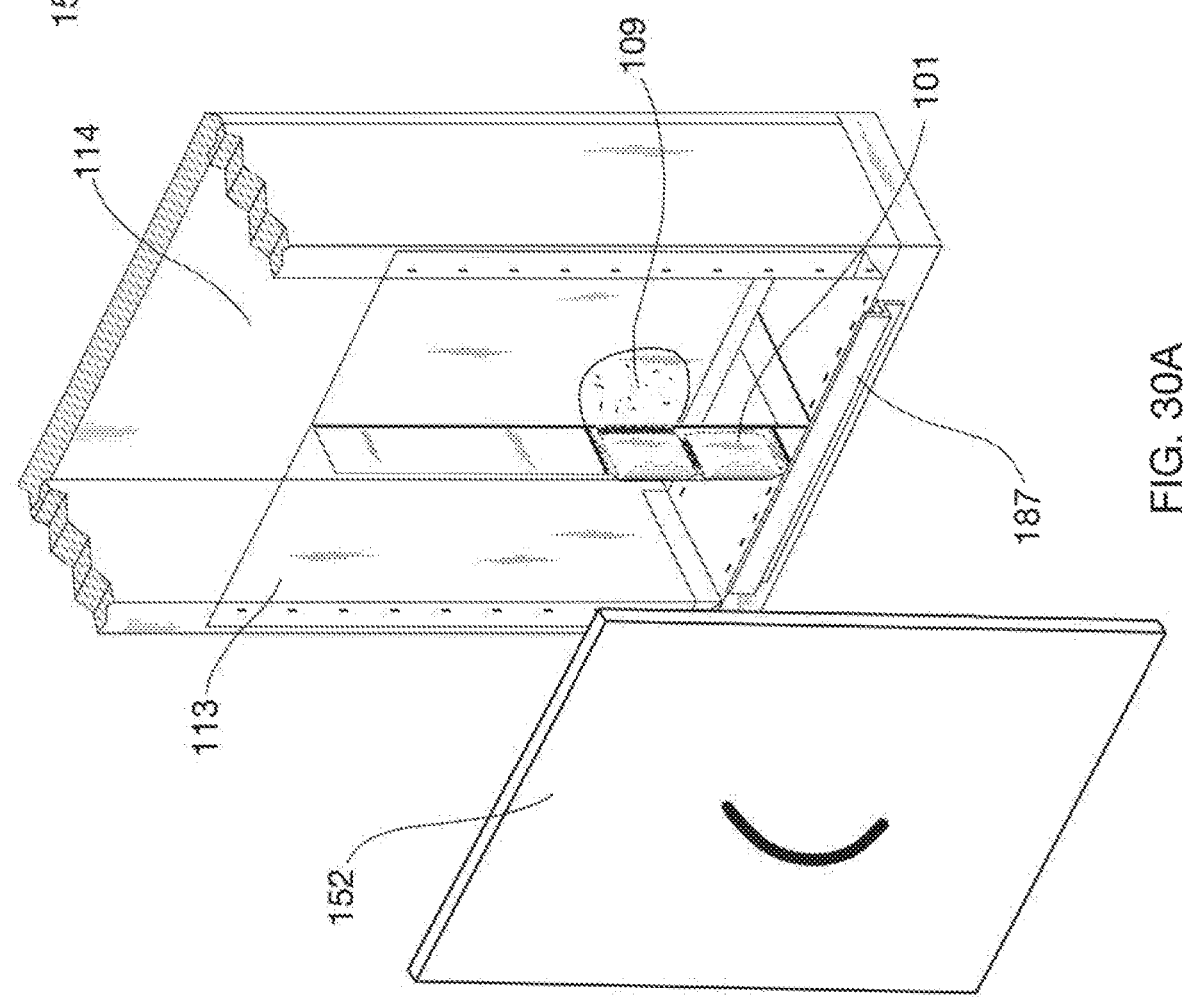
FIG. 30B
FIG. 30A

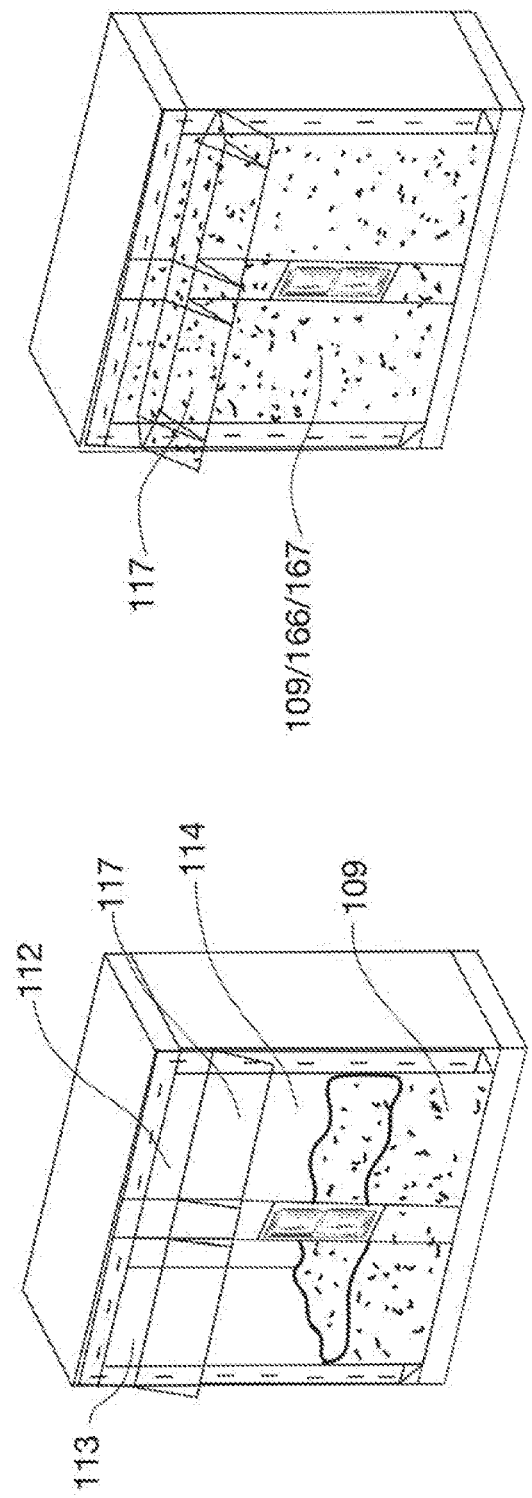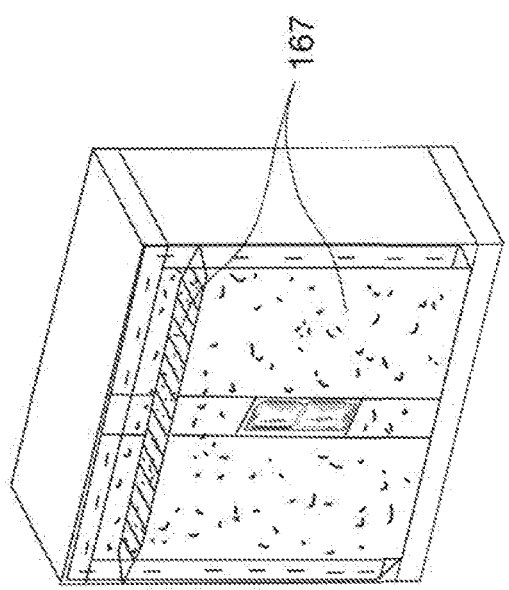
FIG. 32A
FIG. 32B
FIG. 32C

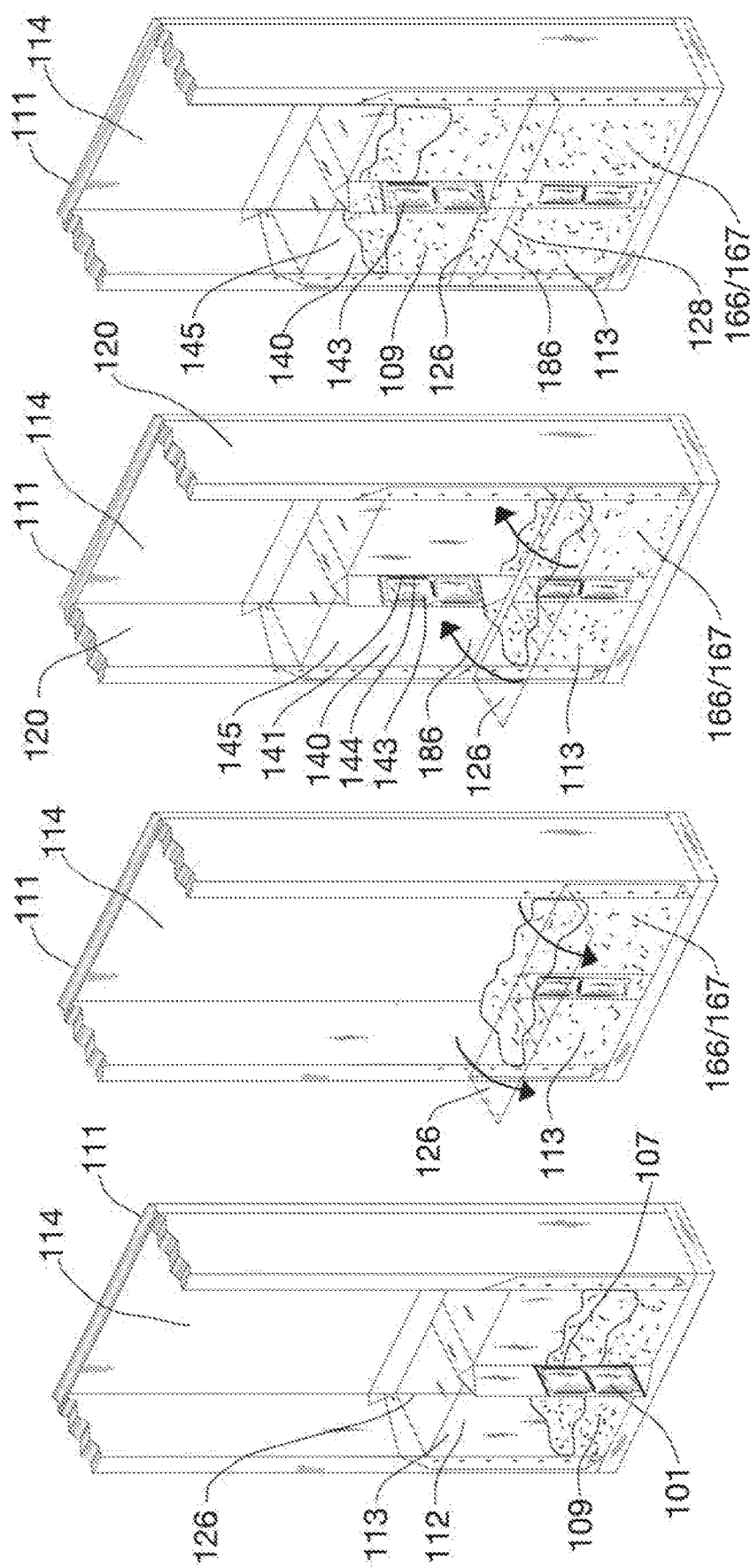

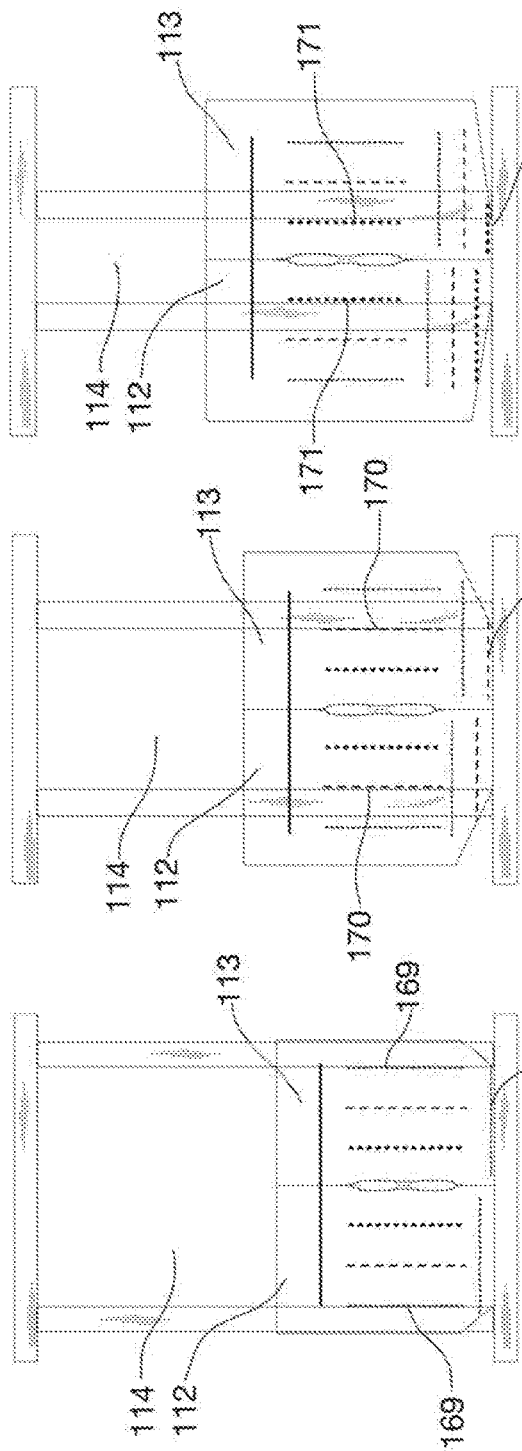
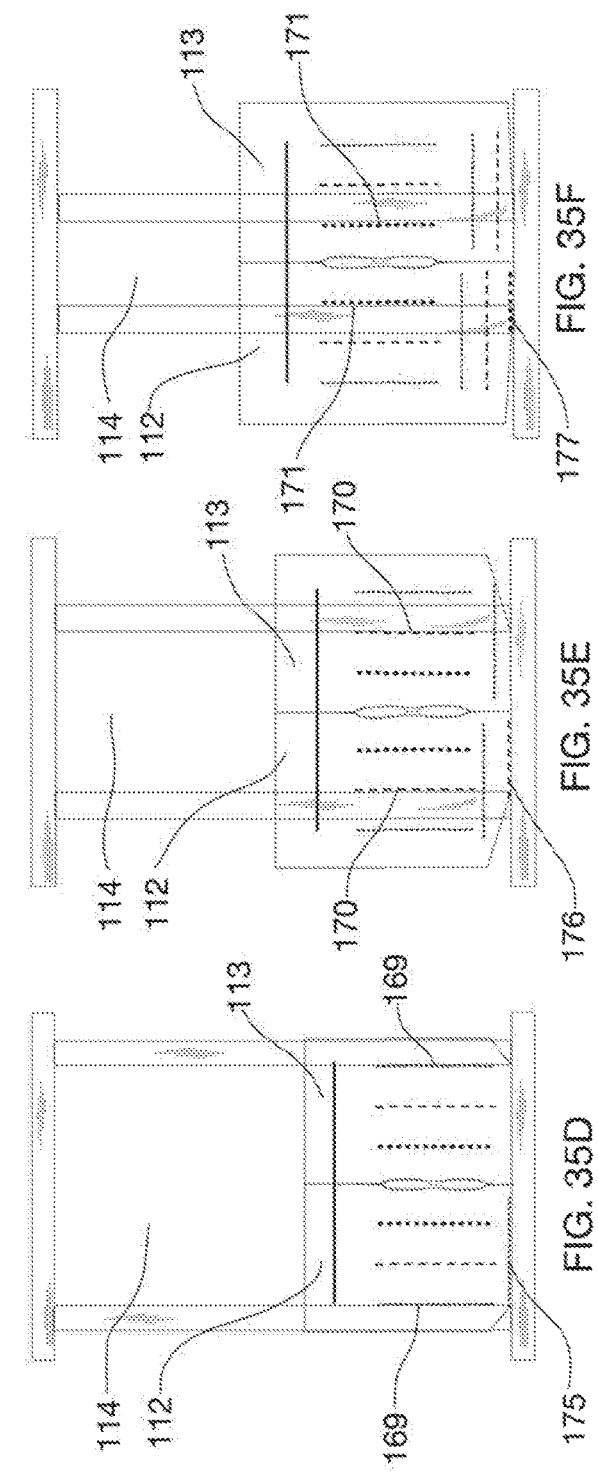

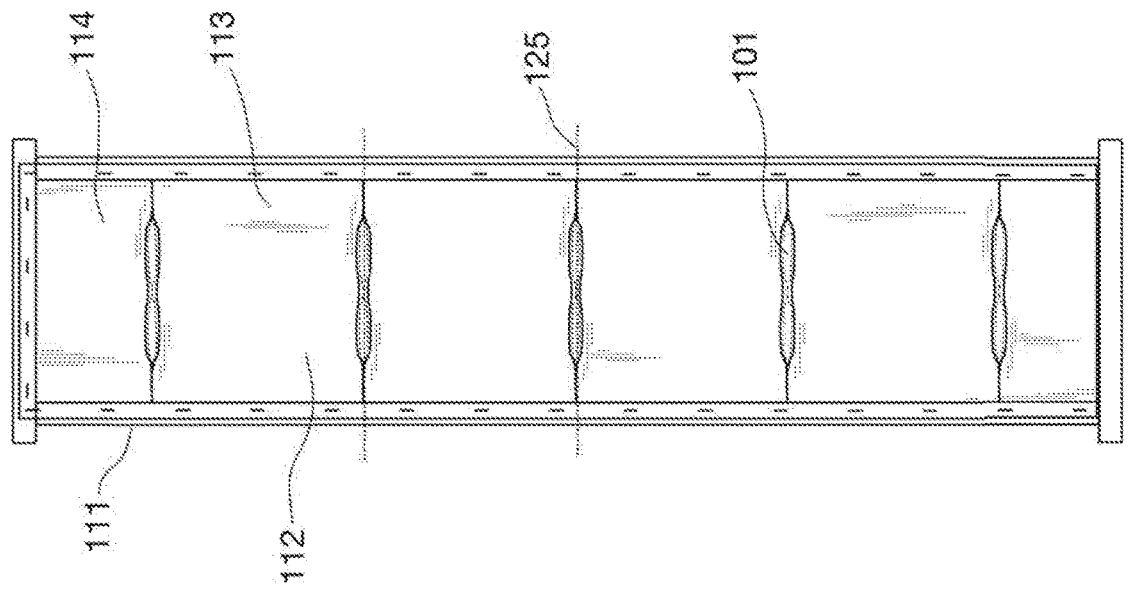

EXPANDING FOAM INSULATING SYSTEM AND METHOD

CROSS-REFERENCE TO RELATED APPLICATION(S)

This application claims priority to, and the benefit of, United States Provisional Application No. 62/779,975, filed Dec. 14, 2018, for all subject matter common to both applications. The disclosure of said provisional application is hereby incorporated by reference in its entirety.

FIELD OF THE INVENTION

The present invention generally relates to insulation systems. More specifically, the invention comprises a method and device for injecting a self-expanding foam onto a surface or into a cavity, such as a construction cavity, in a building or other structure, for insulation purposes.

BACKGROUND

In building construction, urethane foam is often used to seal any cracks and crevices and reduce conductive, radiant and convective heat transfer. Foam is vastly superior to other insulation as the foam is a rapidly expanding and highly adherent adhesive substrate (material) which seals and makes buildings airtight. The two main types of spray foam used are open and closed cell foam. Open cell foam is generally lower density and less expensive and has a lower thermal resistance than closed cell foam. Urethane foam is typically composed of two chemical precursors; an isocyanate component and a resin (generally polyol). These components react to produce a urethane polymer (polyurethane), steam and carbon dioxide. Various chemical foaming agents, such as catalysts and accelerators, may be incorporated into the foam components.

In the construction market foam is sprayed into wall, ceiling, and roof cavities utilizing high pressure delivery systems which mix and catalyze the chemicals. A typical setup involves remotely located chemical drums of A (isocyanate) and B (polyol) foam precursors, pneumatic pumps, heated delivery hoses and a handheld dispenser. The pumping equipment is located in an external truck which has its own electrical generator and air compressor to power the process. U.S. Pat. Nos. 8,123,081 B2 and 7,377,404 B2 disclose typical dispensing apparatus used in this method. Drawbacks to using spray foam involve the complexity and expense of the dispensing apparatus as well as the fact that isocyanate components create gases (vapors) which are hazardous to health. Furthermore, since the two foam components are mixed and dispensed in the field, the ratio of A to B can be other than the preferred ratio due to poor control over mixing (otherwise referred to as off-ratio), potentially resulting in an inferior foam, which can off-gas isocyanate and make the occupants of the building sick. Moreover, isocyanate crystalizes in the presence of air and dispensing equipment is prone to clogging and must be regularly maintained and cleaned to prevent problems. Typically before application, several test shots of foam are made to confirm the foam quality is correct. If the installer is inexperienced or does not realize the ratio is off, an entire building can have improperly catalyzed foam. There is a history of off-ratio foam being dispensed in this manner and requiring it to be removed after having sickened the building occupants.

Given that the cost of dispensing spray foam is significant, as described above, there are many do-it-yourself (DIY) products sold on the market. Such systems utilize pressurized canisters and dispensing guns which mix the two chemicals with static mixers. U.S. Pat. Nos. 9,211,552 B2 and 9,546,037 B1 detail dispensing guns and prior art spray foam systems. These systems make smaller jobs accessible to the homeowner but create hazardous waste as the pressurized canisters are not completely emptied and must be disposed of by the homeowner. Furthermore, the static mixers utilized by these systems clog easily and can create off-ratio foam which can outgas hazardous isocyanate vapors. They also have a relatively high fixed cost and because they are applied by hand the applicator must wear a full protective suit. Full protective suits are still needed for non-isocyanate urethane foams where the exposure level of the user is still high in spray applications.

U.S. Pat. Nos. 5,699,902 and 5,996,782 disclose a self-contained foam in bag system that has two foam precursors packaged within a flexible bag sealed on four edges to receive catalyzed foam from the combined precursors. Although this system is effective as a packaging product, it is ineffective as an insulating product where the expanding urethane foam is fully contained in a bag, restricting its ability to flow and fully fill corners and crevices. The sealing properties of the product are also compromised where the insulation is unable to adhere to surfaces such as walls of a cavity creating pathways around the expanded foam containing bag. U.S. Pat. Nos. 5,899,325 and 8,006,844 B2 similarly disclose foam in bag systems.

U.S. Pat. Nos. 8,882,483 B2 and 9,561,606 B2 disclose a contained foam envelope for insulating and sealing large volumes. The system includes an envelope having walls defining an interior which receive a foaming composition. In one iteration, a foaming composition is configured for insertion into the interior of the envelope. The envelope is configured such that the foaming composition expands the envelope such as to fill a large gap. A further iteration involves storing foam precursors in this envelope and yet a further iteration includes leak pores in the envelope to permit small amounts of foam to seep out to seal against the substrate. Since the foam insulation composition is enclosed and expands within an envelope, the envelope impedes the ability of the foam to flow and expand causing a reduction in the maximum expansion capability. Where the envelope restricts flow and produces variability in the volume and the density, it also limits the ability of the foam to fully expand in a cavity and to generate a proper air seal and insulation barrier as the effectiveness of the leak pores is also variable due to the limitations of the envelope, the position of the pores and the geometry and void locations in a cavity. The envelope further impedes the foam from filling a cavity when obstructions such as outlets, wiring, and pipes are present.

U.S. Pat. No. 6,983,839 B2 discloses a foam producing system in which two chemical precursors are separately packaged, and separated by a frangible seal. Manually applied pressure, such as by squeezing, is used to break the frangible seal and mix the precursors. The frangible seals are achieved by printing an ink pattern to selectively control the peel strength of the frangible seals as outlined in U.S. Pat. No. 6,983,839 B2. Another method of achieving a breakable seal is outlined in U.S. Pat. No. 6,245,176 B1, where a peelable plastic is zone sealed to the foil laminate.

In other known foam expansion systems, such as expanding foam for fence post installations, two chemical foam precursors are contained in a package and are separated by a frangible seal. One end of the package is pressed or rolled until the seal breaks. Then the ends of the package are alternately pressed to mix the chemicals. The package is then cut (such as with scissors) to allow the foam to escape from the package. This foam is not contained within a surrounding bag or sack.

SUMMARY

The present method and device are directed to the utilization of foam as an insulating component onto or over surfaces or into buildings or other structures, and more particularly to a self-contained foam generator which, when activated by a user, mixes and catalyzes foam for directing onto one or more surfaces or injecting into one or more cavities in a structure. In accordance with an embodiment of the present invention, the method and device provide for an accurate and consistent ratio of foam precursors that are mixed and catalyzed in an enclosed volume directly adjacent to the one or more surfaces or the one or more cavities, dramatically reducing the amount of chemical exposure (vapors or spray) for the installer and without the mess and waste typical of prior art systems.

Since the foam precursors are pre-packaged and mixed in an enclosed volume, the foam mixture is controlled such that the ratios are in the correct proportion with uniform and even mixing compared to the variable consistency of prior art systems and methods. There is no foam precursor drum chemical residue and no hoses, pumping apparatus or dispenser guns which are highly susceptible to clogging and require frequent cleanings. A further benefit of the system is realized when a common and more toxic foam precursor (isocyanate) is used and it is mixed into polyol before the foam expands and breaks the second frangible seal of the pressure-activated foam generator. This reduces the MDI (methylene diphenyl diisocyanate) exposure from the isocyanate compared to the spray foam process where the foam precursors are mixed inline and sprayed and atomized into the atmosphere. Finally, the present invention requires much lower investment than prior art solutions as there are no dispensing guns, air compressors, and pumps for creating insulation.

In accordance with example embodiments of the present invention, a system for insulating a stud or joist cavity of a structure is provided. The system comprises a sheet and a pressure-activated foam generator attached to the sheet. The sheet is sized, shaped, and configured for placement across an open area of the cavity to at least partially enclose the cavity, the sheet having a cavity facing side and an exterior facing side that is opposite the cavity facing side. The pressure-activated foam generator generates foam. The pressure-activated foam generator is attached to the sheet and disposed to provide foam to the cavity on the cavity facing side of the sheet. The pressure-activated foam generator includes a frangible output seal, wherein when the frangible output seal is intact the frangible output seal is a barrier between the pressure-activated foam generator and the cavity on the cavity facing side of the sheet, and when the frangible output seal is broken the broken frangible output seal is an access conduit from the pressure-activated foam generator to the cavity on the cavity facing side of the sheet. When the pressure-activated foam generator is activated, generated foam expands, breaks the frangible output seal, and passes through the broken frangible output seal and out to the cavity on the cavity facing side of the sheet.

In accordance with an aspect of the present invention, the structure comprises a wall, ceiling, or floor of a building.

In accordance with an aspect of the present invention, when the sheet is placed across the open area of the cavity, the generated foam flows into and collects in the cavity.

In accordance with an aspect of the present invention, the pressure-activated foam generator is formed as part of the sheet. In certain aspects, the sheet further includes a pocket that receives the pressure-actuated foam generator.

In accordance with an aspect of the present invention, the pressure-activated foam generator is disposed on the exterior facing side of the sheet and intersects with the sheet. In certain aspects, the sheet further includes an aperture disposed adjacent to the cavity which is fluidly coupled with the broken frangible output seal and forms a path for expanding foam from the pressure-activated foam generator to the cavity facing side of the sheet.

In accordance with an aspect of the present invention, the pressure-activated generator is disposed on the cavity facing side of the sheet. In certain aspects, the sheet further includes at least one opening providing access from the exterior facing side of the sheet to the pressure-activated foam generator disposed on the cavity facing side of the sheet.

In accordance with an aspect of the present invention, the pressure-activated foam generator is composed of two or more chambers, said chambers separated by one or more frangible mixing seals.

In accordance with an aspect of the present invention, the sheet is configured to be attached to a pair of studs or joists defining the stud or joist cavity. In certain aspects, the sheet is configured as a vapor retarder when attached to the pair of studs or joists.

In accordance with an aspect of the present invention, the sheet further includes indicator markings which guide positioning and use of the system.

In accordance with an aspect of the present invention, the sheet further includes excess material sized, shaped, dimensioned, and configured to completely cover an open side of the cavity.

In accordance with an aspect of the present invention, the sheet further includes excess foam containment volumes to accept excess foam that exceeds a volume of the cavity.

In accordance with an aspect of the present invention, the frangible output seal comprises varying strength across a width of the seal to aid in burst containment of the generated foam.

In accordance with an aspect of the present invention, the frangible output seal includes a plurality of recursive seals to aid in burst containment of generated foam.

In accordance with an aspect of the present invention, the system includes a plurality of pressure-activated foam generators spaced apart vertically.

In accordance with example embodiments of the present invention, a method for insulating a stud or joist cavity of a structure is provided. The method includes providing a first system for insulating the cavity as described above, covering the first part of the cavity with the first sheet; and activating the pressure-activated foam generator causing the pressure-activated foam generator to generate foam, wherein the generated foam expands, breaks the frangible output seal, and passes through the broken frangible output seal and into the first part of the cavity.

In accordance with an aspect of the present invention, covering the first part of the cavity comprises attaching the first sheet to a pair of studs or joists that define the cavity.

In accordance with an aspect of the present invention, the method further includes removing the first sheet from the first part of the cavity after the generated foam has substantially cured to a degree sufficient for it to remain structurally stable in the first part of the cavity.

In accordance with an aspect of the present invention, the first system has a plurality of pressure-activated foam generators spaced apart vertically and the method includes activating the plurality of pressure-activated foam generators starting at a bottommost pressure-activated foam generator and sequentially working upward. Wherein for each pressure-activated foam generator of the plurality of pressure-activated foam generators, the foam expands, breaks the frangible output seal, and passes through the broken frangible output seal into the cavity.

In accordance with an aspect of the present invention, the method further includes providing a second system for insulating a cavity as set forth above, mating the second sheet of the second system to the first sheet of the first system, covering the second part of the cavity with the second sheet of the second system; and activating the pressure-activated foam generator of the second system, causing the pressure-activated foam generator of the second system to generate foam wherein the generated foam of the second system expands, breaks the frangible output seal of the second system, and passes through the broken frangible output seal of the second system into the cavity.

In accordance with an aspect of the present invention, the method further includes removing the first sheet from the first part of the cavity and the second sheet from the second part of the cavity after the generated foam has substantially cured to a degree sufficient to be structurally stable in the cavity.

In accordance with an aspect of the present invention, the method further includes providing a forming device used in contact with the exterior facing side of the first sheet to form the generated foam as the foam fills the cavity. In certain aspects, the forming device can then be engaged against the exterior facing side of the first sheet to form the generated foam as the foam expands in the cavity and prior to final curing.

In accordance with example embodiments of the present invention, a method of insulating a cavity of a structure is provided. The method includes inserting expanding insulating foam into the first part of the cavity; placing a forming device against and in contact with a first part of a cavity in such a way that the forming device is a temporary barrier to the expanding insulating foam expansion and that provides a form structure that shapes expansion of the expanding insulating foam as desired; and removing the forming device from contact with the first part of the cavity after the expanding insulating foam has cured to a sufficient degree that it has stopped expanding.

In accordance with an aspect of the present invention, the forming device is placed against the structure to form the expanding foam to a desired thickness in the cavity.

In accordance with an aspect of the present invention, the method further includes providing a first sheet sized, shaped, and configured for placement across an open area of the cavity to at least partially enclose the first part of the cavity, the first sheet having a cavity facing side and an exterior facing side that is opposite the cavity facing side. In certain aspects, the first sheet is then connected to the structure so that the first sheet at least partially covers a first part of the cavity. The step of placing the forming device then further involves placing the forming device against and in contact with the exterior facing side of the first sheet to provide a form structure that shapes expansion of the expanding foam as desired by serving as a barrier to foam expansion in target areas. In certain further aspects, the first sheet can be removed from the first part of the cavity after the expanding foam has substantially cured to a degree sufficient to be structurally stable in the first part of the cavity. In other aspects, a second sheet is provided. The second sheet sized, shaped, dimensioned, and configured for placement across an open area of the cavity to at least partially enclose a second part of the cavity, the second sheet having a cavity facing side and an exterior facing side that is opposite the cavity facing side. The second sheet is mated to the first sheet and connected to the structure to cover the second part of the cavity. Expanding foam insulation is then inserted into the second part of the cavity covered by the second sheet. The forming device is then placed against and in contact with the exterior facing side of the second sheet to provide a form structure that shapes expansion of the expanding foam as desired by serving as a barrier to foam expansion in target areas. In further aspects, the method includes removing the first sheet from the first part of the cavity and the second sheet from the second part of the cavity after the expanding foam has substantially cured to a degree sufficient to be structurally stable in the cavity.

BRIEF DESCRIPTION OF THE FIGURES

These and other characteristics of the present invention will be more fully understood by reference to the following detailed description in conjunction with the attached drawings, in which:

FIG. 1A is a perspective view of a prior art pressure-activated foam generator;

FIG. 1B is a side elevation view of a prior art pressure-activated foam generator;

FIG. 1C is a front elevation view of a prior art pressure-activated foam generator;

FIG. 2A is a perspective view of a device for applying insulation onto a surface or into a cavity;

FIG. 2B is a top plan view of the device;

FIG. 2C is a front elevation view of the device;

FIG. 2D is a rear elevation view of the device;

FIG. 4 is a flow chart for the generation of cured foam;

FIG. 5A is a cross-sectional view along the Line A-A of FIG. 2B;

FIG. 5B is a cross-sectional view as in FIG. 5A showing the rupture of a frangible mixing seal;

FIG. 5C is a cross-sectional view as in FIG. 5A showing foam precursors being mixed;

FIG. 5D is a cross-sectional view as in FIG. 5A showing foam precursors continuing to be mixed;

FIG. 5E is a cross-sectional view as in FIG. 5A showing foam being generated;

FIG. 5F is a side elevation view showing foam flowing out of the pressure-activated foam generator;

FIG. 6A is a perspective view of a device where the precursors are contained within a sheet;

FIG. 6B is a top plan view of the device of FIG. 6A;

FIG. 6C is a detailed side view of the device of FIG. 6A;

FIG. 7A is a perspective view of an alternate device where the foam precursors are contained in separate flexible containers within a sheet;

FIG. 7B is a top plan view of the device of FIG. 7A;

FIG. 8A is a transparent perspective view of an alternate device where a foam precursor is in a flexible container containing another flexible container with the other foam precursor;

FIG. 8B is a cross-sectional view along the Line C-C of the device of FIG. 8A;

FIG. 11 is a perspective view of an alternate embodiment of a device with a pressure-activated foam generator attached or fused to a sheet;

FIG. 12A is a top plan view of a portion of a structure having a cavity portion;

FIG. 12B is a front elevation view of the structure and cavity portion;

FIG. 13A is a perspective view of a structure and cavity portion with the device installed;

FIG. 13B is a top plan view of the structure and cavity portion with the device installed;

FIG. 13C is a front elevation view of the structure and cavity portion with the device installed;

FIG. 15A is a perspective view of an alternate device in a wrapped configuration;

FIG. 15B is a perspective view of an alternate device secured in a wrapped configuration;

FIG. 15C is a perspective view of an alternate device secured in a wrapped configuration after activation and after the foam having achieved a cured state;

FIG. 17 is a perspective view of the structure and cavity portion with the device installed;

FIG. 18A is a detailed side view of an alternate embodiment of a device featuring a splatter guard;

FIG. 18B is a detailed cross-sectional view along the Line F-F of FIG. 18A

FIG. 18C is a detailed side view of an alternate embodiment of a device featuring a splatter guard to capture the spray produced by the rupture of a frangible output seal;

FIG. 18D is a detailed side view of an alternate embodiment of a device where the splatter guard breaks away from the pressure-activated foam generator as foam expands and flows;

FIG. 19 is a detailed side view of an alternate pressure-activated foam generator featuring a secondary frangible output seal;

FIG. 20 is a detailed side view of an alternate pressure-activated foam generator with a variable strength frangible output seal;

FIG. 22A is a detailed side view of an alternate two-sheet device featuring a sheet frangible seal at the aperture after activation and rupturing of a frangible mixing seal;

FIG. 22B is a detailed side view of the alternate two-sheet device featuring a sheet frangible seal at the aperture after rupturing of a frangible output seal;

FIG. 22C is a detailed side view of the alternate two-sheet device featuring a sheet frangible seal at the aperture after opening of the sheet frangible seal;

FIG. 23 is a detailed side view of an alternate device with the frangible output seal of a pressure-activated foam generator faced away from an aperture within a device;

FIG. 25A is a perspective view of the structure and cavity portion with the device installed;

FIG. 25B is a perspective view of the structure and cavity portion with the device installed where the pocket has been inverted after activation to position the pressure activated foam generator on the cavity side of the device;

FIG. 26A is a perspective view of an alternate device featuring a pressure-activated foam generator residing on the foam side of the device;

FIG. 26B is a cross-sectional view along the Line G-G of FIG. 26A;

FIG. 30A is a perspective view of a structure and cavity portion with expanding foam flowing into a cavity from an installed device with a cover to position for holding the shape of the expanding foam;

FIG. 30B is a perspective view of the structure and cavity portion with the cover in position for holding the shape of the expanding foam;

FIG. 32A is a perspective view of a structure and cavity portion where the device features an overflow pouch;

FIG. 32B is a perspective view of a structure and cavity portion where the foam has expanded into the cavity and the overflow pouch;

FIG. 32C is a perspective view of the structure and cavity portion where the overflow pouch has been removed;

FIG. 33A is a perspective view of a structure and cavity portion with a device installed featuring an upper flap positioned over the open area in a cavity;

FIG. 33B is a perspective view of the structure and cavity portion with a device installed where the upper flap is pulled away from the cavity;

FIG. 33C is a perspective view of the structure and cavity portion with a second device installed;

FIG. 33D is a perspective view of the upper flap of the first device overlapping the second device;

FIG. 35A is a front elevation view of a 2×4 cavity that is 14.5" wide with a device aligned and installed per alignment indicators;

FIG. 35B is a front elevation view of a 2×4 cavity that is 10" wide with a device aligned and installed per alignment indicators;

FIG. 35C is a front elevation view of a 2×4 cavity that is 6" wide with a device aligned and installed per alignment indicators;

FIG. 35D is a front elevation view of a 2×6 cavity that is 14.5" wide with a device aligned and installed per alignment indicators;

FIG. 35E is a front elevation view of a 2×6 cavity that is 10" wide with a device aligned and installed per alignment indicators;

FIG. 35F is a front elevation view of a 2×6 cavity that is 6" wide with a device aligned and installed per alignment indicators;

DETAILED DESCRIPTION

Figure 3C:
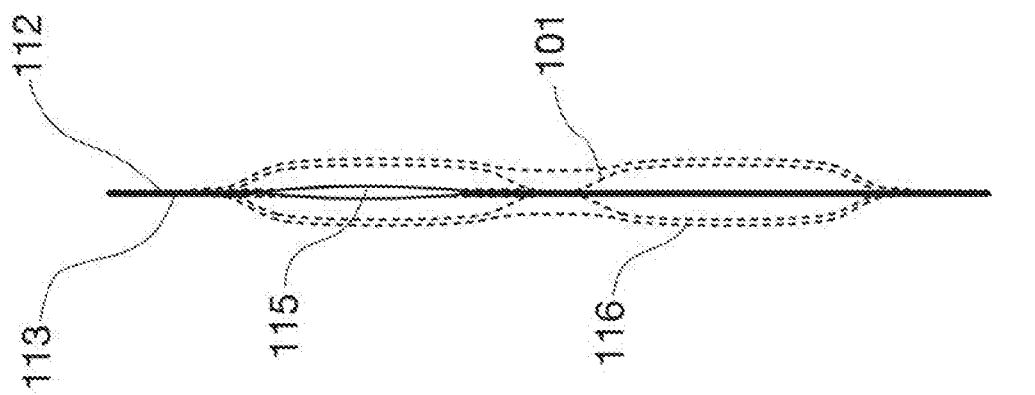
FIG. 3C is a rear view of FIG. 3A.

An illustrative embodiment of the present invention relates to enclosed flexible containers of foam precursors attached or otherwise constrained to or within a sheet or sheet set for attaching at one or more locations to cover or partially cover one or more surfaces or cavities where one or more frangible seals of the enclosed flexible containers of foam precursors are broken such that the precursors are mixed and the resulting reaction produces an expanding foam that flows onto the one or more surfaces or into the one or more cavities to produce an insulating barrier.

Referring initially to FIGS. 1A-1C are a perspective view, a side elevation view, and a front elevation view respectively of a prior art pressure-activated foam generator 101. As used herein the term "pressure-activated foam generator" includes any device which has two or more flexible containers (packaged volumes) which contain two or more individually contained liquid foam precursor chemicals. When the chemicals are mixed by the application of manual pressure to the containers, the foam precursor chemicals combine to create foam which is expelled from a rupture (breakable seal) in the generator. For example, in the shown embodiment, an A-side flexible container 102 which contains an A-side foam precursor 104 and a B-side flexible container 103 which contains a B-side foam precursor 105 where the A-side flexible container 102 and B-side flexible container 103 are separated by a frangible mixing seal 106 that, once ruptured, allows the chemicals to mix. A frangible output seal 107 is disposed on at least one of the A-side flexible container 102 and the B-side flexible container 103 (on B-side flexible container 103 as shown). The frangible output seal 107 has a higher rupture (breaking) pressure than the frangible mixing seal 106. In accordance with an embodiment of the present invention, the pressure-activated foam generator 101 is composed of one or more layers such as material layers identified in U.S. Pat. No. 6,983,839 B2 that include polyethylene, metal foil, ethylene acrylic acid, and non-polar polymer layers.

In accordance with an embodiment of the present invention, A-side foam precursor 104 and B-side foam precursor 105 are isocyanate and polyol respectively, which make a closed or open cell (depending upon the chemistry of the precursors) urethane insulating foam when combined. The density of the foam is typically in the range of 0.4 to 1.5 lb/ft$^3$ for open cell foam and 1.0 to 3.5 lb/ft$^3$ for closed cell foam. In accordance with an embodiment of the present invention, a foam generator generates about 1,000 in$^3$ (0.58 ft$^3$) of foam which will fill a typical 5.5" deep×14.5" wide stud cavity to a height of about 12.5". In accordance with another embodiment of the present invention, precursors for non-isocyanate based expanding foam are used.

FIGS. 2A-2D show a perspective view, a top plan, a front elevation, and a rear elevation, respectively, of a device 112 where a sheet 113 has a pressure-activated foam generator 101 such that pressure-activated foam generator 101 is coupled with (or otherwise integral, joined, or connected with) sheet 113 to form a single unit in accordance with an embodiment of the present invention. As shown in FIGS. 2A-2D, a pocket 116 exists where pressure-activated foam generator 101 is contained in the pocket 116 that is formed by a fold 136 in sheet 113 that is sealed (such as heat sealing) or otherwise attached along a portion of conjoined length 132, per conjoined length seals 137, and end seals 133. An aperture 115 exists along an unsealed section of conjoined length 132 that provides communication between pocket 116 and the foam side 134 of sheet 113 of device 112 that faces a cavity to be insulated as identified in FIG. 2A. FIG. 2A-2B identify a cavity facing or foam side 134 and exterior facing or non-foam side 135 where FIG. 2C provides a view of the exterior facing or non-foam side 135 of the sheet 113 of the device 112 and FIG. 2D presents a view of foam side or cavity side 134 of device 112. In accordance with an embodiment of the present invention, sheet 113 is made from a pliable and flexible polymer sheet material such as polyethylene, which is common for coverings used for installing spray foam insulation. In accordance with an embodiment of the present invention, multiple sheets are used to create a device 112 such as replacing fold 136 with a seal between two separate sheets for example.

Figure 3B:
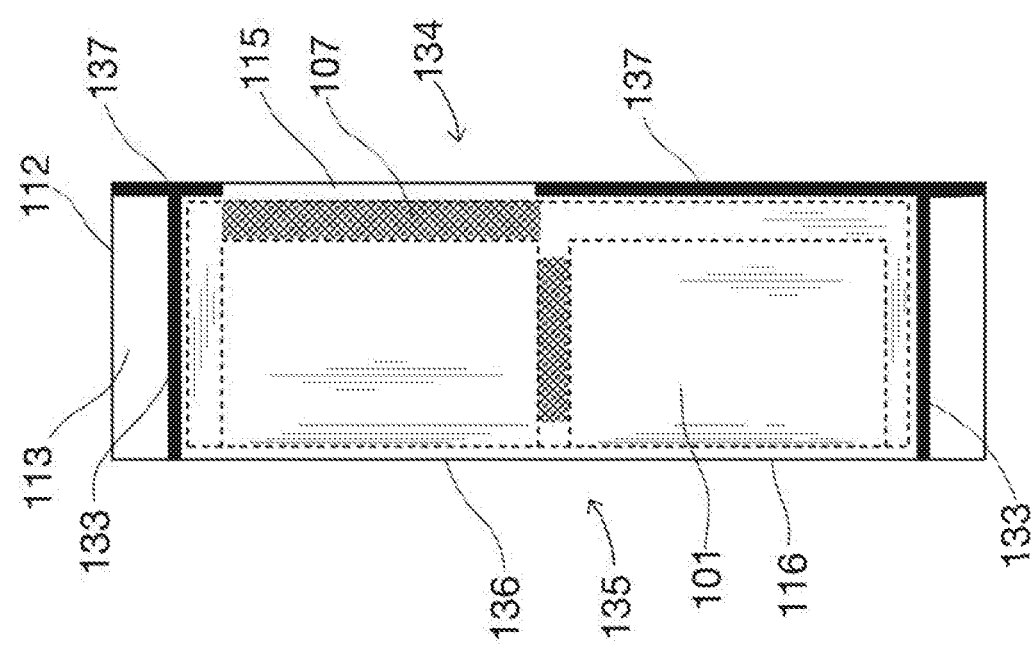
FIG. 3B is a side view of FIG. 3A.
Figure 3A:
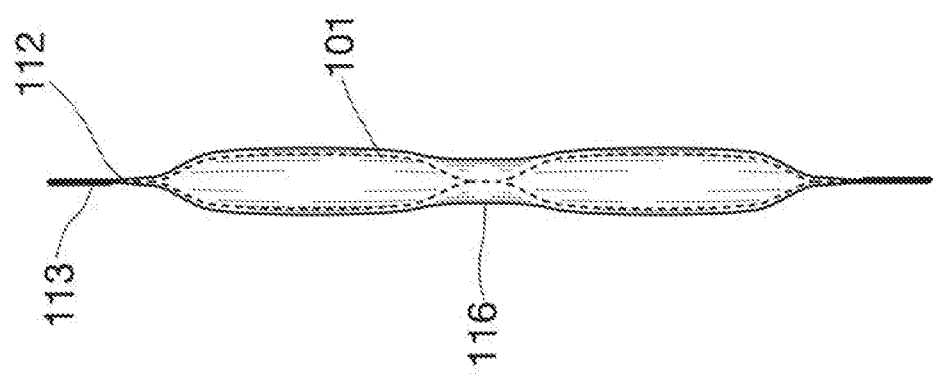
FIG. 3A is a Detail View B from FIG. 2C.

FIG. 3A is a Detail View B of device 112 from FIG. 2C, FIG. 3B is a side view of FIG. 3A, and FIG. 3C is a rear view of FIG. 3A. FIGS. 3A-3C highlight the position of pressure-activated foam generator 101 contained in pocket 116 of sheet 113. FIG. 3B shows the encapsulation of pressure-activated foam generator 101 by fold 136, end seals 133, and conjoined length seals 137 where communication exists between the inside of pocket 116 and frangible output seal 107 with cavity facing or foam side 134 through aperture 115 but communication for foam flow does not exist between the inside of pocket 116 and exterior facing or non-foam side 135. FIG. 3B shows frangible output seal 107 adjacent to aperture 115 so that foam freely flows out of frangible output seal 107, through aperture 115, to foam or cavity facing side 134. In accordance with one embodiment of the present invention; sheet 113, fold 136, end seals 133, and conjoined length seals 137 are of sufficient strength to maintain the integrity of pocket 116 to prevent communication of foam with the exterior facing or non-foam side 135 and not rupture from the pressure of foam generation. It is further noted that sheet 113, fold 136, end seals 133, and conjoined length seals 137 of device 112 are designed to withstand the heat which is produced during foam generation.

FIG. 4 illustrates the process of mixing A-side foam precursor 104 and B-side foam precursor 105 to generate a cured insulative foam in accordance with an embodiment of the present invention. A-side foam precursor 104 and B-side foam precursor 105 are brought together to create precursor combination 129, which is mixed to catalyze a reaction to create an expanding foam 109. The reaction generates heat and expanding foam 109 continues to expand until it reaches an expanded malleable foam 166 state where it begins to cool and harden until achieving its final state as a cured foam 167. It should be understood by one of ordinary skill in the art that the defined states of foam are generally defined and additional periods of heating, cooling, expansion, or contraction or the like may exist between, during, prior or after any defined foam state and shrinkage inhibitors or promotors or other chemistry additions such as a flame retardant can be implemented to adjust or alter the foam composition or expansion and hardening process or some other attribute.

FIGS. 5A-5F show the sequence of activating pressure-activated foam generator 101 of device 112 to generate an expanding foam 109, in accordance with an embodiment of the present invention. FIG. 5A provides a cross-sectional view along the Line A-A of FIG. 2B showing pressure-activated foam generator 101 including A-side flexible container 102 and B-side flexible container 103 disposed within pocket 116 before activation. In FIG. 5B, pressure is applied in directions 118 and 119 to A-side flexible container 102 (such as by manually squeezing A-side flexible container 102) to cause frangible mixing seal 106 to rupture (burst) as indicated by the "X", although squeezing B-side flexible container 103 to rupture frangible mixing seal 106 is also practicable. This creates a single mixing chamber 108 formed by A-side flexible container 102 and B-side flexible container 103 where A-side foam precursor 104 and B-side foam precursor 105 are united to create precursor combination 129 where mixing is effected by alternately squeezing both ends of single mixing chamber 108 per directions 118 and 119 as depicted in FIGS. 5C through 5D, or mixing induced in some other manner thereby causing the precursor combination 129 to flow back and forth within the mixing chamber 108 to mix precursor combination 129. Referring to FIG. 5E, the mixing of precursor combination 129 causes expanding foam 109 to be generated and expand within mixing chamber 108, as is indicated by the small arrows 138. In FIG. 5F, the pressure of the expanding foam 109 ruptures the frangible output seal 107 (as indicated by the "X"s) and the expanding foam 109 flows out of pressure-activated foam generator 101, through aperture 115, and out to cavity facing or foam side 134 in direction 110.

In accordance with another embodiment of the present invention, two or more foam precursors exist with one or more frangible mixing seals 106 or frangible output seals 107. In accordance with another embodiment of the present invention, three or more flexible containers exist such as a third flexible container separated with a mixing seal from an A precursor or separated from a B precursor or separated from both an A and a B precursor, which does or does not have an outlet frangible seal 107 where mixing occurs once all three or more flexible container contents are introduced to one another or contents from two containers are mixed or introduced to each other prior to the other flexible container contents being introduced or mixed in. In accordance with other embodiments of the present invention, the frangible output seal 107 is positioned along any or all edges 162, 163, 164, and 165 or any or all portions thereof. In accordance with other embodiments, the surface 149 or 161 of a flexible container 102 or 103 (or mixing chamber 108) identified in FIGS. 5E-5F, is designed to rupture and not a frangible seal along an edge or rupture in combination with a frangible seal along an edge. In accordance with another embodiment of the present invention, no frangible output seal 107 exists and a flexible container 102 or 103 (or mixing chamber 108) bursts once internal pressure overcomes the strength of the flexible container or the reaction of chemistries causes a surface or edge to give way or some other opening means is employed.

Referring to FIGS. 6A-6C are a perspective view, a top plan view, and a detail side view as in FIG. 3B, respectively, in accordance with another embodiment of the present invention, where a sheet 113 and pressure-activated foam generator 101 are one and the same for a device 112. End seals 133, conjoined length seals 137, fold 136, and sheet 113 are of sufficient strength to hold A-side foam precursors and B-side foam precursors and maintain integrity prior to, during, and after frangible mixing seal 106 is ruptured and frangible output seal 107 is ruptured such that the inside of pocket 116 is in communication with cavity facing or foam side 134 and not the exterior facing or non-foam side 135.

In accordance with another embodiment of the present invention, the foam precursors 104 and 105 are contained within separate flexible containers 102 and 103 and both flexible containers contained in a sheet 113 or a sheet set including sheet 113 and second sheet 147, as shown in perspective view FIG. 7A and top plan view FIG. 7B, and require rupturing or opening to mix the precursors.

In accordance with another embodiment of the present invention, a device 112 exists where one foam precursor 105 is in a flexible container 103 (held in sheet 113) containing another flexible container 102 with another foam precursors 104 such that the inner flexible container 102 must be ruptured or opened to mix the precursors together as shown in transparent perspective view FIG. 8A and cross-sectional view FIG. 8B along Line C-C of FIG. 8A, although in accordance with another embodiment of the present invention, foam precursor 104 is in flexible container 103 and foam precursor 105 is in inner flexible container 102.

Figure 9:
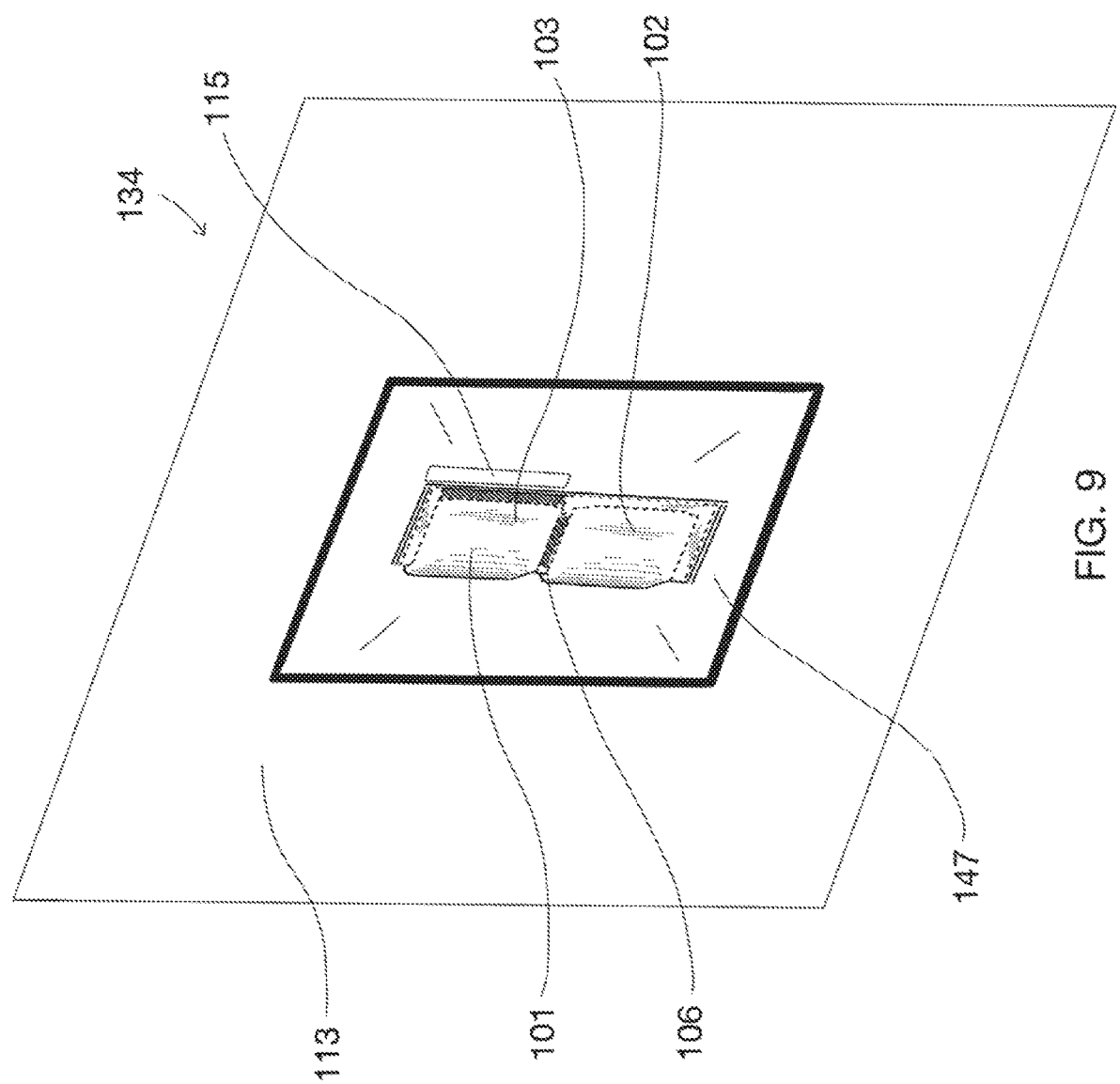
FIG. 9 is a perspective view of an alternate embodiment of a device fabricated with two sheets enveloping a pressure-activated foam generator.

In accordance with one embodiment of the present invention, pressure-activated foam generator 101 is coupled with sheet 113 in other ways. For example, two sheets 113 and 147 provide for sandwiching and sealing one or more pressure-activated foam generators 101 between the two sheets 113 and 147 and providing an aperture 115 in sheet 113 for communication with cavity facing or foam side 134 in accordance with an embodiment of the present invention as shown in perspective view FIG. 9. In accordance with another embodiment of the present invention, second sheet 147 is loose or sheet 113 is installed loose or the sheet material is of sufficient flex or some other means such that flexible containers 102 or 103 are able to be squeezed to rupture frangible mixing seal 106. In accordance with embodiments of the present invention, sheet 147 and sheet 113 are equally sized and shaped, or can be of differing size or shape. In accordance with embodiments of the present invention, pressure-activated foam generator 101 is held tightly between sheet 113 and 147, or pressure-activated foam generator 101 can be loosely contained between sheet 113 and 147.

Figure 10:
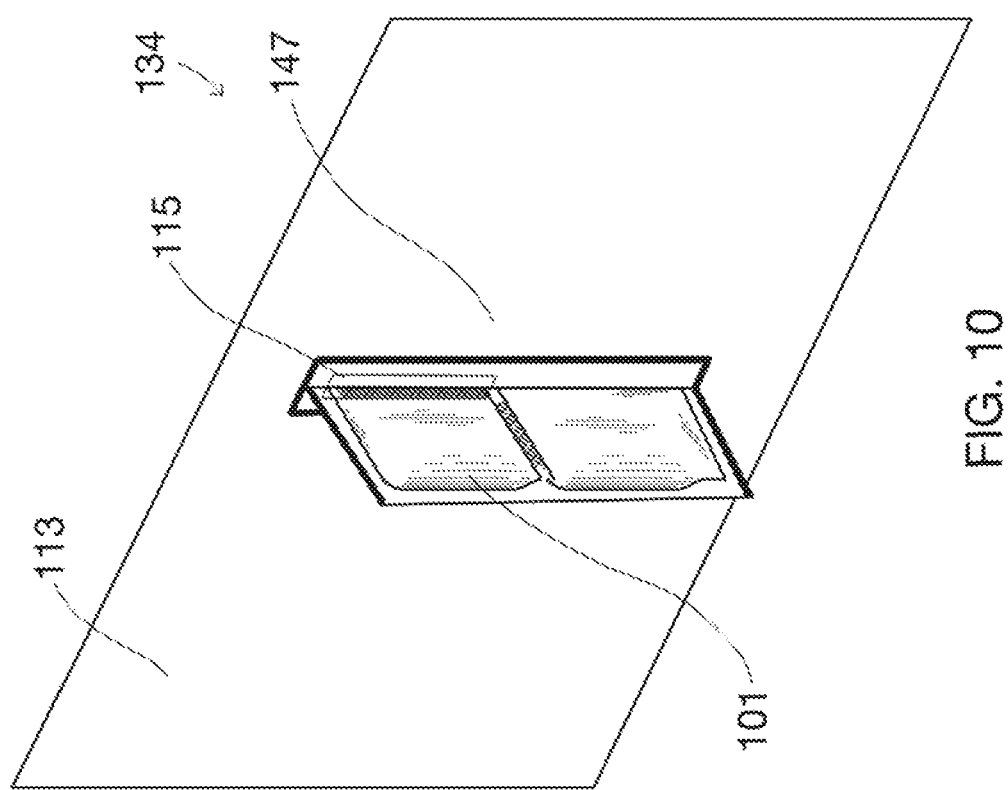
FIG. 10 is a perspective view of an alternate embodiment of a device with a separate pouch attached to a sheet for containing a pressure-activated foam generator.

In accordance with another embodiment of the present invention, pressure-activated foam generator 101 is housed within a separate pocket or looped second sheet 147 which is connected to sheet 113 where expanding foam has access to aperture 115 in sheet 113 to flow to the cavity facing or foam side 134 as shown in perspective view FIG. 10.

In accordance with another embodiment of the present invention, pressure-activated foam generator 101 is not enclosed and is otherwise fused or coupled with sheet 113 as depicted in perspective view FIG. 11. The pressure-activated foam generator 101 includes a frangible output seal 107 which has a ruptured position. The pressure-activated foam generator 101 is positioned so that in the ruptured position expanding foam has a path from the frangible output seal 107 to an aperture 115 in sheet 113.

FIGS. 12A-12B are top plan and front elevation views respectively of a structure 111 having a cavity 114. In the shown embodiment the structure 111 is a building, and cavity 114 is formed by two vertical studs 120 composed of wood or metal or other material each having an inside surface 122 and a front surface 130, a bottom plate 123 with a top surface 131, and a top plate (not shown). In the shown embodiment, cavity 114 is further bounded at the back by plywood or OSB sheathing or aluminum or other material forming rear surface 121 which is attached to or otherwise formed with the rear of the studs 120. As used herein, cavity 114 means the portion of space which is adjacent to an installed device 112. The total space between studs 120 comprises all or a portion of a cavity 114 for example. It may be appreciated that device 112 can also be applied to a ceiling (such as cavities between ceiling joists), to a floor (such as cavities between floor joists), or to other building cavities or other locations of volume where insulation is able to be applied.

FIGS. 13A-13C are illustrations of a perspective view, a top plan view, and a front elevation view respectively of structure 111 and cavity 114 with a device 112 installed. Sheet 113 is connected to structure 111 so that sheet 113 covers all or a portion of cavity 114 with aperture 115 adjacent to the cavity 114. That is, aperture 115 is oriented inwards toward cavity 114 so that foam is able to pass through aperture 115 and into cavity 114. Sheet 113 covers or partially covers cavity 114 and forms a boundary for the foam. Pressure-activated foam generator 101 is disposed within pocket 116 of sheet 113. It is further noted that device 112 is configured to deliver enough foam to fill cavity 114 or to partially fill cavity 114. Sheet 113 is sized, shaped, dimensioned, and configured to cover or partially cover cavity 114 where sheet 113 features excess material relative to the covered surface area so that the sheet 113 is able to be connected to the studs 120 and bottom plate 123. That is, sheet 113 forms a barrier which allows foam to be inserted into and built up within cavity 114. It is further noted that sheet 113 can come in different sizes to accommodate different cavity sizes, for example, different stud spacing. Moreover, in accordance with another embodiment of the present invention, a sheet 113 which is sized to fit one cavity is usable for different cavity sizes; for example a sheet 113 sized to fit 16 inch stud spacing, is also useable on a 12 inch stud spacing cavity.

In accordance with an embodiment of the present invention, the sheet 113 is composed of a material that is classified as a vapor retarder with a water permeability rating of less than 10 perms. In accordance with another embodiment of the invention, the sheet 113 is composed of a material that is classified as a Class 1 vapor retarder with a water permeability rating of 0.1 perms or less. In accordance with another embodiment of the invention, the sheet 113 is composed of a material that is classified as a Class 2 vapor retarder with a water permeability rating of 1 perm or less and greater than 0.1 perms. In accordance with another embodiment of the invention, the sheet 113 is composed of a material that is classified as a Class 3 vapor retarder with a water permeability rating of 10 perms or less and greater than 1 perm. In accordance with another embodiment, the sheet 113 is composed of vapor permeable material with a water permeability rating of greater than 10 perms.

In accordance with one embodiment of the present invention, sheet 113 is connected to the top surface 131 of bottom plate 123 and the front surface 130 of studs 120, such as with staples 124 spaced every 3" to 4" apart as shown in FIGS. 13A-13C. The connection is made so that sheet 113 forms a barrier over cavity 114. The connection of sheet 113 to bottom plate 123 ensures that expanding foam will not escape around the bottom of sheet 113 although attaching to the front face of bottom plate 123 or not attaching and simply tucking in excess sheet material along one or more sides is sufficient for containing expanding foam in accordance with embodiments of the present invention. In accordance with another embodiment of the present invention, a sheet 113 with one or more pressure-activated foam generators 101 is installed with excess sheet material at one or both ends of a sheet 113 where a bottom section 142 is folded in and attached to top surface 131 of bottom plate 123 or any other surfaces or combination of surfaces in close proximity. In accordance with other embodiments of the present invention, a sheet 113 with one or more pressure-activated foam generators 101 is installed with excess sheet material at one or both ends of a sheet 113 where a bottom section 142 is folded in and attached to surfaces within the cavity such that sheet 113 forms a bottom surface for containment of the expanding foam. In accordance with other embodiments of the present invention, sheet material forms a volume with the cavity to ensure that the volume is sufficiently filled, to depth of cavity, particularly for floor or ceiling installations where gravity causes flow to rest against the sheet face during expansion for ceiling installations and a rear surface for floor installations.

It is noted that pressure-activated foam generator 101, as depicted in FIGS. 13A-13C, has a longitudinal axis 125 which is oriented vertically and generally positioned in the middle (horizontally) of the cavity 114 with B-side flexible container 103 with the frangible output seal 107 above the A-side flexible container 102 such that the aperture is at a higher position within the cavity 114 to promote the ability of the foam to fill the cavity from the bottom up and limit or eliminate the potential for the foam to expand enough to block or impede flow from the aperture 115 although positioning the frangible output seal 107 with or without aperture 115 on the lower flexible container side is also practicable. In one embodiment of the present invention, the pressure-activated foam generator 101 is generally centered in the cavity although positioning the pressure-activated foam generator along a side edge or a top or bottom edge or anywhere therebetween and at any angles therebetween is also practicable.

In accordance with an embodiment of the present invention, the sheets are left loose to effectively occupy or loosely cover one or more surfaces or one or more cavities prior to expansion or is tautly attached to cover the one or more surfaces or one or more cavities. In accordance with another embodiment of the present invention, the sheets are attached in a loose state in regions or locations and in a tight state in other regions or locations. In accordance with yet another embodiment of the present invention, the sheets are attached onto one or more surfaces or into one or more cavities such that the expansion of foam from pressure-activated foam generator 101 applies pressure to the sheet 113 to create an expanded volume of foam off of the one or more surfaces or from within the one or more cavities.

Figure 14:
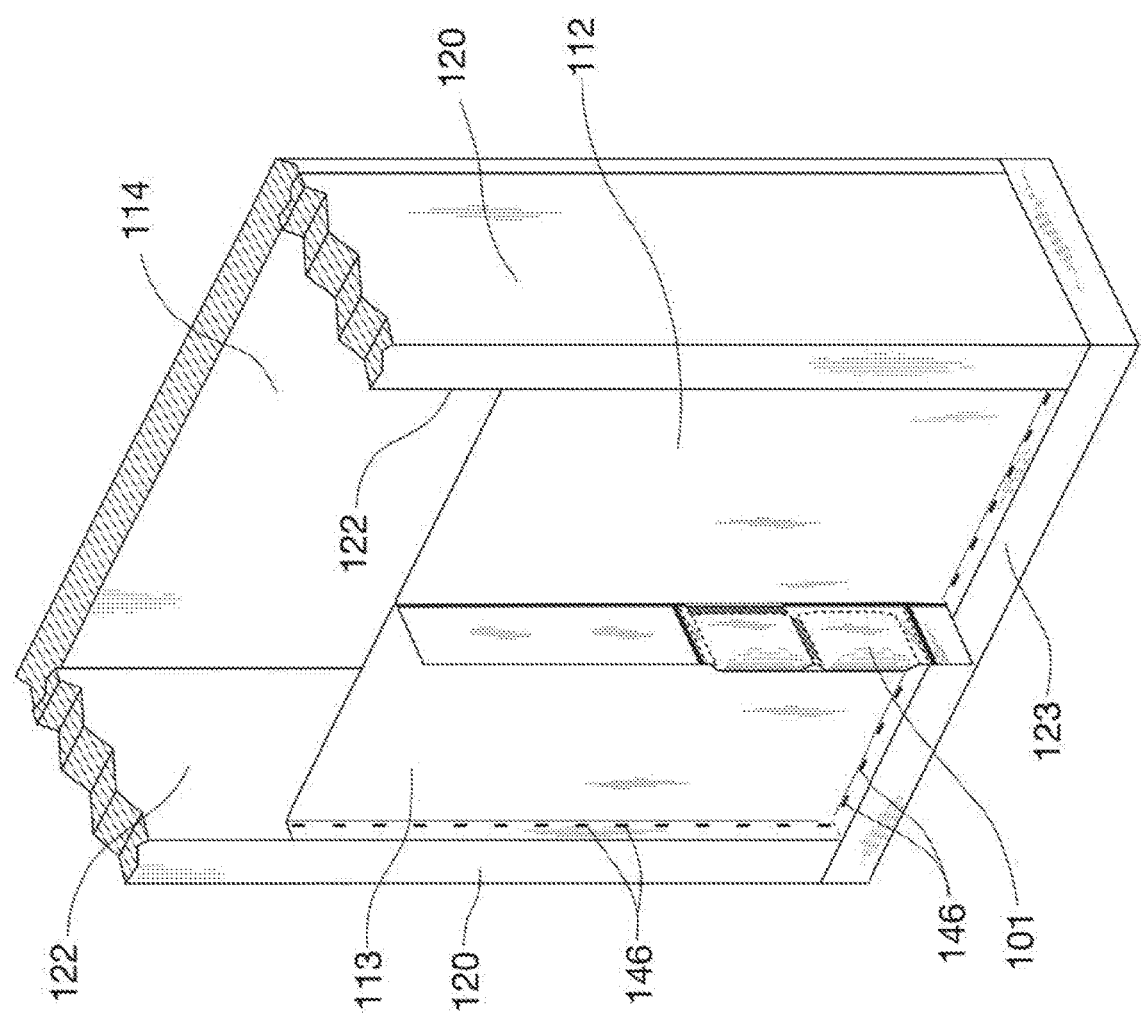
FIG. 14 is a perspective view of a device installed in a cavity with inset staples.

In accordance with other embodiments of the present invention, one or more devices 112, having one or more pressure-activated foam generators 101, are attached to the inside surface of one or more vertical and horizontal members, or any angled members, defining the perimeter of one or more cavities by inset stapling or stapling on the face of one or more cavity members or stapling on the outside face of one or more cavity members or stapling on the back face of the cavity or the back face of any adjacent cavities or other surfaces in close proximity or in any combination thereof. Per perspective view FIG. 14, in accordance with another embodiment of the present invention, sheet 113 is tautly connected to (between) the inside surfaces 122 of studs 120 such as with heavy duty staples 146 as shown. In accordance with an embodiment of the present invention, sheet 113 is stapled with heavy-duty staples 146 spaced 1 to 2 inches apart to resist the foam pressure and prevent foam from escaping in between the staples. The connection is made so that sheet 113 forms a tight barrier over cavity 114. The firm and taut connection of sheet 113 ensures that the expanding foam is confined to cavity 114 and not escape (or excessively bulge) to cause possible problems with the application of sheetrock over the studs 120. In the shown embodiment, sheet 113 is also connected to bottom plate 123 with heavy duty staples 146 or other connector. The connection of sheet 113 to bottom plate 123 ensures that expanding foam will not escape around the bottom of sheet 113.

In accordance with an embodiment of the present invention, one or more sheets 113 is attached or held temporarily or permanently in place by some other attachment means such as by nails, screws, magnets, hook and loop (Velcro), clips, hooks, fasteners, tape, glue, gravity, static charge, frictional holders such as a tongue and groove, propped objects, weights or weighted objects, heat sealing or bonding, wire, ropes, stitching, suspension means, manually held, or by some other means or attached in any combination of attachment methods or locations thereof or herein mentioned or not mentioned.

In accordance with another embodiment of the present invention, a device 112 is connected to itself or other sheets, such as with tape 184 or adhesive, at one or more locations to surround or partially surround one or more items or entities such as pipes or wires 153 to activate pressure-activated foam generator 101 and create a cured foam 167 structure as shown in perspective views FIG. 15A-15C.

Figure 16A:
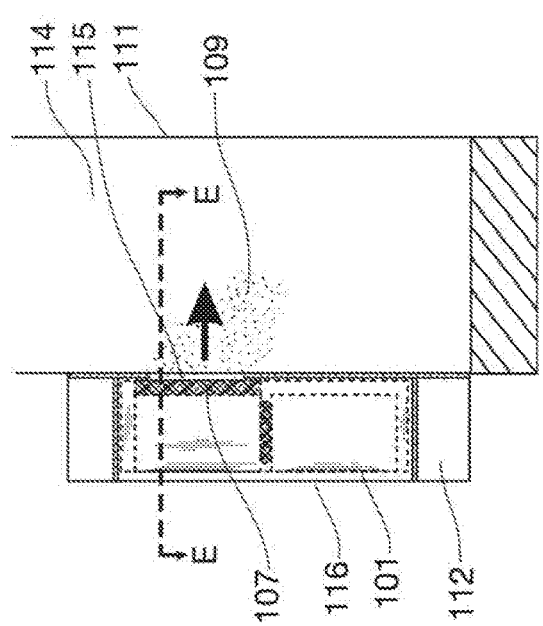
FIG. 16A is a view along the Line D-D of FIG. 13C.
Figure 16B:
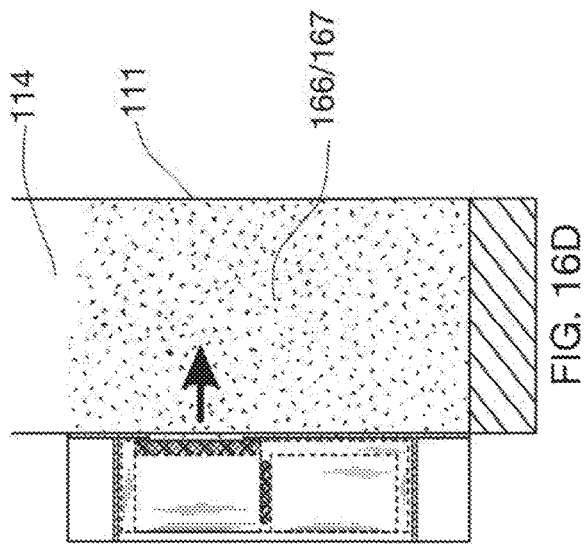
FIG. 16B is a view as in FIG. 16A showing foam flowing into the cavity.
Figure 16C:
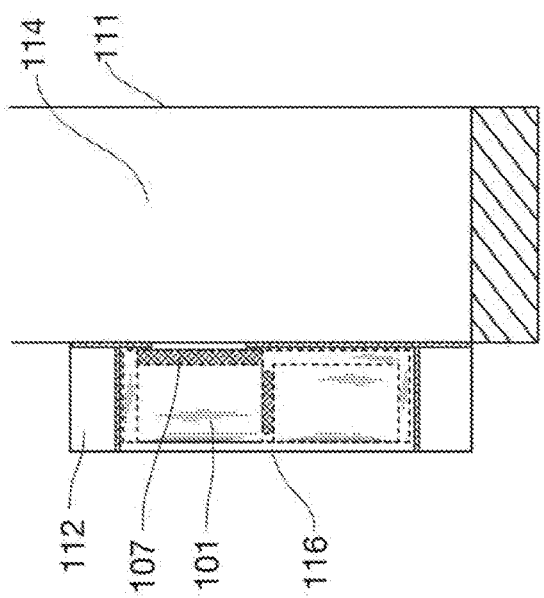
FIG. 16C is a cross-sectional view along the Line E-E of FIG. 16B.
Figure 16D:
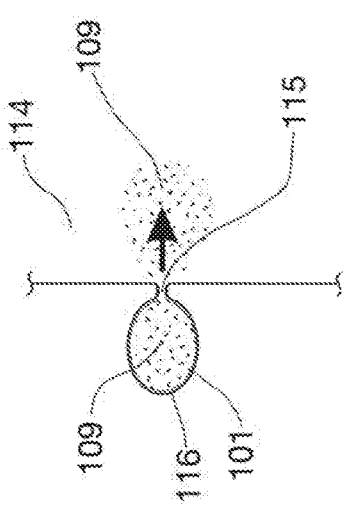
FIG. 16D is a view as in FIG. 16A showing the foam filling the cavity.

FIG. 16A is a view along the Line D-D of FIG. 13C, FIG. 16B is a view as in FIG. 16A showing expanding foam 109 flowing into cavity 114, FIG. 16C is a cross-sectional view along the Line E-E of FIG. 16B, and FIG. 16D is a view as in FIG. 16A showing expanded malleable foam 166 or cured foam 167 in cavity 114. FIG. 16A shows device 112 before pressure-activated foam generator 101 is activated. In FIG. 16B, pressure-activated foam generator 101 has been activated per the operation depicted in FIGS. 5A-5F, causing frangible output seal 107 to rupture wherein expanding foam 109 flows through aperture 115 and into cavity 114 wherein expanding foam 109 directly contacts structure 111. That is, there is no bag, sheet, or layer of device 112 between the cavity-forming components of structure 111 and expanding foam 109. FIGS. 16B-16C show expanding foam 109 flowing out of pressure-activated foam generator 101 (which is contained within pocket 116) through ruptured frangible output seal 107 and aperture 115 and into cavity 114. FIG. 16D shows expanding foam having transitioned to its expanded malleable foam 166 state or its cured foam 167 state.

In accordance with other embodiments of the present invention, a sheet 113 with one or more pressure-activated foam generators 101 is installed with excess sheet material at one or both ends of a sheet 113 where an upper flap 126 is folded in and attached to the cavity 114 rear surface 121 or studs 120 or other surface or surfaces using staples 124 or some other attachment means or simply folded in to enclose a cavity 114 region to temporarily or permanently cover an opening and provide additional protection for foam expansion or spray as shown in perspective view FIG. 17. Due to the frangible output seal 107 needing to be of greater strength than the frangible mixing seal 106 to ensure the precursors are safely separated and contained and therefore rupture in the correct sequence, the high strength of the frangible output seal 107 combined with the expansion of expanding foam 109 generally results in spray or splatter of foam as the frangible output seal 107 ruptures. Appropriately containing or limiting the spray or splatter of the foam promotes product safety and provides a predictable and consistent foam expansion process.

In accordance with an embodiment of the present invention, a spray or splatter guard 148 is positioned to manage the spray or splatter 168 that occurs as the high strength frangible output seal 107 of a pressure-activated foam generator 101 ruptures as shown in detailed side view FIG. 18A where the spray or splatter guard 148 is attached to the sides of pressure-activated foam generator 101 covering the high strength frangible output seal 107 to break away or separate from the pressure-activated foam generator 101 or otherwise open once sufficient force is applied from the expanding foam 109. The positioning of the spray or splatter guard 148 relative to the pressure-activated foam generator 101 is further illustrated in FIG. 18B which is a detailed cross-sectional view along the Line F-F of FIG. 18A, FIG. 18C is a detailed side view with the frangible output seal 107 ruptured and the splay or splatter 168 contained by folded splatter guard 148, and FIG. 18D is a detailed side view showing the folded splatter guard 148 separated from the pressure-activated foam generator 101 due to the force of the expanding foam 109. In accordance with an embodiment of the present invention, the spray or splatter guard 148 or a director either designed into or onto the pressure-activated foam generator 101 or incorporated into or onto the sheet 113 or device 112 to manage the spray or splatter 168 further enhances the ability to contain and provide a predictable and consistent foam expansion process.

In accordance with one embodiment of the present invention, a pressure-activated foam generator 101 has a frangible output seal 107 and a second frangible output seal 144 and a volume 185 for spray containment such that the spray typical of the rupturing of the frangible output seal 107 is contained and the second frangible output seal 144 requires minimal pressure to rupture resulting in the elimination or minimized spray effects as identified in the detailed side view of a device 112 in FIG. 19.

In accordance with one embodiment of the present invention, a pressure-activated foam generator 101 contained in a sheet 113 is depicted in detailed side view FIG. 20, featuring a gradual frangible output seal 107 mechanism that allows the frangible output seal 107 to peel apart where the seal is initially strong and then tapers off in strength such that the expanding foam leaves in a gradual manner by the time communication occurs between the internal flexible container volume and the external environment. In accordance with an embodiment of the present invention, a combination of multiple output frangible seals and one or more gradual frangible output seals exist.

In accordance with one embodiment of the present invention, additional means are employed to prevent the pressure-activated foam generator 101 from accidental mixing such as folding the pressure-activated foam generator 101 along the frangible mixing seal 106 location. In accordance with another embodiment of the present invention, a safety clip is placed along the crease or over a folded pressure-activated foam generator 101 or device 112 to maintain separation of the precursors or other chemistries.

Figure 21C:
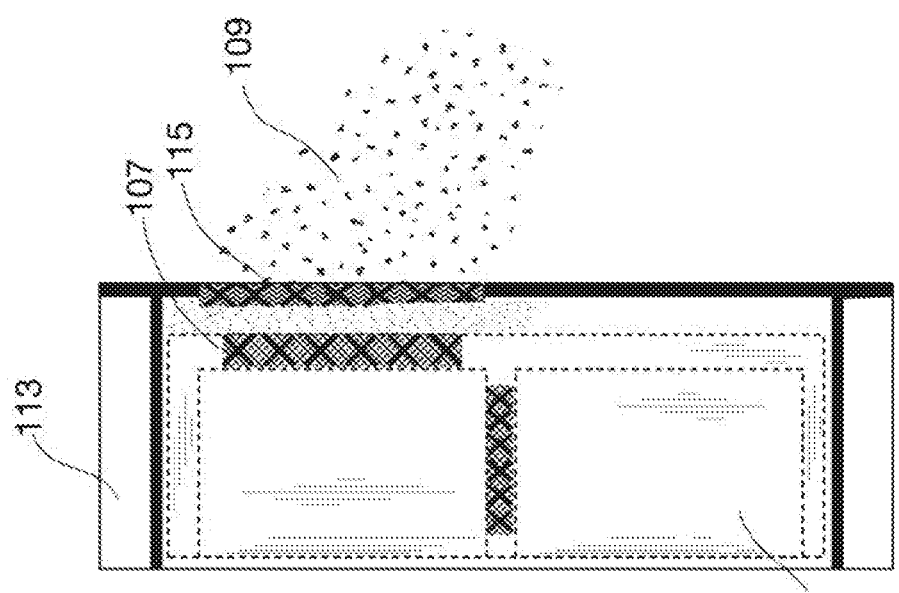
FIG. 21C is a detailed side view of the alternate device featuring a sheet frangible seal at the aperture after opening of the sheet frangible seal.
Figure 21B:
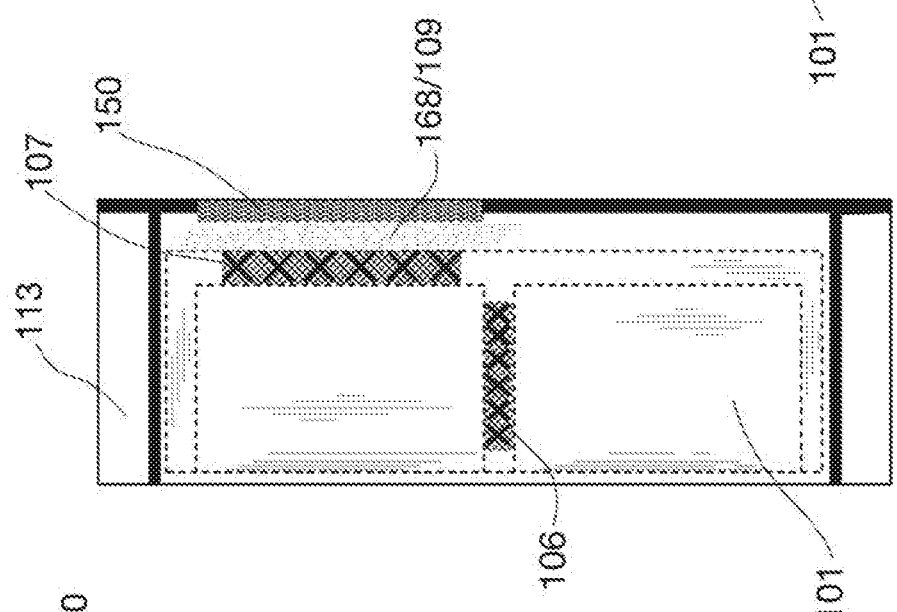
FIG. 21B is a detailed side view of the alternate device featuring a sheet frangible seal at the aperture after rupturing of a frangible output seal.
Figure 21A:
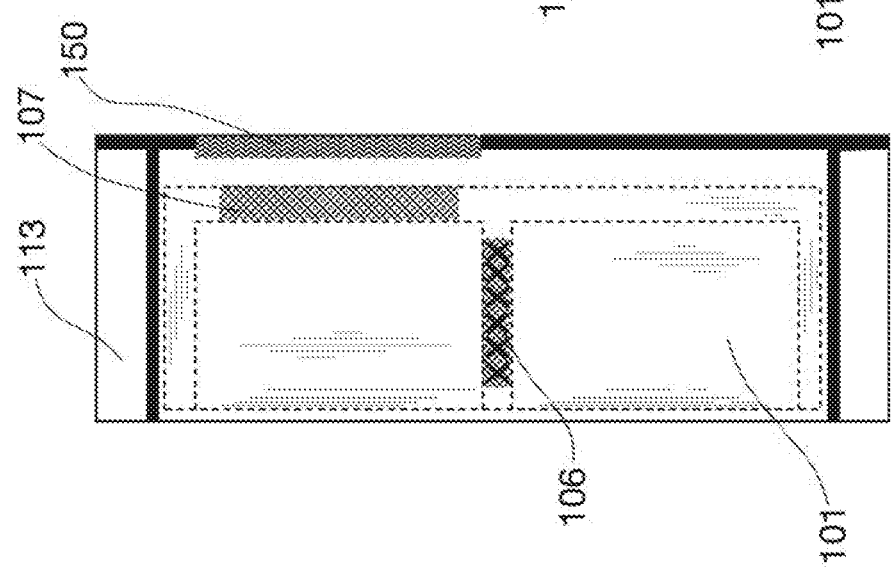
FIG. 21A is a detailed side view of an alternate device featuring a sheet frangible seal at the aperture after activation and rupturing of a frangible mixing seal.

In accordance with one embodiment of the present invention, FIGS. 21A-21C illustrate another means to manage or contain the spray or splatter of foam as frangible output seal 107 ruptures through the use of a sheet frangible seal 150 located on sheet 113 containing the pressure-activated foam generator 101 existing in the location of aperture 115. FIG. 21A identifies the activation of a pressure-activated foam generator 101, indicated by the 'X' marks along the frangible mixing seal 106, and FIG. 21B shows rupturing of frangible output seal 107 as indicated by the 'X' marks along the frangible output seal 107 where the resulting foam spray or splatter 168 is contained by sheet frangible seal 150. FIG. 21C illustrates the rupturing of sheet frangible seal 150 as indicated by the 'X' marks along the sheet frangible seal 150 where the force of the expanding foam 109 expanding, or another means such as a force induced manually by an installer, causes sheet frangible seal 150 to rupture permitting expanding foam 109 to flow freely from aperture 115. In accordance with an embodiment of the present invention, a sheet frangible seal 150 existing in the location of aperture 115 is created with a low strength bond, adhesive, tape, a weakened layer of material, perforations, or the like designed to open or separate when a force is induced upon it. In accordance with one embodiment of the present invention, the sheet frangible seal 150 is of a low strength relative to the high strength frangible output seal 107 of the pressure-activated foam generator 101 to create a controlled release of expanding foam 109 where the gradual opening of the sheet frangible seal 150 to produce aperture 115, as shown in FIG. 21C, without the splatter and spray effect providing for the expanding foam 109 to flow in a uniform manner and promote a cleaner, safer, and more even and predictable foam expansion process.

In accordance with another embodiment of the present invention, FIGS. 22A-22C are detailed side views that identify a device 112, as in FIG. 10, where pressure-activated foam generator 101 is held or contained by a second sheet 147 or second sheet 147 and sheet 113 where a sheet frangible seal 150 exists in sheet 113 or 147 for assisting in the expansion management of expanding foam 109 and eliminating or reducing the amount of spray or splatter 168 into a cavity or onto a surface once the frangible output seal 107 of the pressure-activated foam generator 101 ruptures.

In accordance with one embodiment of the present invention, the sheet frangible seal 150 is mechanically interlaced such as a Ziplock® style interface or held together by some other means. In accordance with one embodiment of the present invention, the sheet frangible seal 150 is designed to be broken open prior to installation so that the expanding foam 109 is better contained for spray or splattering if it is accidentally activated prior to installation preparation. In accordance with one embodiment of the present invention, the sheet frangible seal 150 is broken open after installation and after, during, or before pressure-activated foam generator 101 activation or rupture such as by applying pressure to the pocket 116 or sheet frangible seal 150 region by pressing into the middle of the sheet 113, or applying a force at some other location, causing tension across the sheet 113 or some other opening means to tear open the sheet frangible seal 150 manually and open aperture 115.

In accordance with one embodiment of the present invention, the frangible output seal 107 of the pressure-activated foam generator 101 is faced away from sheet frangible seal 150 or aperture 115, and faces towards fold 136 of pocket 116 per FIG. 23, shown in a detail side view as in FIG. 3B, such that the pressure-activated foam generator 101 is able to get forced through aperture 115, or not, depending on the aperture size and the constraints used to hold pressure-activated foam generator 101 in position, as the foam expands and increases in volume in excess of the size of the pocket 116 region of sheet 113 or the foam flows around the pressure-activated foam generator 101 and onto the one or more surfaces or into the one or more cavities or the pressure-activated foam generator 101 is oriented in some other direction other than aligned with the aperture 115. In accordance with an embodiment of the present invention, the non-alignment of frangible output seal 107 and aperture 115 prevents material from spraying out aperture 115 during the initial rupture of the frangible output seal 107 of the pressure-activated foam generator 101.

Figure 24C:
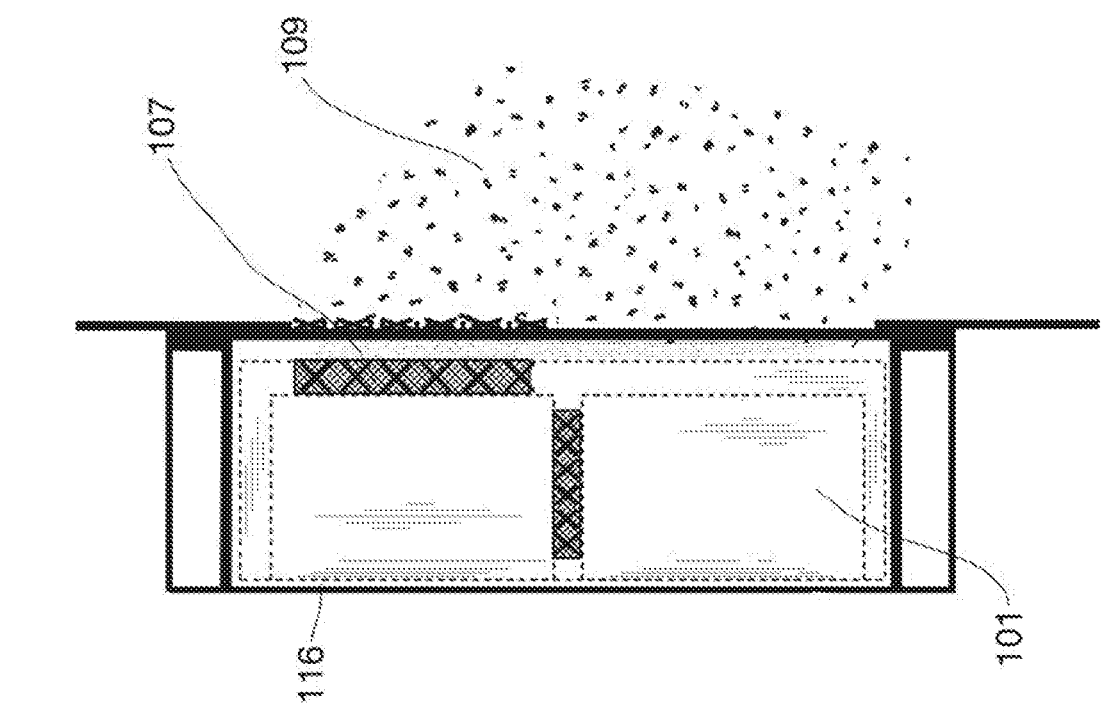
FIG. 24C is a detailed side view of the alternate device featuring a sheet frangible seal along a portion of the aperture after opening of the sheet frangible seal.
Figure 24B:
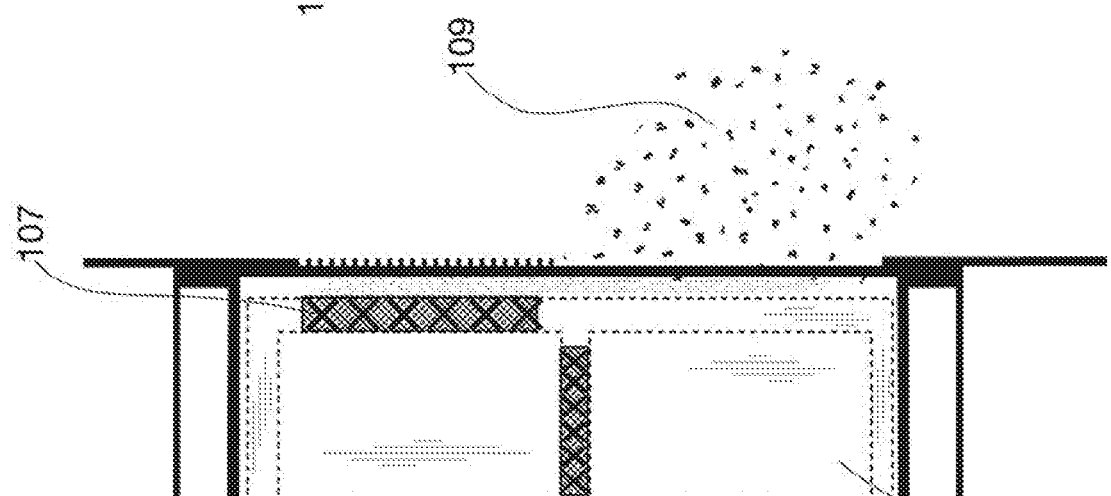
FIG. 24B is a detailed side view of the alternate device featuring a sheet frangible seal along a portion of the aperture after rupturing of a frangible output seal.
Figure 24A:
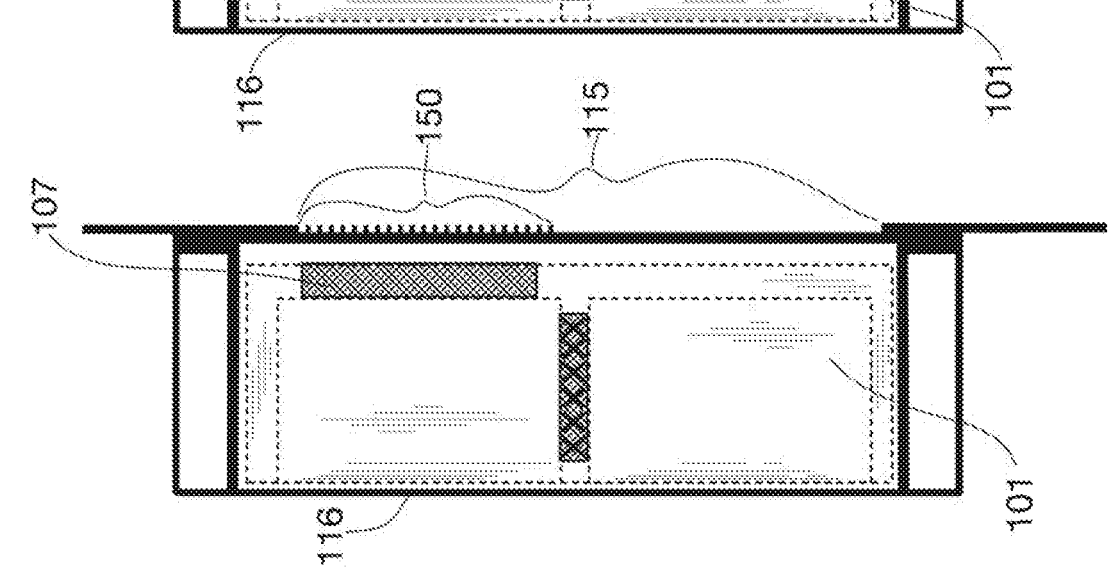
FIG. 24A is a detailed side view of an alternate device featuring a sheet frangible seal along a portion of the aperture after activation and rupturing of a frangible mixing seal.

In accordance with one embodiment of the present invention, a sheet frangible seal 150 exists over a portion of aperture 115 where the sheet frangible seal 150 is in a position to prevent or reduce spray or splatter from exiting the pocket 116 as the frangible output seal 107 of pressure-activated foam generator 101 ruptures and an open section allows air to escape the pocket 116 as the expanding foam 109 expands and then the sheet frangible seal 150 to peel or break open as expanding foam 109 attempts to escape pocket 116 to create unrestricted or minimally restricted expanding foam flow as identified in FIGS. 24A-24C.

In accordance with one embodiment of the present invention, the aperture 115 or sheet frangible seal 150 is large such that with aperture 115 opened up the pressure-activated foam generator 101 is no longer held in a constrained volume of the sheet 113 and is able to drop into a cavity 114 or be pushed into a cavity 114 or pocket 116 with fold 136 being manually inverted after activation of pressure-activated foam generator 101 and prior to the expanded malleable foam 166 curing, as shown in perspective views FIGS. 25A-25B, such that the pocket 116 and pressure activated foam generator 101 are manually forced to the cavity facing or foam side 134 of sheet 113 and do not remain as an external flap on the exterior facing or non-foam side 135 of sheet 113. In accordance with one embodiment of the present invention, the pocket 116 with adjacent fully open aperture 115 is simply left in place for expanding foam 109 to flow freely from with minimal restrictions. In accordance with an embodiment of the present invention, the aperture is adjacent to the frangible output seal 107 and is larger than the frangible output seal 107 size to minimize any potential flow restriction, which can impact the maximum foam expansion capability, such that the expanding foam is able to freely flow into one or more cavities.

In accordance with one embodiment of the present invention, one or more pressure-activated foam generators 101 of device 112 are positioned on the cavity facing or foam side 134 of sheet 113 in a pocket 116 where two folds 136 exist along a conjoined aperture edge 154 to form three total pockets where two access pockets 181 with openings 151 exist on the non-foam side 135 such that a user has protected access to the pressure-activated foam generator 101 in order to activate it as shown in FIGS. 26A-26B where FIG. 26A is a front perspective view and FIG. 26B is a cross-sectional view through Line G-G of FIG. 26A. Tack seals 157 or end seals 133 or both tack seals 157 and end seals 133, or some other seals or features provide the means for holding the shape of pocket 116, and fold seals 182 of sheet 113 provide for the cavity facing or foam side 134 containment of pressure-activated foam generator 101 and positioning of aperture 115. In accordance with another embodiment of the present invention, the device 112 with the pressure-activated foam generator 101 on the cavity facing or foam side 134 is used for ceiling applications to get the aperture deeper into the cavity such that foam can fill around the pressure-activated foam generator 101 and away from aperture 115. In accordance with another embodiments of the present invention, a rigid component assists with holding the pressure-activated foam generator up-right in a ceiling cavity or a user's hands or a tool or some other means to keep aperture 115 open for maximum expansion capability although allowing the expanding foam to simply fill from aperture 115 without structural assistance is also practicable.

In accordance with another embodiment of the present invention, one or more pressure-activated foam generators 101 of device 112 are positioned on the cavity facing foam side 134 of sheet 113 and are held in any of the embodiments described herein or thereof where a user has access to activate device 112. In accordance with another embodiment of the present invention, the one or more pressure-activated foam generators 101 of device 112 are simply attached to the cavity facing or foam side 134 surface of a sheet 112, similar to the embodiment identified in FIG. 9, where the user has access to activating the device such as loosely attaching the sheet 112 to a cavity or attaching along a top edge for a user to have the ability to squeeze the top edge of an installed device 112 and in this manner no pocket 116 or aperture 115 is needed.

Figure 27A:
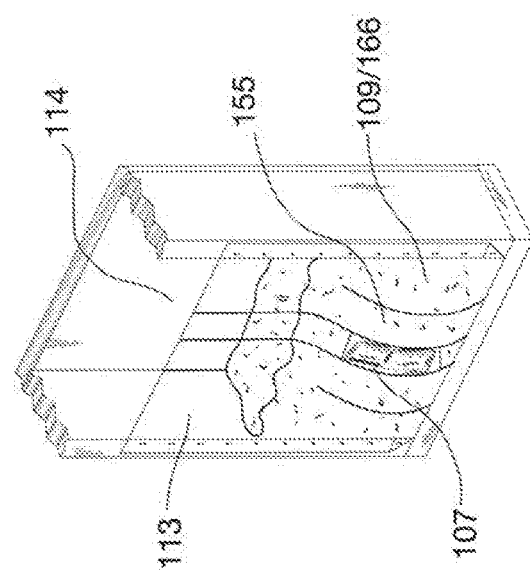
FIG. 27A is a perspective view of a structure and cavity portion with foam filling the cavity and bulging.
Figure 27B:
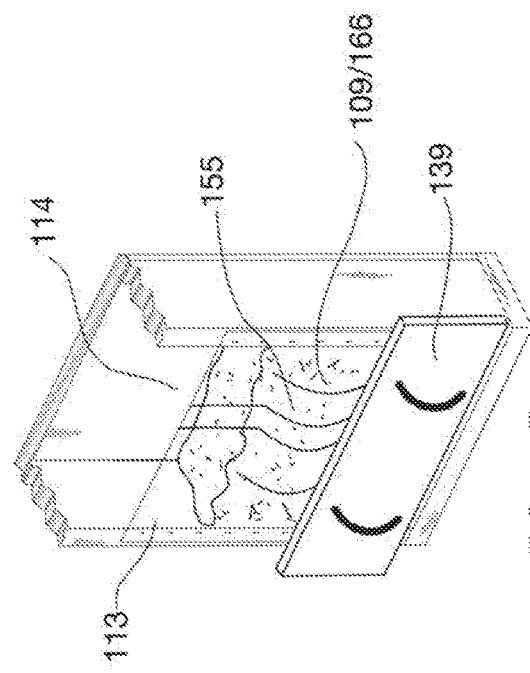
FIG. 27B is a perspective view of the structure and cavity portion with the bulge of foam being formed.
Figure 27C:
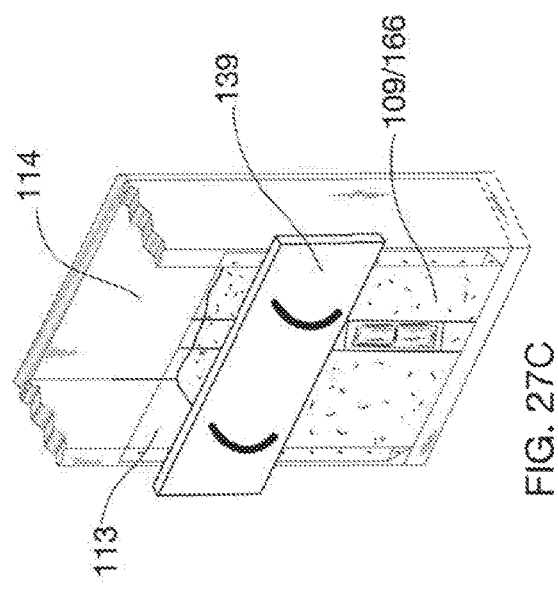
FIG. 27C is a perspective view of the structure and cavity portion with the bulge of foam further being formed.
Figure 27D:
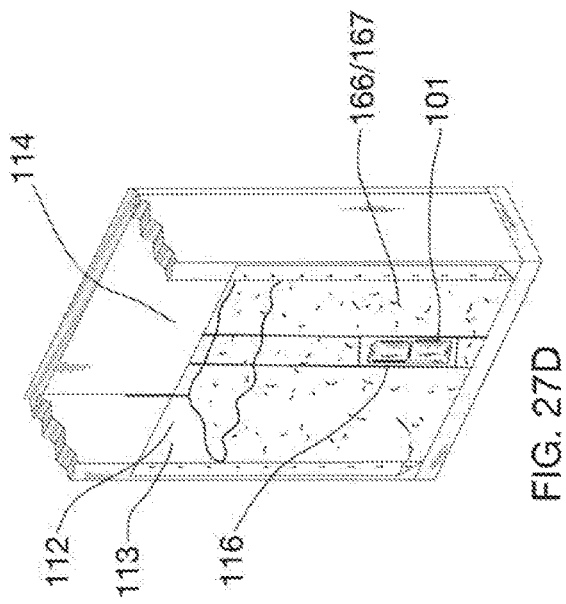
FIG. 27D is a perspective view of the structure and cavity portion with the resulting expanded cured foam.

Perspective views of FIGS. 27A-27D demonstrate a means for manually manipulating the expanding foam 109 or expanded malleable foam 166, after having activated device 112 per an activation process such as identified in FIGS. 5A-5F, using a forming tool 139 to reshape the expanding foam 109 or expanded malleable foam 166 while still in a malleable state prior to achieving a cured foam 167 state. In accordance with an embodiment of the present invention, a forming tool 139 is used to direct any expanding foam 109 or expanded malleable foam 166 contained by sheet 113 that is bulging out from the face of the cavity 114 to unfilled areas of the cavity, such as areas higher in the cavity 114 or at corners or edges or around any objects within a cavity 114 such as outlets, pipes, and wires. In accordance with an embodiment of the present invention, the forming tool 139 is pressed against the lowest bulge 155 location after an approximate period from when frangible output seal 107 ruptures, three seconds after rupture for example, and the forming tool 139 is used to push into the bulge 155 at incrementally higher locations as needed, including repeating the pushing process from the bottom, until the expanded malleable foam 166 is moved accordingly. The installer repeats pressing at the bottom location and working their way up as needed to achieve a flush or substantially flush cavity face or another desired shape. As shown in FIG. 27D, a cured foam 167 state is achieved and pocket 116 containing the pressure-activated foam generator 101 remains within, or substantially within, the flush face of the cavity 114 per the forming operation although forming around the pocket 116 and the pocket 116 with pressure-activated foam generator 101 of device 112 being removed or simply left in place or pocket 116 being inverted is also practicable.

Alternatively, in accordance with another embodiment of the present invention, once the expanding foam 109 or expanded malleable foam 166 has substantially cured and adhered to the surfaces of the cavity 114 to a degree sufficient to be structurally stable, the sheet 113 or device 112 can be removed such that the cured foam 167 remains in place in the cavity 114.

In accordance with one embodiment of the present invention, the forming tool 139 is any forming instruments such as a small board or a rolling pin or the installer's hands or the like used to hold the position of or apply pressure to the face of the sheet or sheets 113 as the expanding foam 109 expands or once an expanded malleable foam 166 state is achieved and the forming instrument or instruments are used to hold or otherwise direct the expanding foam 109 or expanded malleable foam 166 to create uniform thickness or fill or other desired shape.

Using a forming tool 139 provides one method for directing foam or assisting to fill foam around outlets, switches, wiring and other items that impede a cavity from filling uniformly although other methods are practicable. Forming methods and other foam expansion management methods, techniques, features, or equipment provide the ability for uniformly filling in narrow cavities, short cavities, and shallow cavities, odd geometry cavities, as well as filling around outlets, switches, wiring and other items that might otherwise impede a cavity from filling uniformly are practicable. The forming or expansion management methods also provide the ability for having sheets loosely attached and attached with less staples than conventional expansion foam installation methods as the sheet is not necessarily needed for forming the cavity and holding the shape of the expanding foam.

Minimizing the amount of manipulation of the expanding foam achieves a higher maximum expansion volume where the total expanded foam volume is reduced up to 35% or more with excessive forces or manipulation of the expanding foam 109. In accordance with one embodiment of the present invention, a device 112 is attached loosely to the face of a cavity 114 and the expanding foam 109 expands freely into the cavity and is permitted to bulge into the sheet and out from the face of the cavity 114. After the expanding foam 109 has almost fully expanded to achieve its expanded malleable foam 166 state, a flat forming tool 139 is used to move the bulging foam from the lower region of the cavity to the higher unfilled region of the cavity.

Figure 28B:
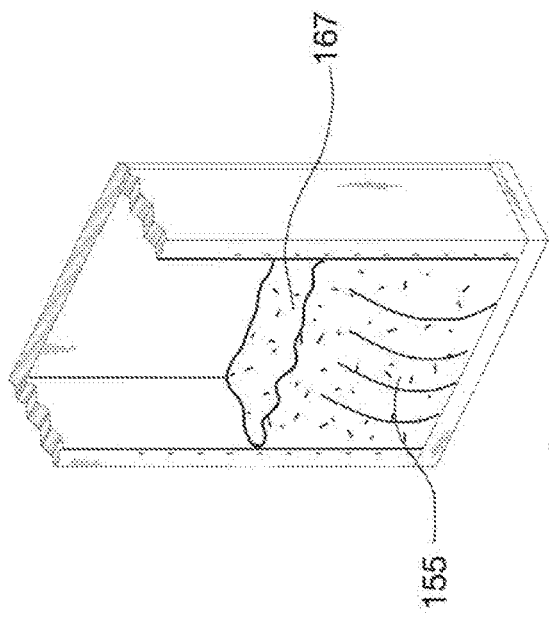
FIG. 28B is a perspective view of the structure and cavity portion with cured foam bulging from the cavity and the device removed.
Figure 28D:
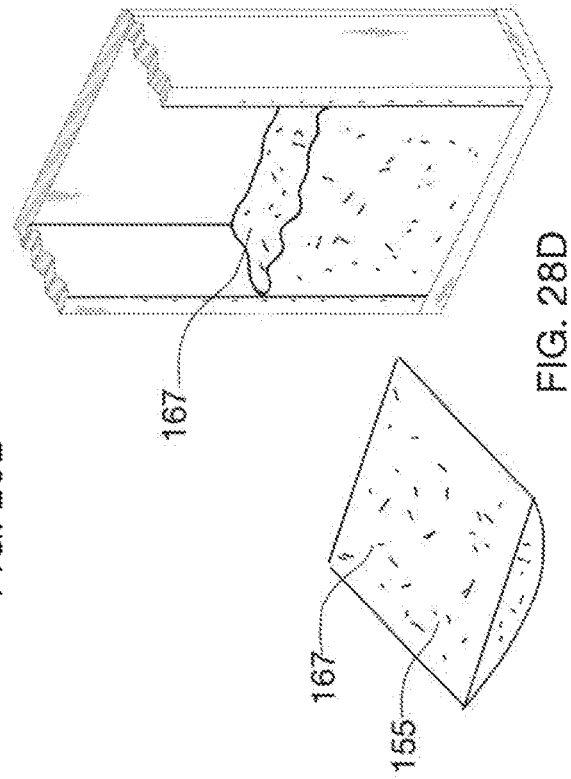
FIG. 28D is a perspective view of the structure and cavity portion with the bulge cut away.
Figure 28A:
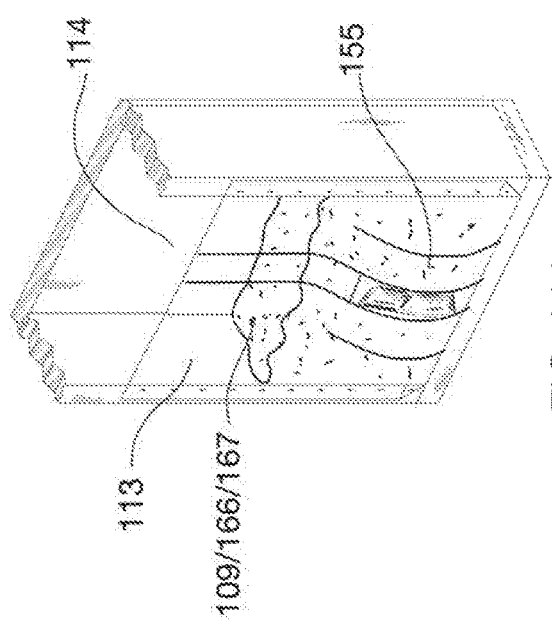
FIG. 28A is a perspective view of a structure and cavity portion with foam bulging from the cavity.
Figure 28C:
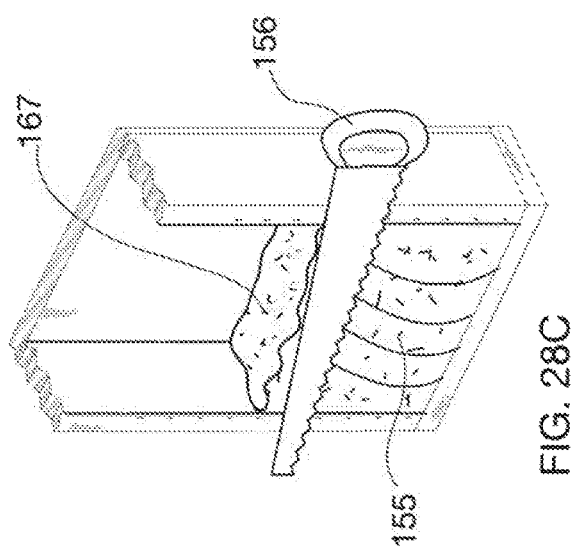
FIG. 28C is a perspective view of the structure and cavity portion with cured foam bulging from the cavity with a saw positioned to cut the cured foam bulge.

In accordance with an embodiment of the present invention, the foam is permitted to expand beyond flush of the cavity face, away from the cavity 114, which may be preferable in applications where sheetrock or other covering is not placed over the foam such as in an attic or a crawl space or an unfinished basement or another location where a cavity cover is not attached directly to the studs as shown in perspective view FIG. 28A. In accordance with another embodiment of the present invention, the surface of the sheet 113 and corresponding expanding foam 109 and resulting expanded malleable foam 166 are permitted to expand outside of the cavity 114 and become cured foam 167 and the bulge 155 is otherwise cut or removed to a less bulging shape, a substantially flush position, a recessed position, or any combination of positions by removing device 112 or a portion thereof and using a saw 156 or abrasive tool or some other means as a secondary step as shown in FIG. 28A-28D.

Figure 29C:
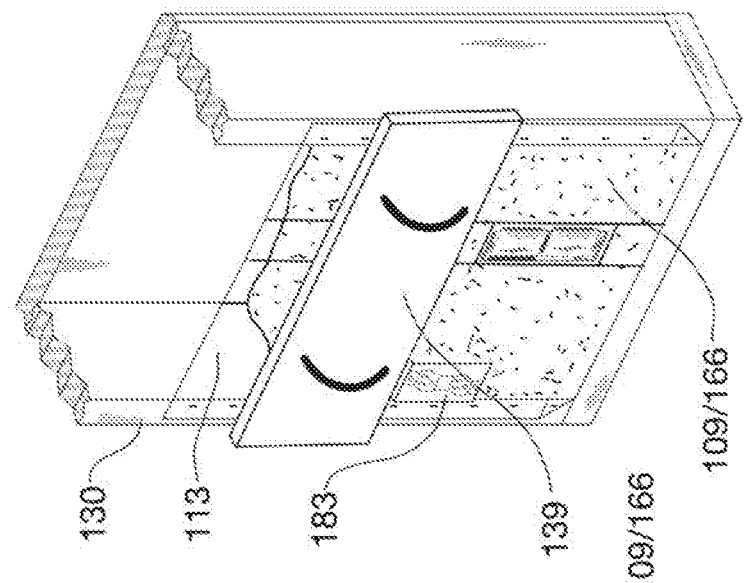
FIG. 29C is a perspective view of a structure and cavity portion where the foam is being formed above an electrical outlet box.
Figure 29B:
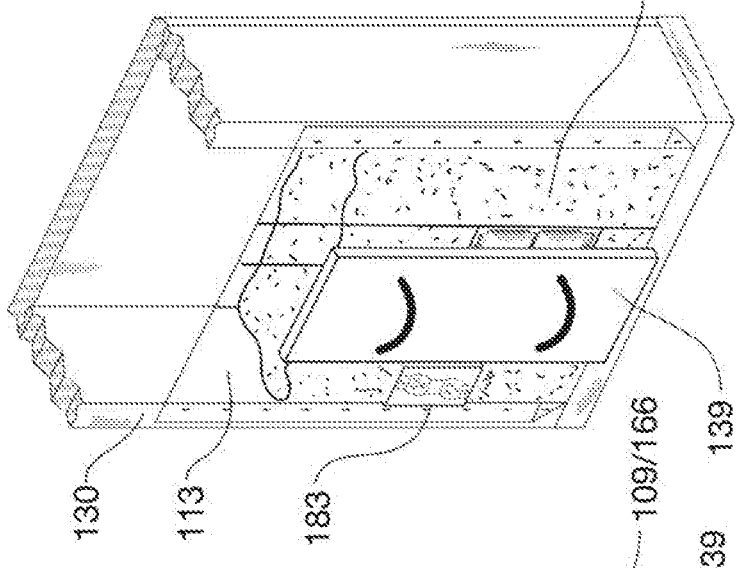
FIG. 29B is a perspective view of a structure and cavity portion where the foam is being formed along the side of an electrical outlet box.
Figure 29A:
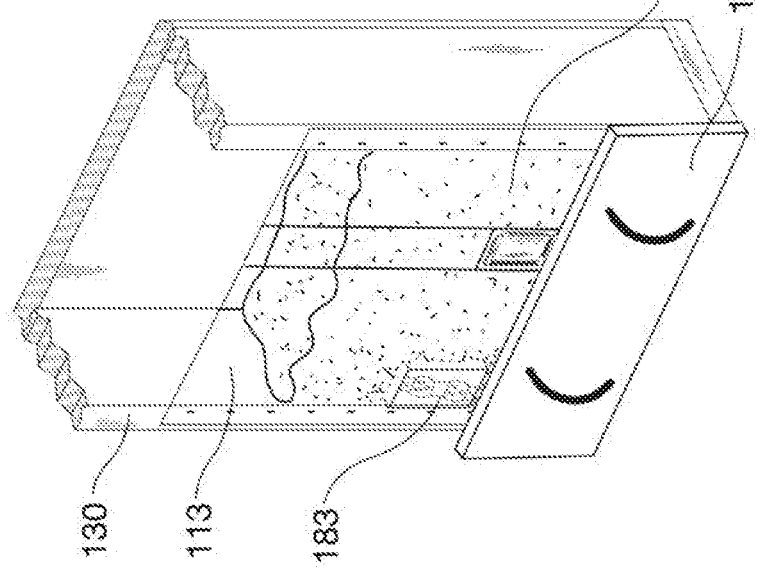
FIG. 29A is a perspective view of a structure and cavity portion where the foam is being formed below an electrical outlet box.

In accordance with an embodiment of the present invention, if an obstruction is present, such as an electrical outlet box 183, the forming tool 139 is used close to the edges of the electrical outlet box 183 to ensure foam remains substantially flush to the stud front surface 130 as shown in perspective view FIGS. 29A-29C and expanding foam 109 is prevented from or substantially prevented from flowing into the electrical outlet box 183. In accordance with an embodiment of the present invention, sheet 113 is cut away from the face of electrical outlet box 183 after forming or sheet 113 is later removed and electrical outlet box 183 is accessible. In accordance with another embodiment of the present invention, expanding foam 109 is permitted to flow into the electrical outlet box 183 and is cut or otherwise removed as a secondary step. In accordance with another embodiment of the present invention, sheet 113 is precut for installation around geometry such as an electrical outlet box 183 and taped about the geometry or attached by some other means or expanding foam 109 is limited from escaping containment by some other means.

In accordance with one embodiment of the present invention, after attaching one or more sheets 113 to occupy or cover or partially cover a cavity 114 and activating a pressure-activated foam generator 101 of the sheet or sheets 113, a cover 152 is temporarily placed in front of the sheet to cover or partially cover the sheet 113 to manage the expansion of expanding foam 109 and keep it substantially flush or inset of the cavity opening as illustrated in perspective views FIGS. 30A-30B. In accordance with one embodiment of the present invention, one or more sheets or one or more pressure-activated foam generators 101 or one or more cavities or any combination thereof are covered or partially covered to manage foam expansion. In accordance with one embodiment of the present invention, the sheet material is of a low strength such as when forming is involved. In accordance with another embodiment of the present invention, the sheet material is higher strength and in accordance with another embodiment the sheet material is reinforced such as string reinforced polyethylene such as in applications where the sheet material is inset stapled to place the sheet material in tension to resist bulging where no forming or minimal forming is employed to shape the expanding foam. In accordance with other embodiments of the present invention, the sheet or a portion of the sheet is rigid and serves as a wall covering for the foam insulation. In accordance with an embodiment of the present invention, the sheet is composed of any number of materials including plastic, sheetrock, wood, metal, or other materials than can serve as a wall covering, protective covering or temporary covering.

In accordance with one embodiment of the present invention, one or more footers or bases or side mounts, such as a z-bar 187 as depicted in FIGS. 30A-30B or corner clips or side clips or the like, are temporarily or permanently attached at a point lower than the fill region or low in the fill region area, where the majority of the expansion forces generally occur where the foam settles and expands, and is used to provide an anchor location for a cavity cover 152 to hook into and be held with or without manual assistance. In accordance with one embodiment of the present invention, the cavity cover 152 is attached and held temporarily or permanently in place by some other attachment means such as by nails, screws, magnets, hook and loop (e.g., Velcro®), clips, hooks, fasteners, tape, glue, gravity, static charge, frictional holders such as a tongue and groove, propped objects, weights or weighted objects, heat sealing or bonding, wire, ropes, stitching, suspension means, manually held, or by some other means or attached in any combination of attachment methods or locations thereof or herein mentioned or not mentioned to maintain a shape or position for the surface of the foam. In accordance with one embodiment of the present invention, the cavity cover 152 is used to hold the foam in the cavity or cavities during the foam expansion period or for a portion of the foam expansion period or used to reshape the foam after the foam expansion period. In accordance with one embodiment of the present invention, the inside surface of the cavity cover 152 is shaped, contoured, inset or contains a cavity for shaping the foam or an internal surface shaped with channels or other features for directing the foam expansion.

In accordance with one embodiment of the present invention, the inside surface of a cavity cover 152 such as in FIGS. 30A-30B is bowed in or the surface is pliable and allowed to bow in or out and is used for directing expanding foam 109 during expansion to fill corners or other targeted regions. In accordance with one embodiment of the present invention, the cavity cover surface is formed to hold a particular shape for the expansion process such that after the foam has achieved a final cooled and settled state and retracted or expanded state that it is uniform in thickness throughout providing for uniform insulating properties. In accordance with one embodiment of the present invention, the surface of the cavity cover 152 is pliable such as a rubber surface. In accordance with one embodiment of the present invention, the cover or forming tool is designed to activate or mix or activate and mix one or more pressure-activated foam generators 101 such as by a mechanical means or an electro-mechanical means or by some other means.

In accordance with one embodiment of the present invention, a cushioned or spring-loaded or pliable form or the like is used to force expanding foam 109 to fill into gaps prior to filling in the rest of the cavity or regions or locations of the cavity. For example, the expanding foam 109 is held down with a horizontal pressure plate that gets forced up once the foam generates sufficient expansion force to move the plate up the cavity or out towards the cavity face such that the force required to move the plate further encourages the foam to fill in all of the gaps and around the edges of the cavity, or fill gaps from a previous activation, prior to moving the plate. This also creates a clean foam shape at the end of the expansion form. In accordance with an embodiment of the present invention, the sheet 113 serves as a barrier between the foam and the cavity cover 152 or plate or any other instrument or tool to prevent sticking and prevent contact with the installer. In accordance with an embodiment of the present invention, the horizontal plate contains interlocking geometry shapes for forming the foam such that a next foam activation forms into the interlocking features of the foam of the previous foam activation with interlocking geometry shapes formed therein.

In accordance with other embodiments of the present invention, the shaping or forming or cavity covering processes are applied to other expanding foam insulation methods such as foam installed via a spray gun.

In accordance with another embodiment of the present invention, forming is used for other areas of expanding foam 109 such as around one or more ends or sides, particularly for floor or ceiling installations where the expanding foam 109 fills from the sheet 113 side for ceiling applications or from the rear cavity face for floor applications or at some combination thereof for any angled installations.

In accordance with other embodiments of the present invention, shaping tools are used for forming such as an outside corner trowel or inside corner trowel or rounded tool for adding any desired shape or contour needed in a particular application. In accordance with other embodiments of the present invention, a device 112 is used to wrap around or partially wrap around pipes or wires or encapsulating objects as identified in FIGS. 15A-15C where activating the pressure-activated foam generator 101 and appropriately containing and constraining or manipulating the foam provides for insulation coverage of the pipes or wires.

Figure 31:
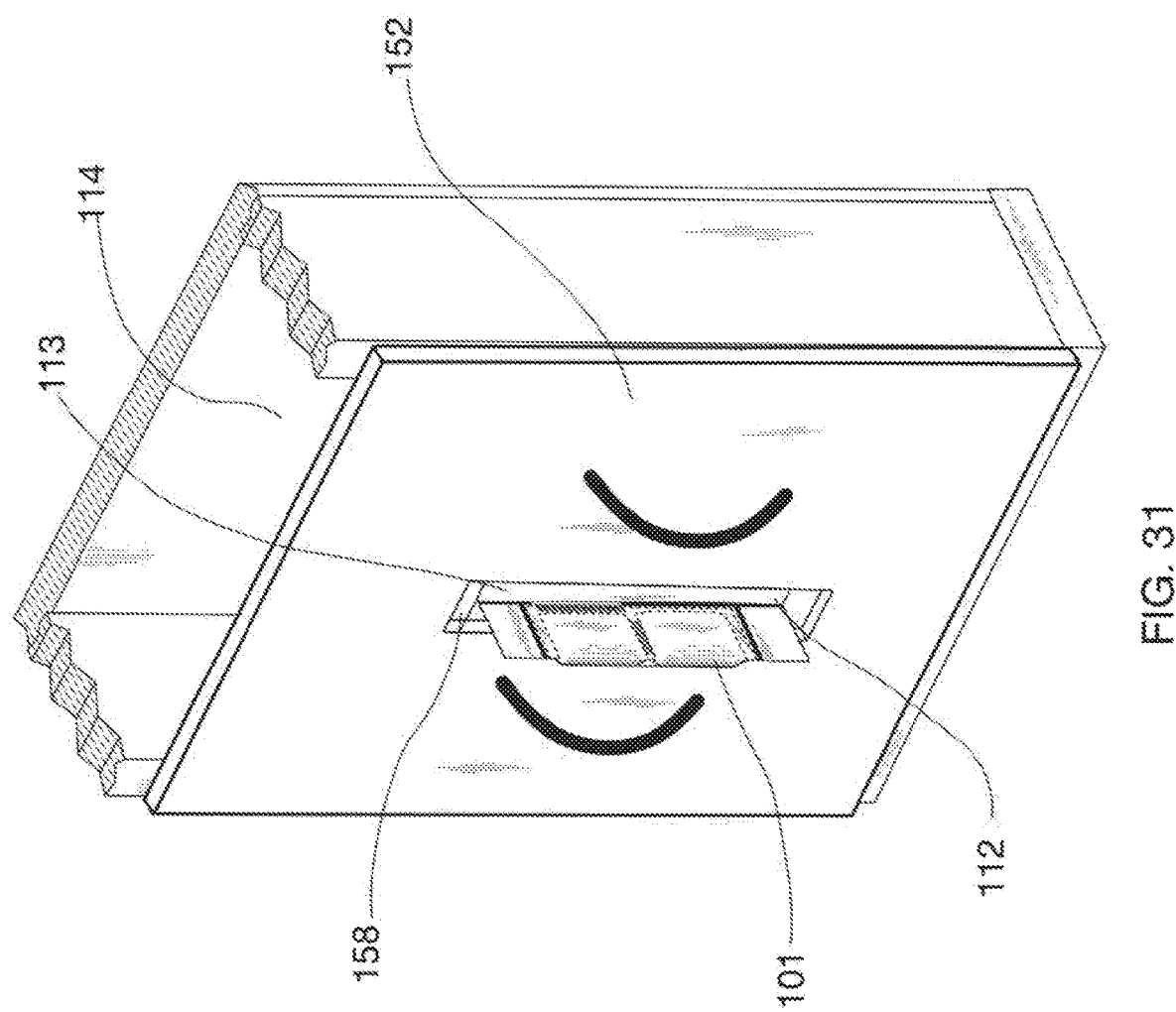
FIG. 31 is a perspective view of a structure and cavity portion with a cover to hold the shape of the expanding foam where the cover provides access to the pressure-activated foam generator.

In accordance with one embodiment of the present invention, perspective view FIG. 31 identifies a cavity cover 152 covering all or a portion of a cavity 114 with a device 112 installed where the cavity cover 152 has one or more cover openings 158 where one or more pressure-activated foam generators 101 are exposed or sit external to the cavity face and are accessible for activation. In accordance with an embodiment of the present invention, the remaining pressure-activated foam generator 101 region of the sheet 113 is available for cutting off or removal once the foam has expanded or is left as is or pushed into the foam filled or partially filled cavity 114 by applying pressure to the cavity face or by some other means.

In accordance with another embodiment of the present invention, the cavity cover 152 with cover openings 158 exists as slots on one or more edges of the cavity cover 152 where one or more pressure-activated foam generators 101 resides external to the cavity 114 that is activated prior to the cavity cover 152 being positioned or after the cavity cover 152 is positioned. In accordance with another embodiment of the present invention, one or more pressure-activated foam generators 101 simply sit along an uncovered edge of cavity cover 152.

In accordance with another embodiment of the present invention, an overflow pouch 117 consisting of a fold in sheet 113 or some other means to collect excess foam is formed into sheet 113 or attached to an opening of the sheet 113 or located at a sheet end or edge where any excess expanding foam 109 is able to flow into that does not otherwise fit into a cavity 114 (such as a smaller cavity or a previously partially filled cavity or a cavity containing other volume reducing elements) as shown in perspective views in FIGS. 32A-32B. In accordance with an embodiment of the present invention, excess expanded malleable foam 166 or cured foam 167 in overflow pouch 117 is cut or otherwise removed as shown in perspective view FIG. 32C, or is simply left as is. In accordance with one embodiment of the present invention, pocket 116 also serves as an overflow pouch and is of sufficient volume or additional volume is available along the folded length where pocket 116 resides or any other folded sections or areas or volume of sheet 113 for any excess expanding foam 109 to collect.

In accordance with one embodiment of the present invention, a device 112 such as shown in FIG. 32A, is small and functions as a void-fill device designed for filling smaller voids in locations where a cavity has not filled completely. To address the issue of having an unfilled region in accordance with an embodiment of the present invention, a location on a prior sheet 113 in front of an unfilled region is cut or slit open or removed or the like to create an opening to apply a device 112. In accordance with one embodiment of the present invention, a device 112 functioning as a smaller void-fill device is usable for filling smaller cavities or odd geometry locations or voids in previously foam filled cavities or the like and are used to cover a cavity or surface or region as described thereof or herein.

In accordance with one embodiment of the present invention, a device 112 such as shown in FIG. 32A, that is small and functions as a void-fill device is usable for voids that are over 3" inches in width or height with volumes in excess of 25-in$^3$ where known spray can foams are generally not recommended although volumes of less than 25-in$^3$ or less than 3" wide or high are also practicable, such as when using an overflow pouch 117 or any other expansion management methods or features described or not described thereof or herein.

In accordance with another embodiment of the present invention, manual forming methods are used to provide a means for altering the density of the final cured foam 167. In accordance with an embodiment of the present invention, additional force is applied to increase the density of an expanding foam 109 or an expanded malleable foam 166 such as restricting, manipulating, or holding an expanding foam 166 in a cavity 50% smaller than the volume achieved if left to expand freely. For example, restricting or manipulating or holding expanding foam 166 increases the density from 0.5 lb/ft$^3$ to 1 lb/ft$^3$ and the volume reduces from 1000-in$^3$ to 500-in$^3$, therefore the same amount of precursors are used to fill different cavity sizes in accordance with an embodiment of the present invention.

In accordance with another embodiment of the present invention, an impact force is induced on a cured foam 167, such as by hammering, to a localized area or any area of the foam bulging past the face of the cavity or at any other position or in any other area or areas, to decrease the depth of the foam and increase the density although applying impact forces on expanding foam 109 or expanded malleable foam 166 are also practicable.

In accordance with another embodiment of the present invention, multiple means for controlling volume expansion are practicable such as changing the mixing amount, temperature, reaction inhibitors or promotors such as chemistry additions, ultrasonics, vibration, radiation, or forces on the foam during or after expansion as well as introducing or including an overflow pouch or pouches or sheet expansion zones, over-foam collection tools, air exposure amount or any of the expansion management methods mentioned or not mentioned in any combination thereof or herein.

In accordance with another embodiment of the present invention, partially filling a volume or cavity 114 with a void fill material or solid matter to reduce the volume of foam required is practicable such as previously filled overflow pouches of material to partially fill a cavity before activating a pressure-activated foam generator 101.

In accordance with other embodiments of the present invention, sheets having one or more pressure-activated foam generators are overlapped or "shingled" such that separate devices or sheets or sheet material are installed and prevent or limit expanding foam from expanding out the front face in gaps between the sheets as demonstrated in perspective views of FIGS. 33A-33D. In accordance with an embodiment of the present invention, a second device 145 is introduced which has a bottom section 186 of second device sheet 140, as illustrated in FIG. 33C. Sheet 113 has an upper flap 126 which is sized, shaped, dimensioned, and configured to cover the bottom section 186 of the adjoining second device 145. In accordance with an embodiment of the present invention, the upper flap 126 of sheet 113 is overlapped or overlapped and folded together with the bottom section 186 of second device 145 and attached together or to the cavity face or back face or internal or external to the cavity members or any surfaces or features in close proximity such that the expanding foam 109 is unable to or is limited from coming out around or between the overlapping sheets 113 and 140. In accordance with an embodiment of the present invention, devices 112 are installed and activated one at a time or multiple devices are overlapped and installed prior to activating the pressure-activated foam generators 101.

In accordance with one embodiment of the present invention, if a sheet 113 does not fully cover a cavity and the desire is to activate any pressure-activated foam generators 101 existing on device 112 prior to installing another sheet then an upper flap 126 of sheet 113 is available to be folded in to cover the open area, as shown in FIG. 33A, and temporarily stapled or otherwise attached or simply left folded into cavity 114 such that any expanding foam 109 or any potential foam residue generated from the rupture of the frangible output seal 107 is contained. In accordance with one embodiment of the present invention, once device 112 is activated and the desired foam state and shape is achieved such as shown in FIG. 33B as expanded malleable foam 166 in the process of transitioning to a cured foam 167 such that it holds its shape of its own accord, a second device 145 is positioned above sheet 113 where the second device 145 is of appropriate size and shape to cover or partially cover the cavity 114 where the second device 145 contains one or more second pressure-activated foam generators 143 which generates a second or more foams as depicted in FIG. 33C-33D. A second pressure-activated foam generator 143 includes a second frangible output seal 144 which has a ruptured position, the second pressure-activated foam generator 143 is joined to the second device 145 so that in the ruptured position expanding foam 109 has a path from the second frangible output seal 144 to the second aperture 141. It is noted that upper flap 126 of sheet 113 is moved downward (rotated in the direction of the arrows per FIG. 33B) to allow bottom section 186 of second device sheet 140 to move behind it. It is also noted that in the shown embodiment device 112 and second device 145 are the same.

In FIG. 33C, second device 145 is connected to structure 111 (such as with staples) so that second device 145 covers an open portion of the cavity 114 with second aperture 141 adjacent to cavity 114. Then upper flap 126 of sheet 113 is positioned (rotated upward, per the arrows shown in FIG. 33C) so that upper flap 126 covers the bottom section 186 of the second device 145. Upper flap 126 is then connected to structure 111 (such as with staples).

It is noted that by overlapping the bottom section 186 of second device 145 with the upper flap 126 of sheet 113, foam is less likely to escape between the two sheets. In accordance with other embodiments of the present invention, the sheets are joined together by other means such as tapes and adhesives or overlapping and folding or tautly stapling to studs 120 such that expanding foam 109 is unable to pass between the second device 145 and upper flap 126. Also in the shown embodiment, the foam generator of device 112 is activated prior to the connection of second device 145 to structure 111. In accordance with another embodiment of the present invention, the pocket which receives pressure-activated foam generator 101 (and 143) has been shortened to facilitate the overlapping of the sheets. In accordance with another embodiment of the present invention, upper flap 126 is trimmed, bunched, folded up, or the like as needed to reduce overlap or simply positioned over the second pressure-activated foam generator 143. It is noted that in FIG. 33D the lower edge 128 of second device 145 is disposed behind first sheet 113. That is, first sheet 113 overlaps second device sheet 140.

In accordance with another embodiment of the present invention, if a sheet 113 does not fully cover a cavity 114, as in FIGS. 33A-33D, a second device 145 is attached without having activated a previous device 112 and then pressure-activated foam generators are activated sequentially. In accordance with another embodiment of the present invention, additional devices 112 are sequentially added as needed.

In accordance with another embodiment of the present invention, pressure-activated foam generators such as those shown in FIGS. 33A-33D, are appropriately sized or spaced apart from one another or positioned relative to other surfaces or features, such as a lower surface or side members or a top member, or to the end of a previously expanded foam insulation or a previously installed device 112 or in any combination thereof or herein based on the volumetric expansion size of the foam. Proper spacing of the generators prevents potential for interference of expanding foam 109 or previously expanded malleable foam 166 or cured foam 167. Table 1 provides the resulting foam heights achievable in given cavity depths and widths for a pressure-activated foam generator that produces 1000-in$^3$ (0.58-ft$^3$) of expanded foam.

TABLE 1

Resulting Expanded Foam Height in Different Cavity Sizes for 1000-in$^3$ of Expanded Foam

| Cavity Stud Size | Cavity Width (in) | Foam Height (in) |
| --- | --- | --- |
| 2 × 4 (3.5" depth) | 6 | 47.5 |
|  | 10 | 28.5 |
|  | 14.5 | 19.75 |
| 2 × 6 (5.5" depth) | 6 | 30.25 |
|  | 10 | 18.25 |
|  | 14.5 | 12.5 |

Figure 34:
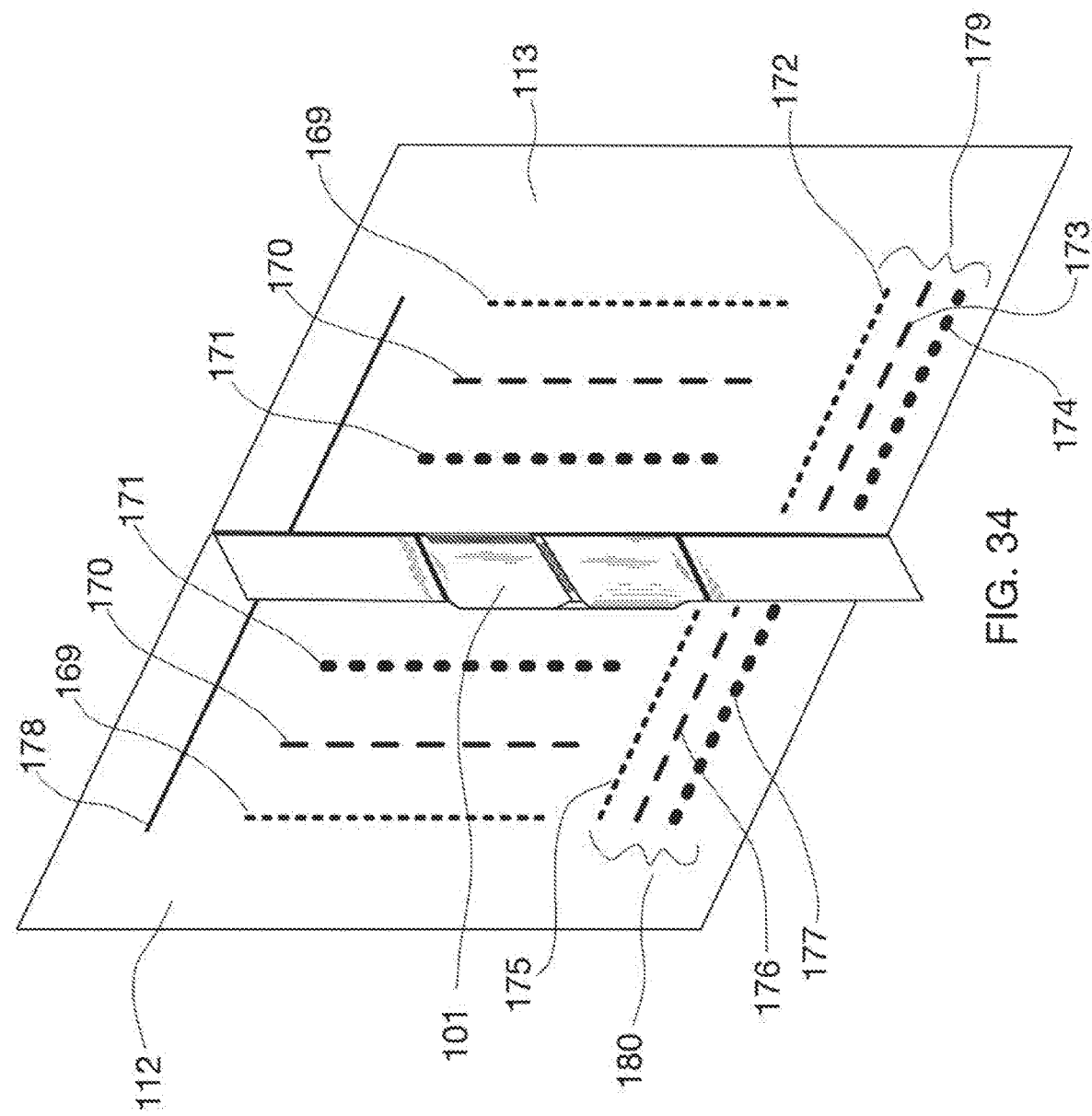
FIG. 34 is a perspective view of a device featuring alignment indicators.

In accordance with another embodiment of the present invention, an alignment means is featured on a device 112 correlating to cavity size and position of a pressure-activated foam generator 101 relative to cavity members or a previously activated pressure-activated foam generator or previously installed device or some other aligning object or feature for properly locating a device 112 over a cavity 114 as illustrated in perspective view FIG. 34 and front elevation views FIGS. 35A-35F. In accordance with one embodiment of the present invention, horizontal lines or hatched regions or other indicia or slits or sheet edges are provided for target overlap and positioning that is dependent on the geometry of the cavity to fill allowing for the same pressure-activated foam generator 101 of sheet or sheets 113 to be used for various cavity shapes and sizes. In accordance with one embodiment of the present invention, vertical lines or hatched regions or other indicia or slits or sheet edges are provided for centering or otherwise positioning a device 112 over a cavity 114.

In accordance with another embodiment of the present invention, per FIG. 34, a first vertical alignment indicator set 169 includes vertical lines that are equally spaced horizontally about a pressure-activated foam generated 101 to align with the inside edges of a wide cavity 114 such as a 14.5" wide cavity per Table 1. A second vertical alignment indicator set 170 and a third vertical alignment indicator set 171 are also equally spaced horizontally about a pressure-activated foam generated 101 and align with the inside edges of narrower cavities such as 10" wide cavity and 6" wide cavity, respectively, per Table 1.

In accordance with another embodiment of the present invention, FIG. 34 features one or more horizontal alignment indicators, such as horizontal alignment indicators 172-177, or horizontal alignment indicator sets, such as 2×4 horizontal alignment indicator set 179 and 2×6 horizontal alignment indicator set 180, for properly spacing the pressure-activated foam generator 101 away from a cavity base or a prior installed device 112 or prior expanded foam or some other alignment means.

In accordance with another embodiment of the present invention, a 2×4 horizontal alignment indicator set 179 consists of a first 2×4 horizontal alignment indicator 172 corresponding to the cavity depth and a first stud cavity spacing relating to first vertical alignment indicator set 169, a second 2×4 horizontal alignment indicator 173 corresponding to the cavity depth and a second stud cavity spacing relating to second vertical alignment indicator set 170, and a third 2×4 horizontal alignment indicator 174 corresponding to the cavity depth and a third stud cavity spacing relating to third vertical alignment indicator set 171.

In accordance with another embodiment of the present invention, the 2×6 horizontal alignment indicator set 180 consists of a first 2×6 horizontal alignment indicator 175 corresponding to the cavity depth and a first stud cavity spacing relating to first vertical alignment indicator set 169, a second 2×6 horizontal alignment indicator 176 corresponding to the cavity depth and a second stud cavity spacing relating to second vertical alignment indicator set 170, and a third 2×6 horizontal alignment indicator 177 corresponding to the cavity depth and a third stud cavity spacing relating to third vertical alignment indicator set 171.

In accordance with another embodiment of the present invention, a horizontal fill line indicator 178 exists to identify the height to which the expanding foam will fill and expand to and is representative of the expanded foam volume where the vertically and horizontal alignment indicators are spaced for achieving fill to the identified horizontal fill line indicator 178 for various cavity sizes. In accordance with another embodiment of the present invention, a single horizontal fill line indicator 178 position ensures consistent foam flow and expansion results where the aperture is not unnecessarily blocked by excess foam expanding in front or above the aperture.

In accordance with another embodiment of the present invention, one or more horizontal fill line indicators 178 exist. In accordance with another embodiment of the present invention, the horizontal fill line indicators 178 are used for appropriately spacing pressure-activated foam generators 101 when shingling or for when installing sheets consisting of multiple spaced apart pressure-activated foam generators 101 where sheet 112 material is folded or bunched or left slack in order to properly space apart the pressure-activated foam generators 101.

FIG. 35A identifies a 2×4 cavity with a device 112 positioned over the cavity 114 where the inside edge of the vertical members of the cavity align with the first vertical alignment indicator set 169 identifying the cavity 114 as a 14.5" wide cavity per Table 1 instructing the installer to align the corresponding first 2×4 horizontal alignment indicator 172 to the cavity base plate for installation.

FIG. 35B identifies a 2×4 cavity with a device 112 positioned over the cavity 114 where the inside edge of the vertical members of the cavity align with the second vertical alignment indicator set 170 identifying the cavity 114 as a 10" wide cavity per Table 1 instructing the installer to align the corresponding second 2×4 horizontal alignment indicator 173 to the cavity base plate for installation.

FIG. 35C identifies a 2×4 cavity with a device 112 positioned over the cavity 114 where the inside edge of the vertical members of the cavity align with the third vertical alignment indicator set 171 identifying the cavity 114 as a 6" wide cavity per Table 1 instructing the installer to align the corresponding third 2×4 horizontal alignment indicator 174 to the cavity base plate for installation.

FIG. 35D identifies a 2×6 cavity with a device 112 positioned over the cavity 114 where the inside edge of the vertical members of the cavity align with the first vertical alignment indicator set 169 identifying the cavity 114 as a 14.5" wide cavity per Table 1 instructing the installer to align the corresponding first 2×6 horizontal alignment indicator 175 to the cavity base plate for installation.

FIG. 35E identifies a 2×6 cavity with a device 112 positioned over the cavity 114 where the inside edge of the vertical members of the cavity align with the second vertical alignment indicator set 170 identifying the cavity 114 as a 10" wide cavity per Table 1 instructing the installer to align the corresponding second 2×6 horizontal alignment indicator 176 to the cavity base plate for installation.

FIG. 35F identifies a 2×6 cavity with a device 112 positioned over the cavity 114 where the inside edge of the vertical members of the cavity align with the third vertical alignment indicator set 171 identifying the cavity 114 as a 6" wide cavity per Table 1 instructing the installer to align the corresponding third 2×6 horizontal alignment indicator 177 to the cavity base plate for installation.

As an example, for a pressure-activated foam generators 101 with an expansion volume of 1000-in$^3$, a vertical cavity 114 with a depth of 3.5" and a width of 10" results in 28.5" of vertical foam fill. For the same pressure-activated foam generators 101 with an expansion volume of 1000-in$^3$, for a vertical cavity 114 with a depth of 5.5" and a width of 14.5", results in 12.5" of vertical foam fill.

In accordance with one embodiment of the present invention, horizontal markers are provided on a sheet of one or more pressure-activated foam generator sheets to indicate appropriate overlap locations between two sheets or for identifying where a horizontal fold or bunching of the sheet or the like should be added prior to attachment. The overlapping or fold locations providing the necessary spacing between the pressure-activated foam generators 101 for producing the appropriate amount of insulation fill.

In accordance with another embodiment of the present invention, additional indicators are provided that are spaced in relation to a first indicating line or feature providing height increments. The height increments being associable to a table providing the target height value for a given pressure-activated foam generator 101 based on a cavity's width and depth to further the ease-of-use for alternate cavity widths and depths. In accordance with an embodiment of the present invention, subsequent pressure-activated foam generator 101 sheets or sheet sections are substantially aligned with the target height indicating line from the previous pressure-activated foam generator sheet or sheet section or subsequent sheets are aligned with the level of fill from a prior activation. In accordance with an embodiment of the present invention, a sheet or sheet sections are installed and activated one at a time or all installed prior to activating each sheet one after the other. In accordance with one embodiment of the present invention, the pressure-activated foam generators 101 are activated sequentially from bottom to top allowing gravity to promote uniform fill for each section although other sequences of activation are practicable.

In accordance with one embodiment of the present invention, a central alignment horizontal line or other indicating line or feature is positioned within the vertical height of a pressure-activated foam generator region such that corresponding horizontal height lines are spaced equidistant in both directions from a central alignment horizontal line or other indicating line or feature.

In accordance with an embodiment of the present invention, fill lines or other indicators such as spacing indicia on the pressure-activated foam generator sheets identify how much the user must manually apply pressure to an accessible region of expanding or expanded foam to direct the foam to appropriately fill the cavity to achieve the target height, width, or depth dimensions to uniformly fill a target volume or area.

In accordance with one embodiment of the present invention, the table is displayed on the sheet for ease of reference or a graph or dimensional units or some other means is also practicable.

Figure 36:
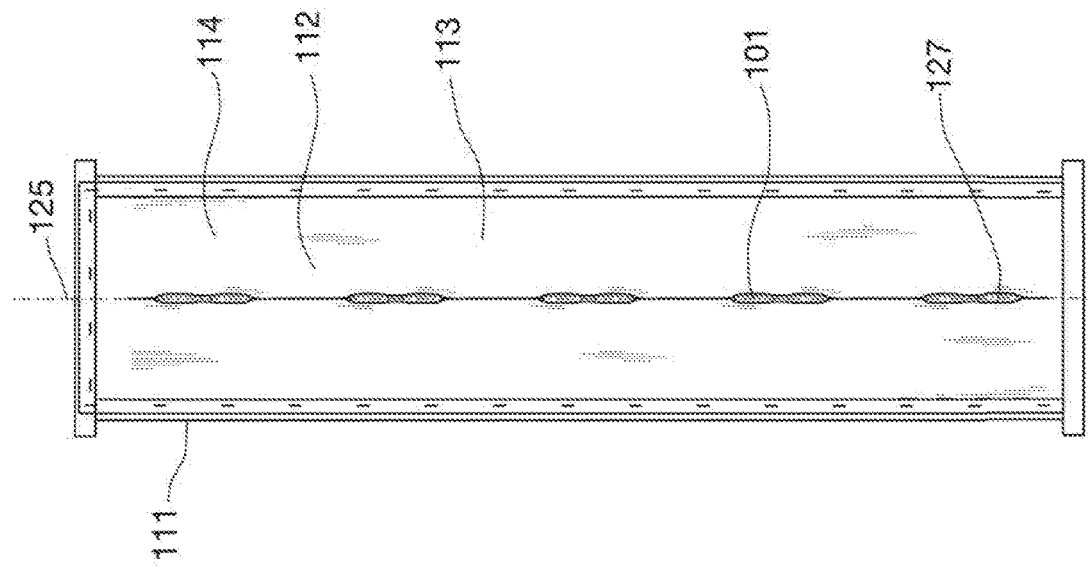
FIG. 36 is a front elevation view of a device featuring multiple vertically oriented pressure-activated foam generators installed onto a cavity face; and, FIG. 37 is a front elevation view of a device featuring multiple horizontally oriented pressure-activated foam generators installed onto a cavity face.

In accordance with one embodiment of the present invention, FIG. 36 is a front elevation view of an alternate embodiment of the device 112 connected to structure 111 to cover a cavity 114. In accordance with one embodiment of the present invention, a sheet 113 has a plurality (five as shown) of pressure-activated foam generators 101 which form an array of vertically spaced apart pressure-activated foam generators 101. In this embodiment the longitudinal axes 125 of the pressure-activated foam generators 101 are oriented vertically. The plurality of pressure-activated foam generators 101 include a lowermost pressure-activated foam generator 127. Starting with lowermost pressure-activated foam generator 127 and working upward, each pressure-activated foam generator 101 is sequentially activated, while the previous activator's foam is in the expanding foam 109 state or the expanded malleable foam 166 state or in a cured foam 167 state depending on the recommended performance or the application or the installer's preference or for another reason. In this fashion the cavity can be sequentially filled with expanded foam to create the final installed cured foam. In accordance with one embodiment of the present invention, a device 112 is configured to cover and fill a common size cavity 114 found in a structure 111 such as a cavity formed using 2×6 studs 120 spaced 16" apart on center and 93" high. The plurality of pressure-activated foam generators 101 are configured and spaced to generate cured foam 167 to completely fill the cavity. For the device as shown in FIG. 36, the pressure activated foam generators would each produce 1483 in$^3$ of cured foam 167, resulting in a foam height of 18.6", such that the combined height of the cured foam 167 fills the 93" high cavity 114

In accordance with one embodiment of the present invention, FIG. 37 is a front elevation view of a single device 112 connected to structure 111 and covering a cavity 114. In accordance with one embodiment of the present invention, a sheet 113 has a plurality (five as shown) of pressure-activated foam generators 101 which form an array of vertically spaced apart pressure-activated foam generators 101. This embodiment is the same as that of FIG. 36, except the longitudinal axes 125 of the pressure-activated foam generators 101 are oriented horizontally. It may be appreciated that for both of the embodiments of FIG. 36 and FIG. 37, long (e.g. eight foot length) sheets containing a plurality of pressure-activated foam generators 101 can be stored in rolls or folded assemblies for shipping and handling and installation convenience. In accordance with embodiments of the present invention, the orientation of pressure-activated foam generators 101 or the array of spaced apart pressure activated foamed generators are oriented vertically, horizontally, or at any angles therebetween.

In accordance with an embodiment of the present invention, the device 112 of FIG. 36 or FIG. 37 featuring a plurality of pressure-activated foam generators 101 is of insufficient size to cover or fill a cavity 114 and shingling is performed to fully cover the cavity 114.

In accordance with another embodiment of the present invention, device 112 of FIG. 36 or FIG. 37 contains an overflow pouch 117 such as shown in FIG. 32A or any of the other foam expansion management features or are used in conjunction with any of the foam expansion management methods described thereof or herein.

In accordance with one embodiment of the present invention, the foam fill is variable or the fill is not managed such that voids are present after all of the pressure-activated foam generator sheets covering a cavity or partially covering a cavity are activated and have completed expanding. In accordance with one embodiment of the present invention, alternate insulation fill methods such as a spray can of foam or a foam gun are used to fill the voids including poking holes in the sheets or coming around a sheet edge or removing a sheet to access the expanded malleable foam or cured foam or accessing a cavity by some other means. In accordance with one embodiment of the present invention, any of the described expansion management techniques described thereof or herein are employed as needed.

In accordance with other embodiments of the present invention, the method and device is used in applications other than insulation for homes and buildings and is alternatively used to insulate temporary structures, dog houses, sheds, vehicles, boats, airplanes and aerial vehicles, under water vehicles and submarines, or any other structure or volume designed for protection or insulation. In accordance with other embodiments of the present invention, the device is used as padding, protection, acoustic dampening, plugging holes, art projects, light weight filler, science experiments or school projects, mechanical displacement, mechanical installations such as fence posts, castings, coolers, refrigerators, saunas, bathtubs, showers, refrigerant or heater line insulation or protection, electrical wiring insulation or protection and other applications such as do-it yourself related projects.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for insulating a stud or joist cavity of a structure, the system comprising:
    a sheet sized, shaped, and configured for placement across an open area of the cavity to at least partially enclose the cavity, the sheet having a cavity facing side and an exterior facing side that is opposite the cavity facing side;
    a pressure-activated foam generator which generates foam, the pressure-activated foam generator attached to the sheet and disposed to provide foam to the cavity on the cavity facing side of the sheet; and
    the pressure-activated foam generator including a frangible output seal, wherein when the frangible output seal is intact the frangible output seal is a barrier between the pressure-activated foam generator and the cavity on the cavity facing side of the sheet, and when the frangible output seal is broken the broken frangible output seal is an access conduit from the pressure-activated foam generator to the cavity on the cavity facing side of the sheet;
    wherein when the pressure-activated foam generator is activated, generated foam expands, breaks the frangible output seal, and passes through the broken frangible output seal and out to the cavity on the cavity facing side of the sheet.

2. The system of claim 1, wherein the structure comprises a wall, ceiling, or floor of a building.

3. The system of claim 1, wherein when the sheet is placed across the open area of the cavity, the generated foam flows into and collects in the cavity.

4. The system of claim 1, wherein the pressure-activated foam generator is formed as part of the sheet.

5. The system of claim 1, wherein the sheet comprises a pocket that receives the pressure-actuated foam generator.

6. The system of claim 1, wherein the pressure-activated foam generator is disposed on the exterior facing side of the sheet and intersects with the sheet.

7. The system of claim 6, wherein the sheet further comprises an aperture disposed adjacent to the cavity which is fluidly coupled with the broken frangible output seal and forms a path for expanding foam from the pressure-activated foam generator to the cavity facing side of the sheet.

8. The system of claim 1, wherein the pressure-activated generator is disposed on the cavity facing side of the sheet.

9. The system of claim 8, wherein the sheet further comprises at least one opening providing access from the exterior facing side of the sheet to the pressure-activated foam generator disposed on the cavity facing side of the sheet.

10. The system of claim 1, wherein the pressure-activated foam generator is composed of two or more chambers, said chambers separated by one or more frangible mixing seals.

11. The system of claim 1, wherein the sheet is configured to be attached to a pair of studs or joists defining the stud or joist cavity.

12. The system of claim 11, wherein the sheet is configured as a vapor retarder when attached to the pair of studs or joists.

13. The system of claim 1, wherein the sheet further comprises indicator markings which guide positioning and use of the system.

14. The system of claim 1, wherein the sheet further comprises excess material sized, shaped, dimensioned, and configured to completely cover an open side of the cavity.

15. The system of claim 1, wherein the sheet further comprises excess foam containment volumes to accept excess foam that exceeds a volume of the cavity.

16. The system of claim 1, wherein the frangible output seal comprises varying strength across a width of the seal to aid in burst containment of the generated foam.

17. The system of claim 1, wherein the frangible output seal comprises a plurality of recursive seals to aid in burst containment of generated foam.

18. The system of claim 1, wherein the system comprises a plurality of spaced apart pressure-activated foam generators.

19. The system of claim 18, wherein the sheet further comprises material sized, shaped, dimensioned, and configure to completely cover the cavity.

20. The system of claim 19, wherein the plurality of spaced apart pressure-activated foam generators are configured to produce foam to substantially fill the cavity.

* * * * *